US011372524B1

(12) United States Patent
Tarpey et al.

(10) Patent No.: US 11,372,524 B1
(45) Date of Patent: Jun. 28, 2022

(54) MULTIMEDIA COMMUNICATIONS WITH SYNCHRONIZED GRAPHICAL USER INTERFACES

(71) Applicant: Amazon Technologies, Inc., Seattle, WA (US)

(72) Inventors: Juliana Veronica Tarpey, Seattle, WA (US); Karthick Sundararaman, Redmond, WA (US); Krzysztof Jaroslaw Jakubczyk, Seattle, WA (US); Amit Kumar Agarwalla, Redmond, WA (US); Ninad Anil Parkhi, Sammamish, WA (US); Sachin Balaso Shinde, Seattle, WA (US); Jai Kulin Asher, Seattle, WA (US); Samuel Scott Gigliotti, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/010,022

(22) Filed: Sep. 2, 2020

(51) Int. Cl.
*G06F 3/0483* (2013.01)
*G06F 15/02* (2006.01)
*G06F 3/0482* (2013.01)

(52) U.S. Cl.
CPC .......... *G06F 3/0483* (2013.01); *G06F 3/0482* (2013.01); *G06F 15/0283* (2013.01); *G06F 15/0291* (2013.01)

(58) Field of Classification Search
CPC .. G06F 3/0483; G06F 3/0482; G06F 15/0283; G06F 15/0291
See application file for complete search history.

(56) References Cited

U.S. PATENT DOCUMENTS

| 2004/0008635 | A1* | 1/2004 | Nelson | H04N 7/152 370/260 |
| 2007/0199076 | A1* | 8/2007 | Rensin | H04N 21/25816 726/27 |
| 2008/0016156 | A1* | 1/2008 | Miceli | G06Q 10/10 709/204 |
| 2008/0178230 | A1* | 7/2008 | Eyal | H04N 21/816 725/86 |

(Continued)

OTHER PUBLICATIONS

Facebook Portal, "A whole new way to share stories", webpage retrieved on Sep. 4, 2020 via https://portal.facebook.com/features/story-time/, 9 pages.

(Continued)

*Primary Examiner* — Tadesse Hailu
(74) *Attorney, Agent, or Firm* — Pierce Atwood LLP

(57) ABSTRACT

Techniques for performing multimedia communications including audio and video (including still-frame video) are described. During a multimedia communication involving two devices, one of the devices may receive a user input to display digital book covers. In response, each device may display live video (captured by each device of the multimedia communication) and still-frame video corresponding to digital book covers. Thereafter, in response to a further user input, each device may display the live video and still-frame video corresponding to a specific page of one of the digital books. Each device may receive a user input for controlling the still-frame video displayed.

18 Claims, 32 Drawing Sheets

(56) References Cited

U.S. PATENT DOCUMENTS

| | | | | |
|---|---|---|---|---|
| 2009/0010485 A1* | 1/2009 | Lamb | ............... | H04N 7/147 |
| | | | | 382/100 |
| 2010/0064334 A1* | 3/2010 | Blackburn | ......... | H04N 21/4788 |
| | | | | 725/110 |
| 2010/0138746 A1* | 6/2010 | Zarom | ............... | H04L 65/4015 |
| | | | | 715/720 |
| 2013/0328997 A1* | 12/2013 | Desai | ............... | H04N 7/141 |
| | | | | 348/14.02 |
| 2014/0368734 A1* | 12/2014 | Hoffert | ............ | H04L 65/60 |
| | | | | 348/564 |
| 2016/0349965 A1* | 12/2016 | Griffin | ............ | G06F 3/0481 |
| 2017/0279867 A1* | 9/2017 | Morton | ............ | G06Q 10/10 |
| 2017/0293458 A1* | 10/2017 | Poel | ............ | H04L 12/1822 |
| 2019/0037173 A1* | 1/2019 | Lee | ............ | H04W 4/18 |

OTHER PUBLICATIONS

Caribu, https://caribu.com, webpage retrieved on Sep. 4, 2020, 19 pages.

Webwise.ie "Explained: What is Twitch?", webpage retrieved on Sep. 4, 2020 via https://www.webwise.ie/parents/explained-what-is-twitch/, 6 pages.

* cited by examiner

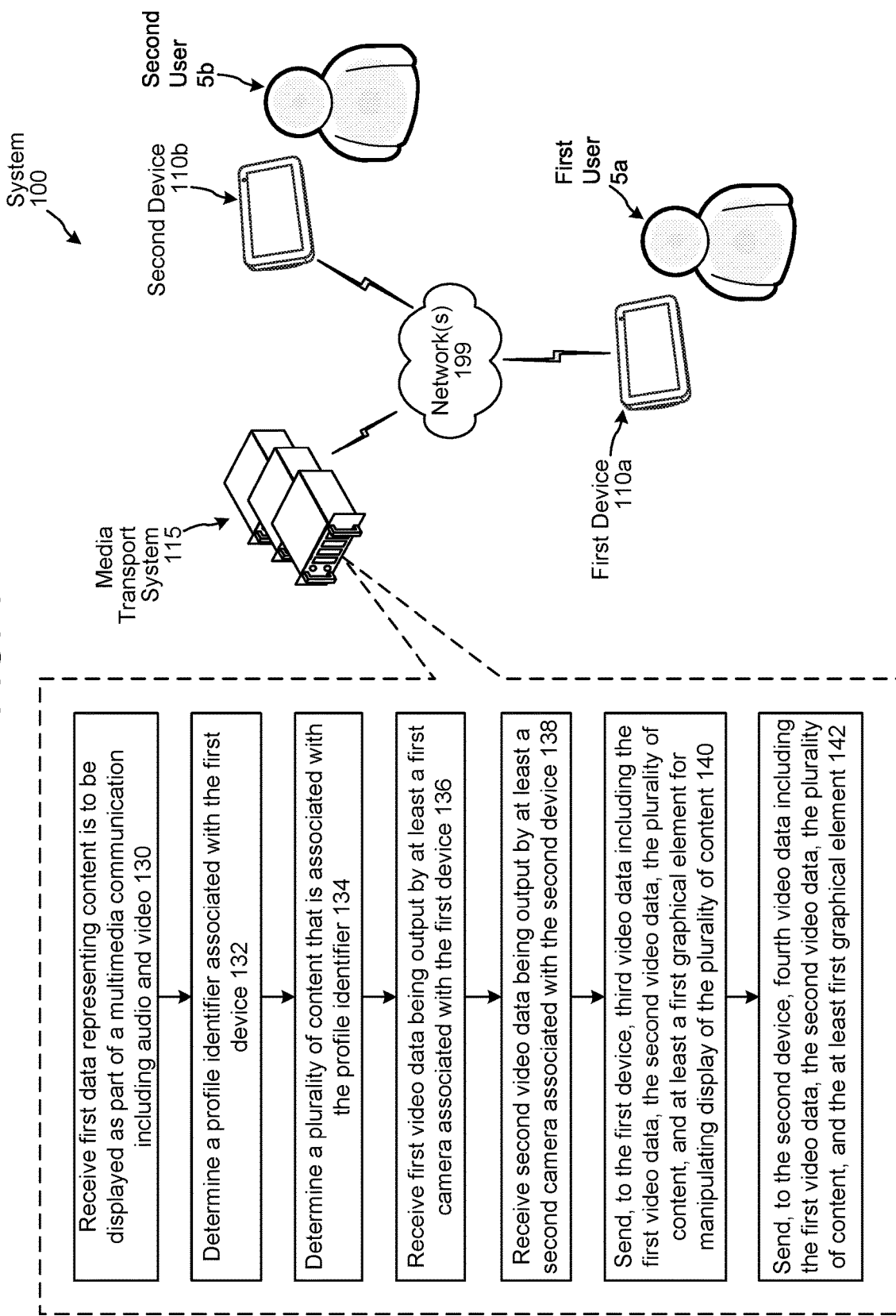

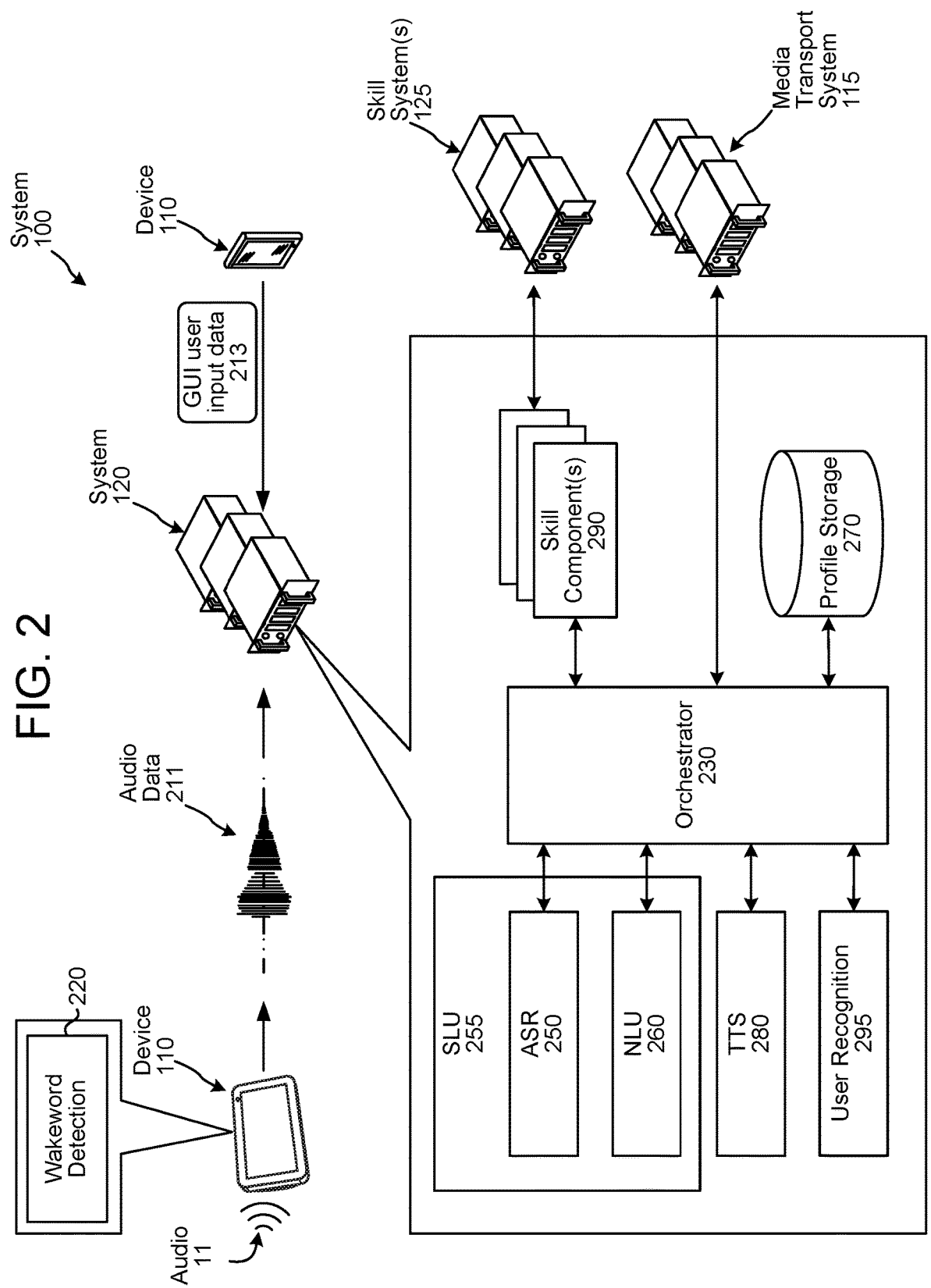

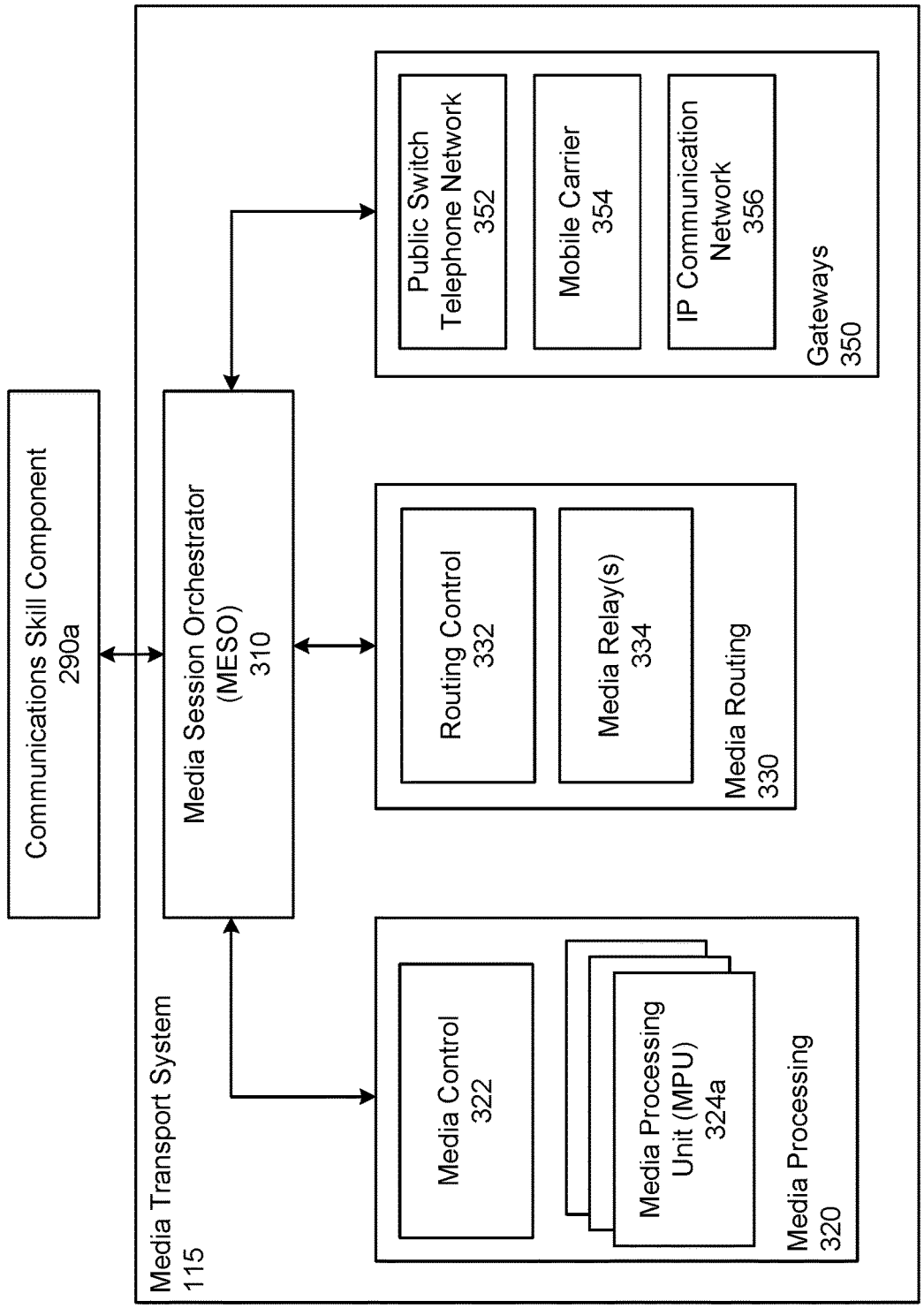

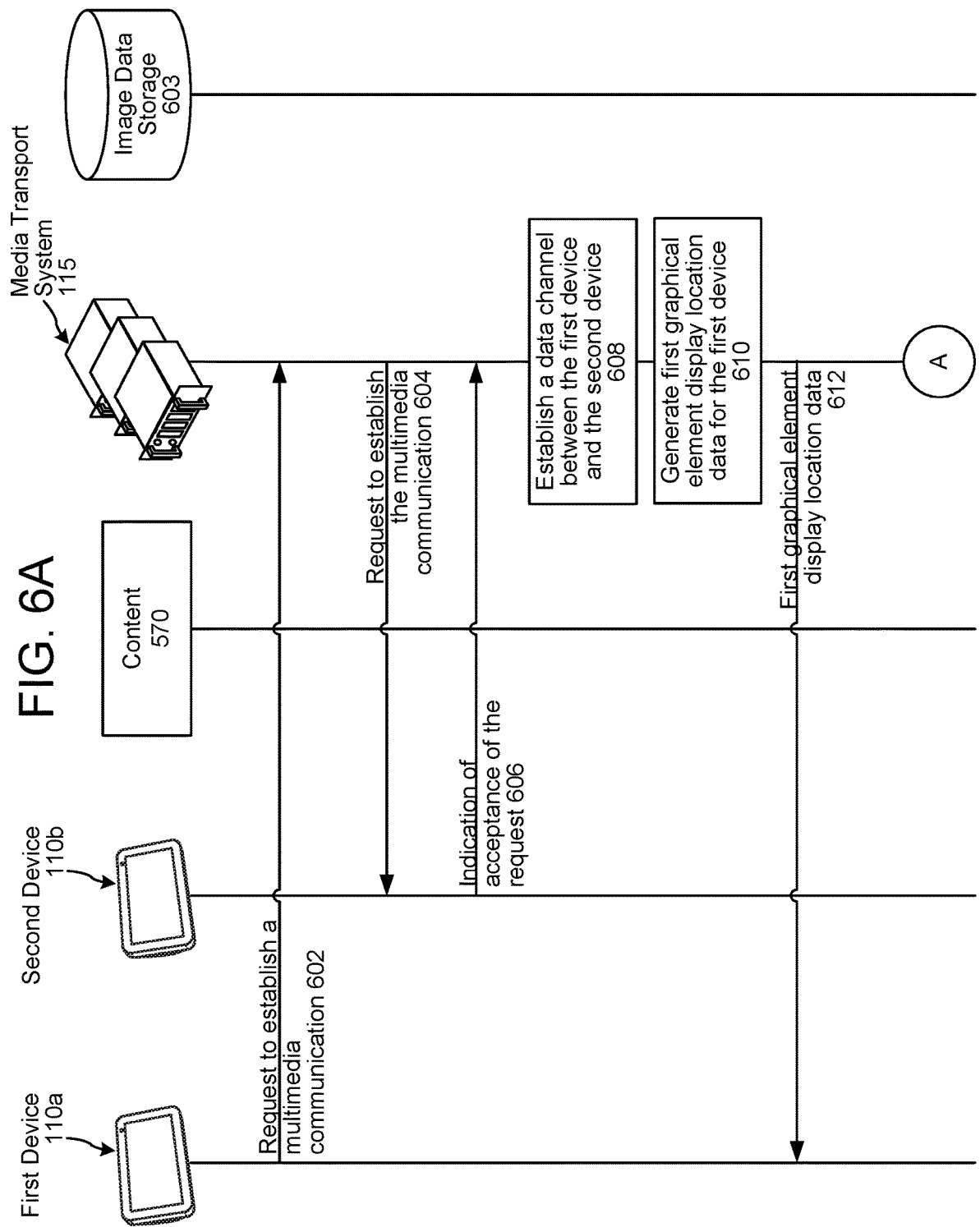

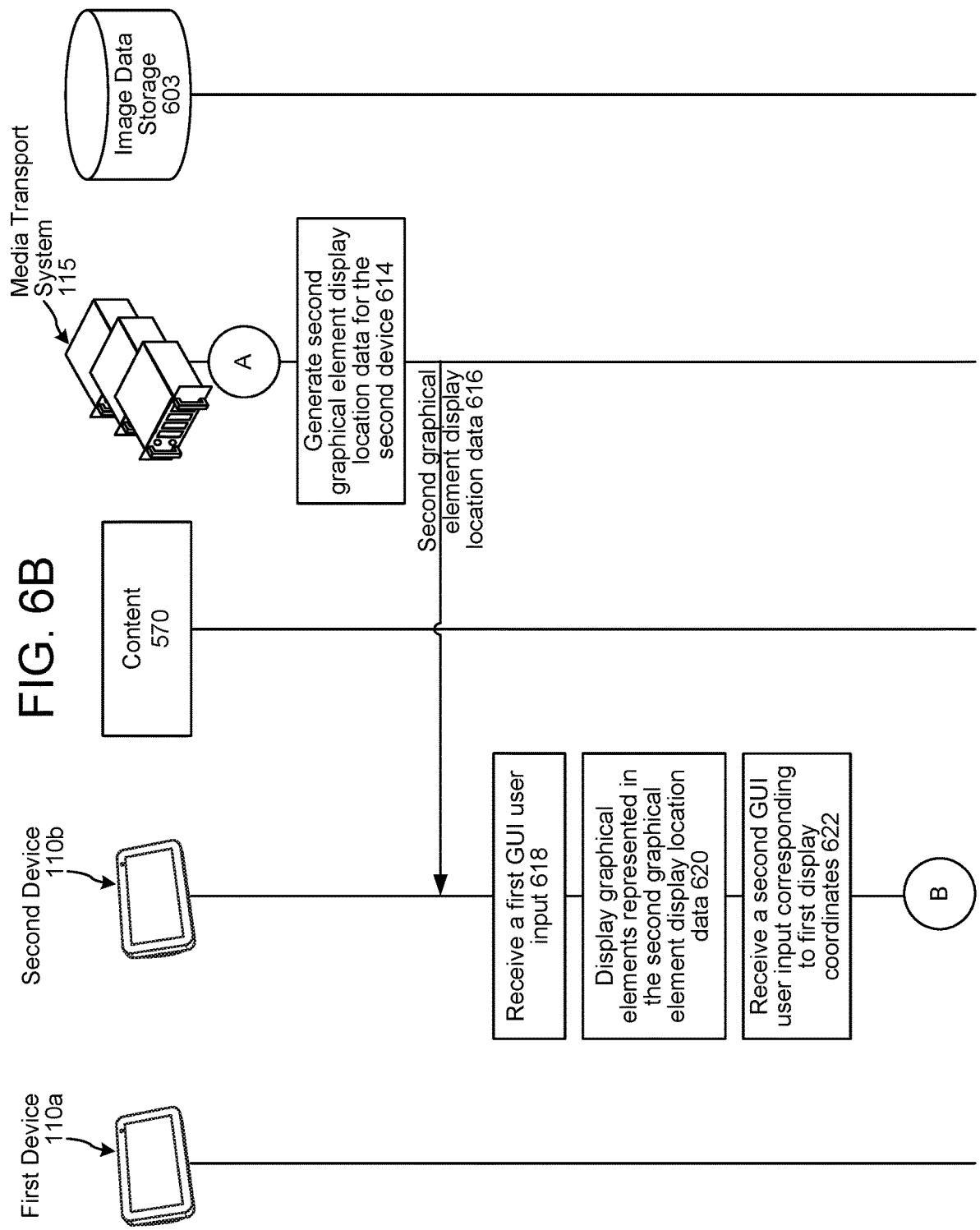

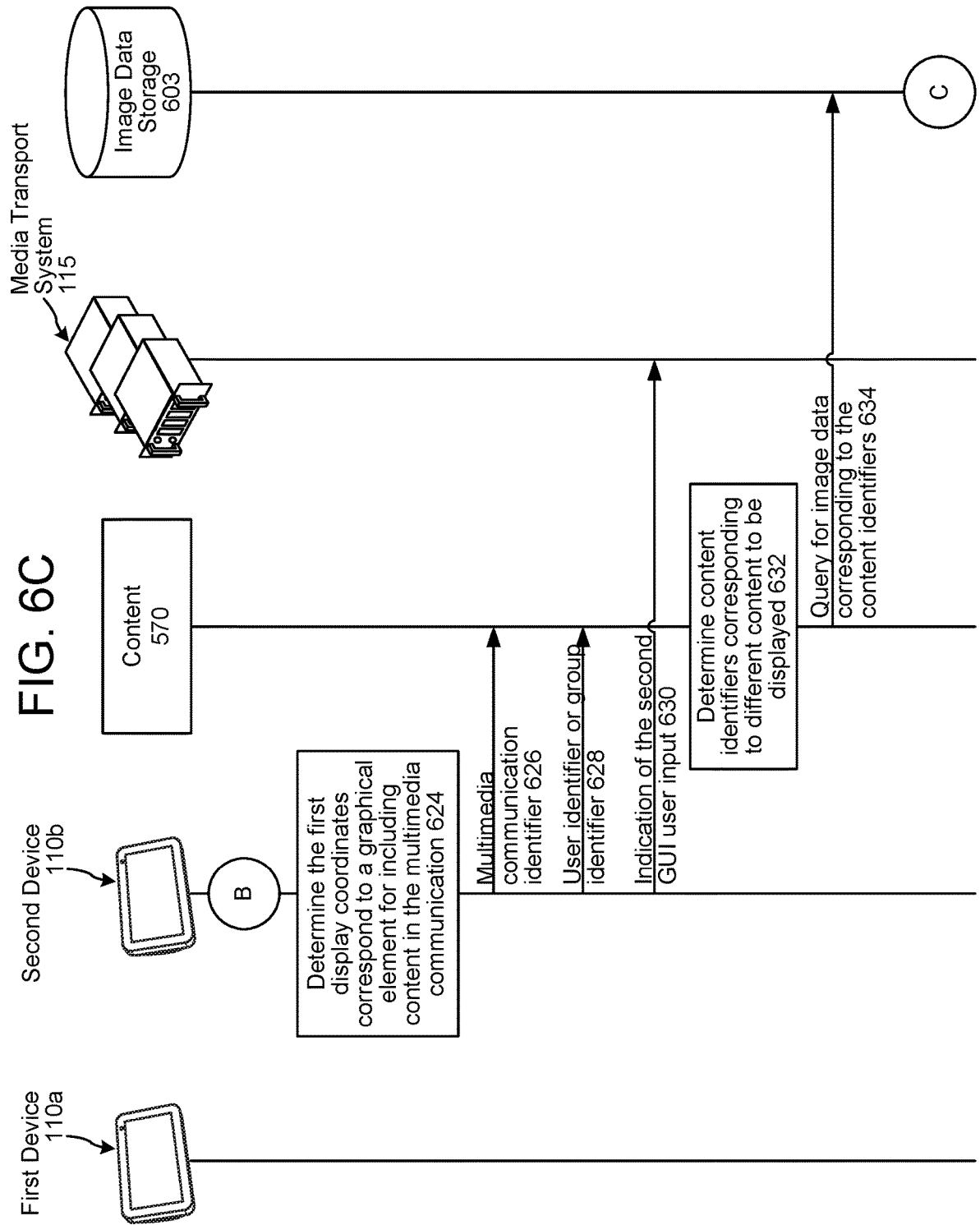

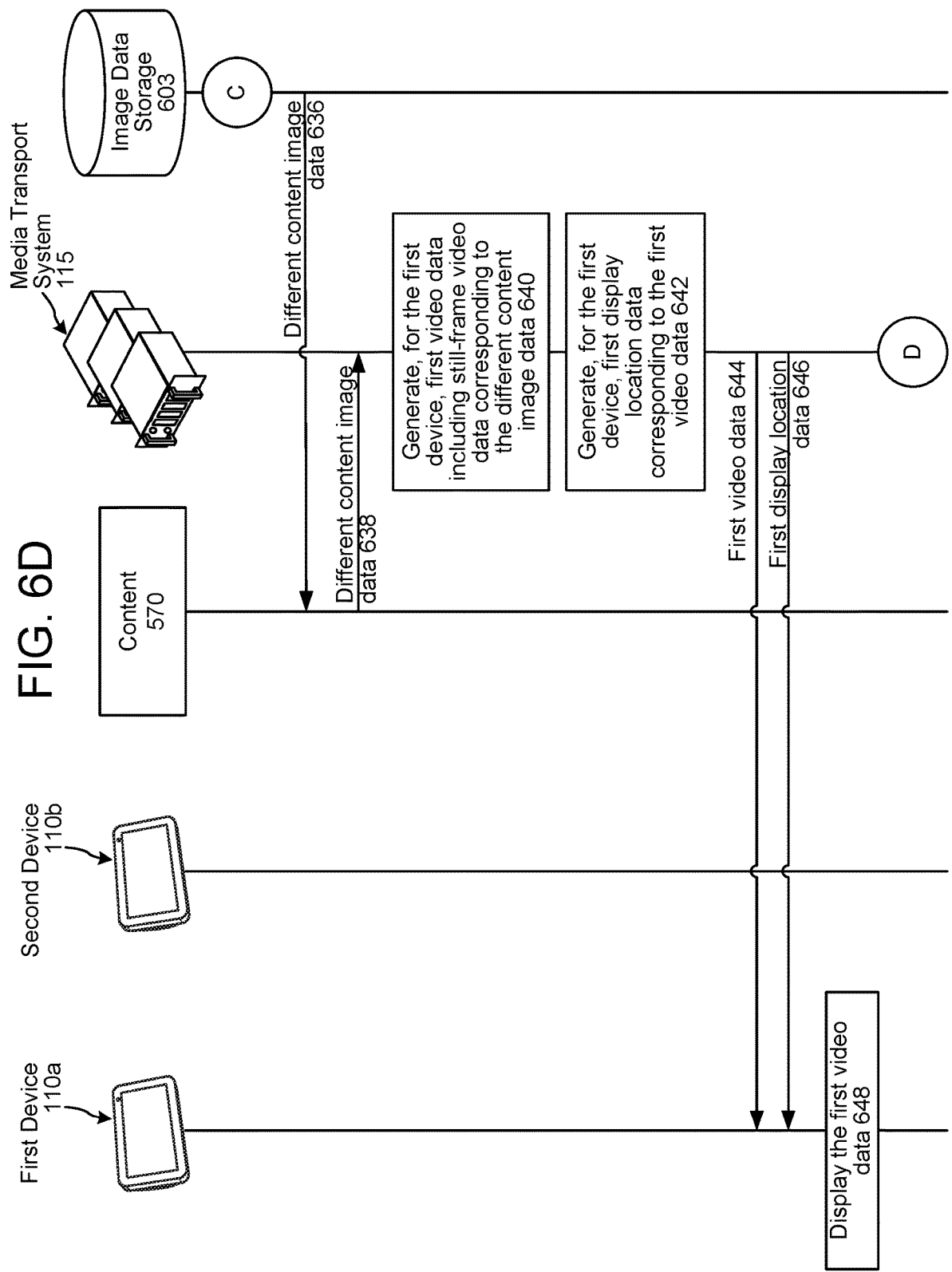

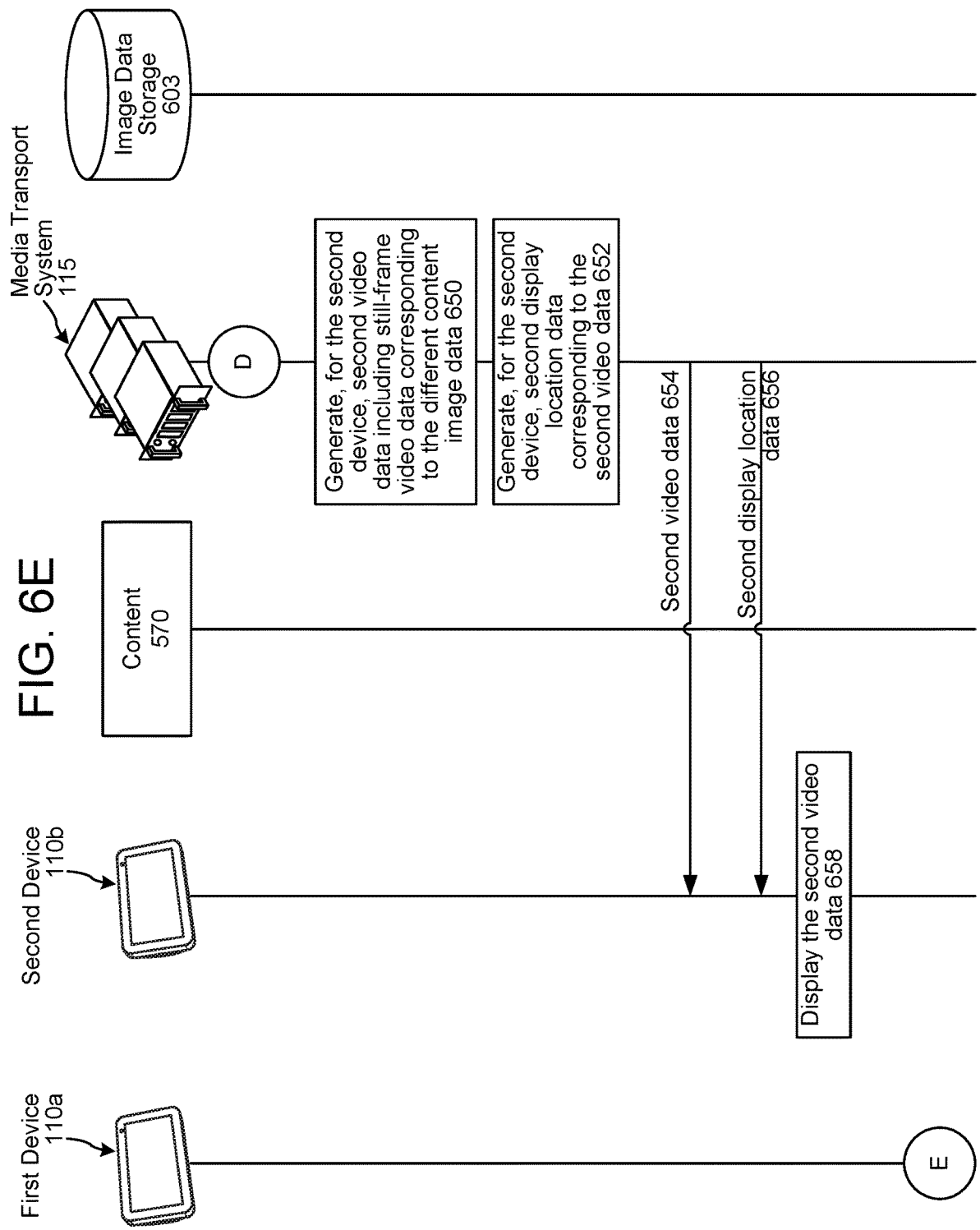

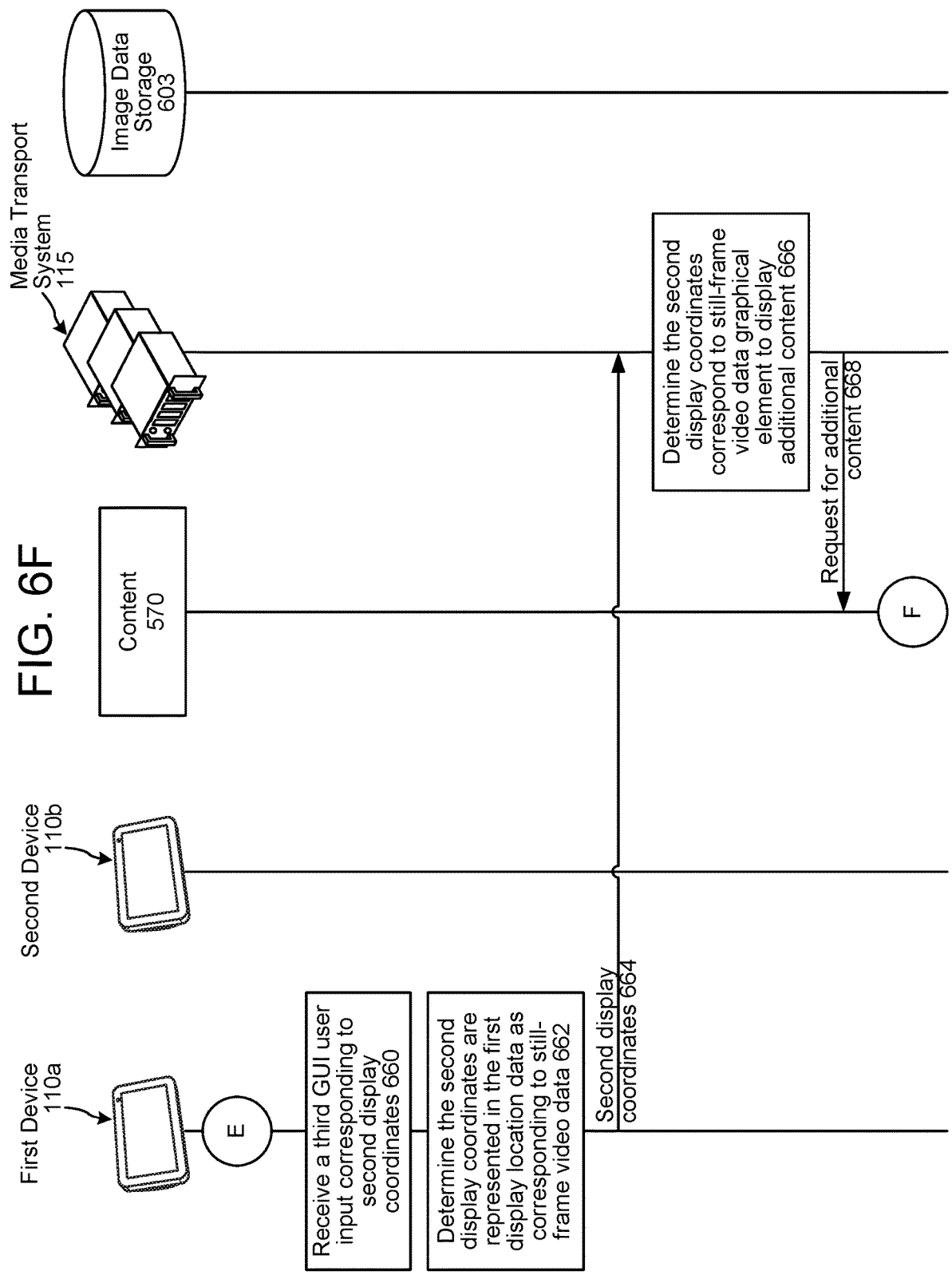

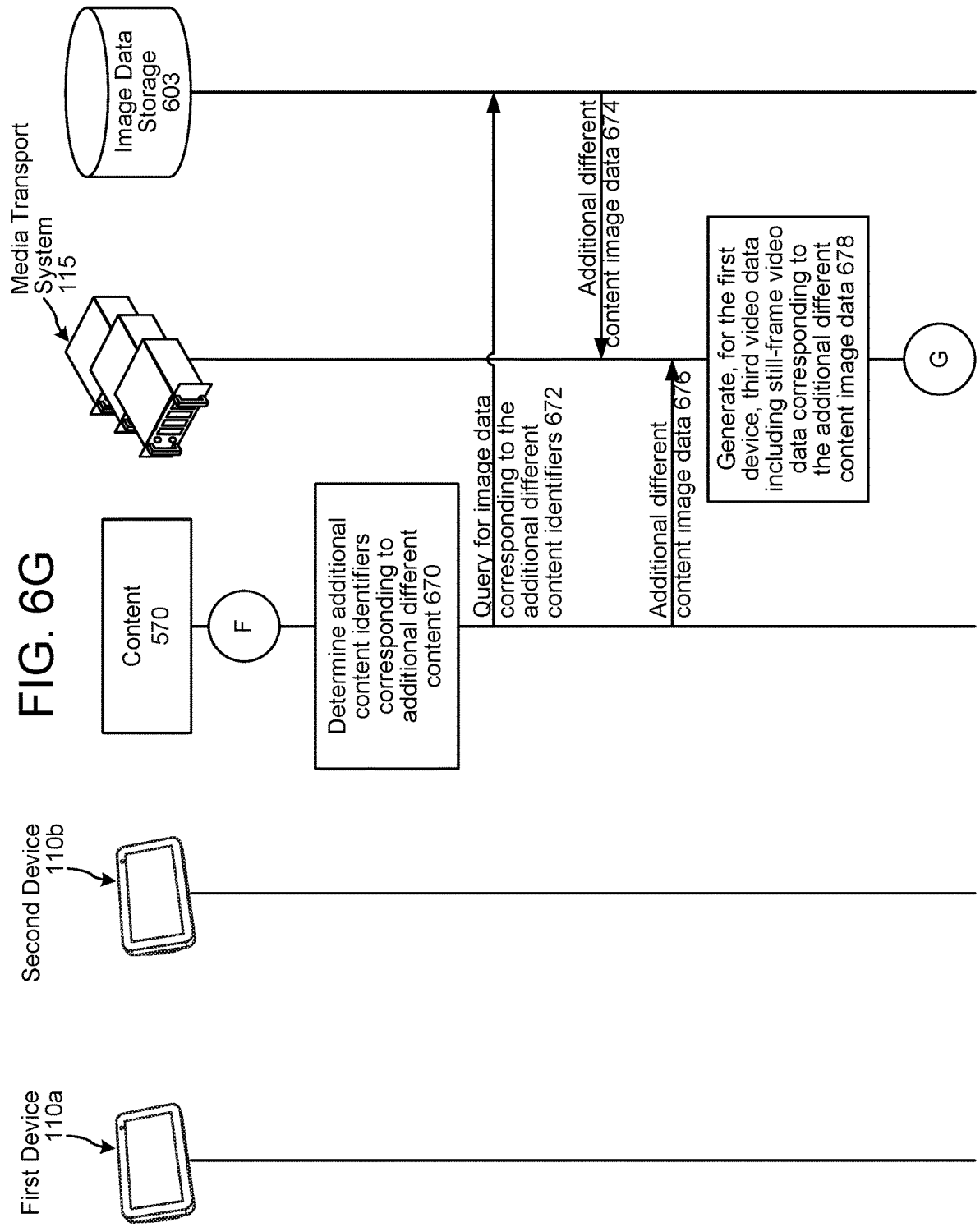

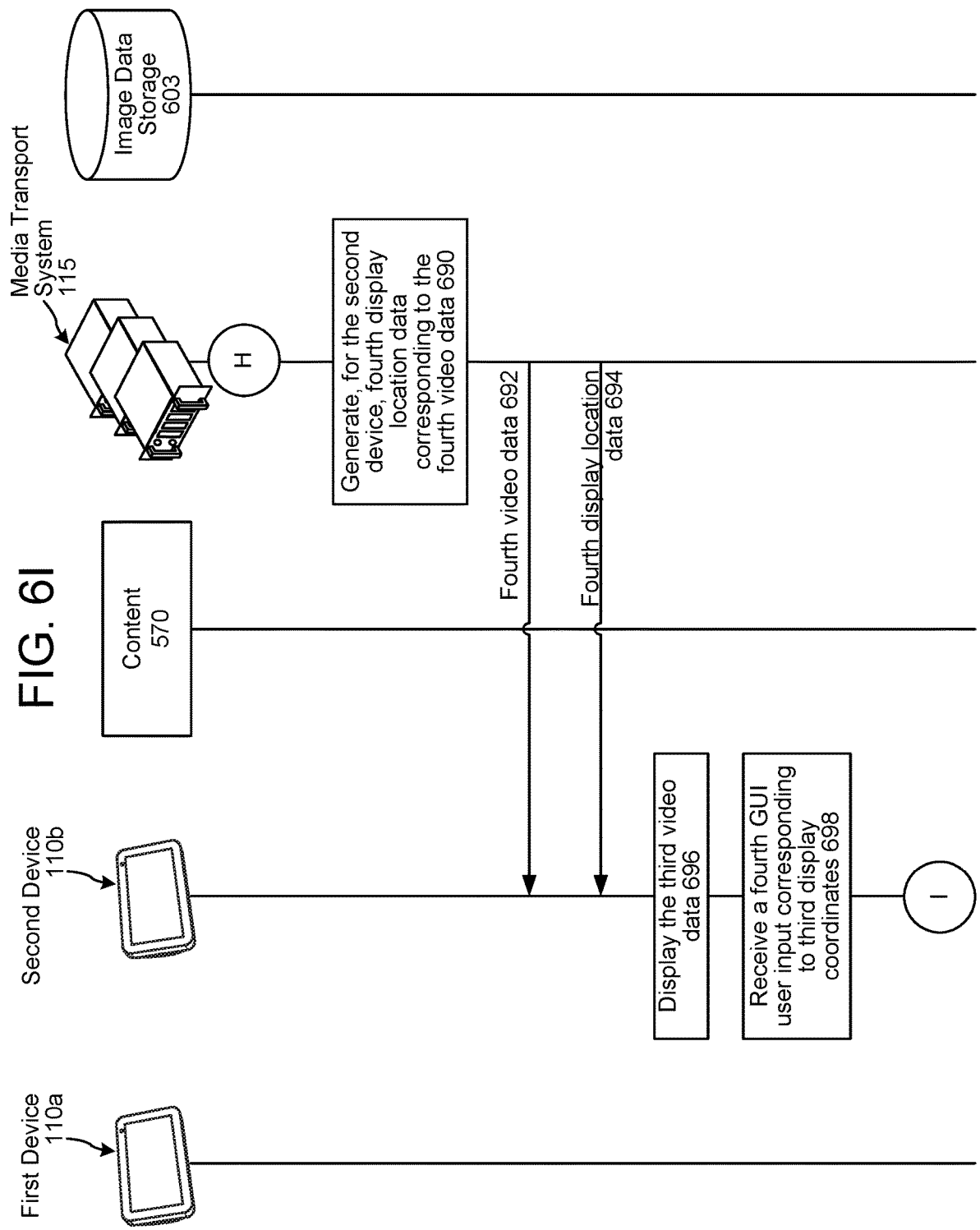

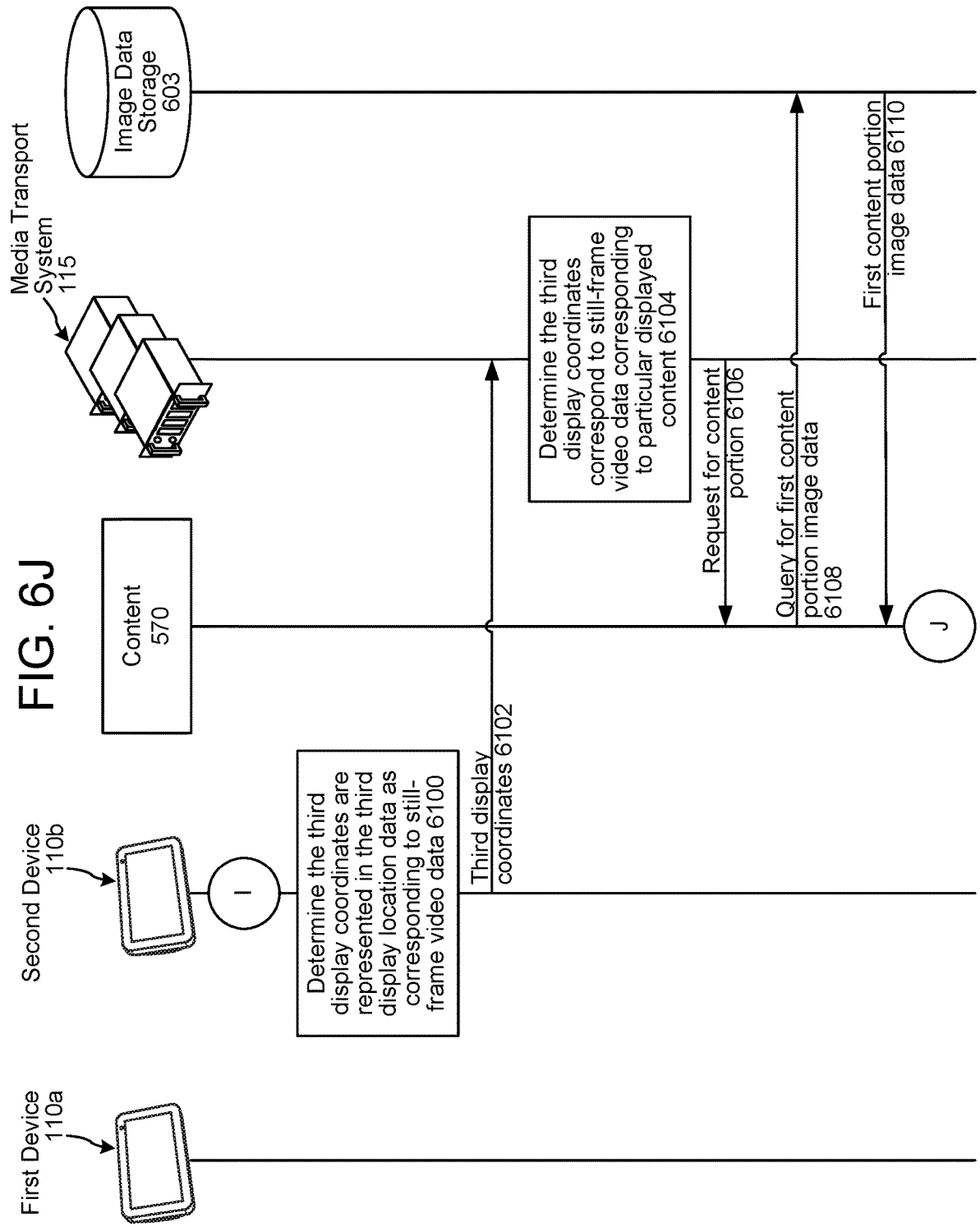

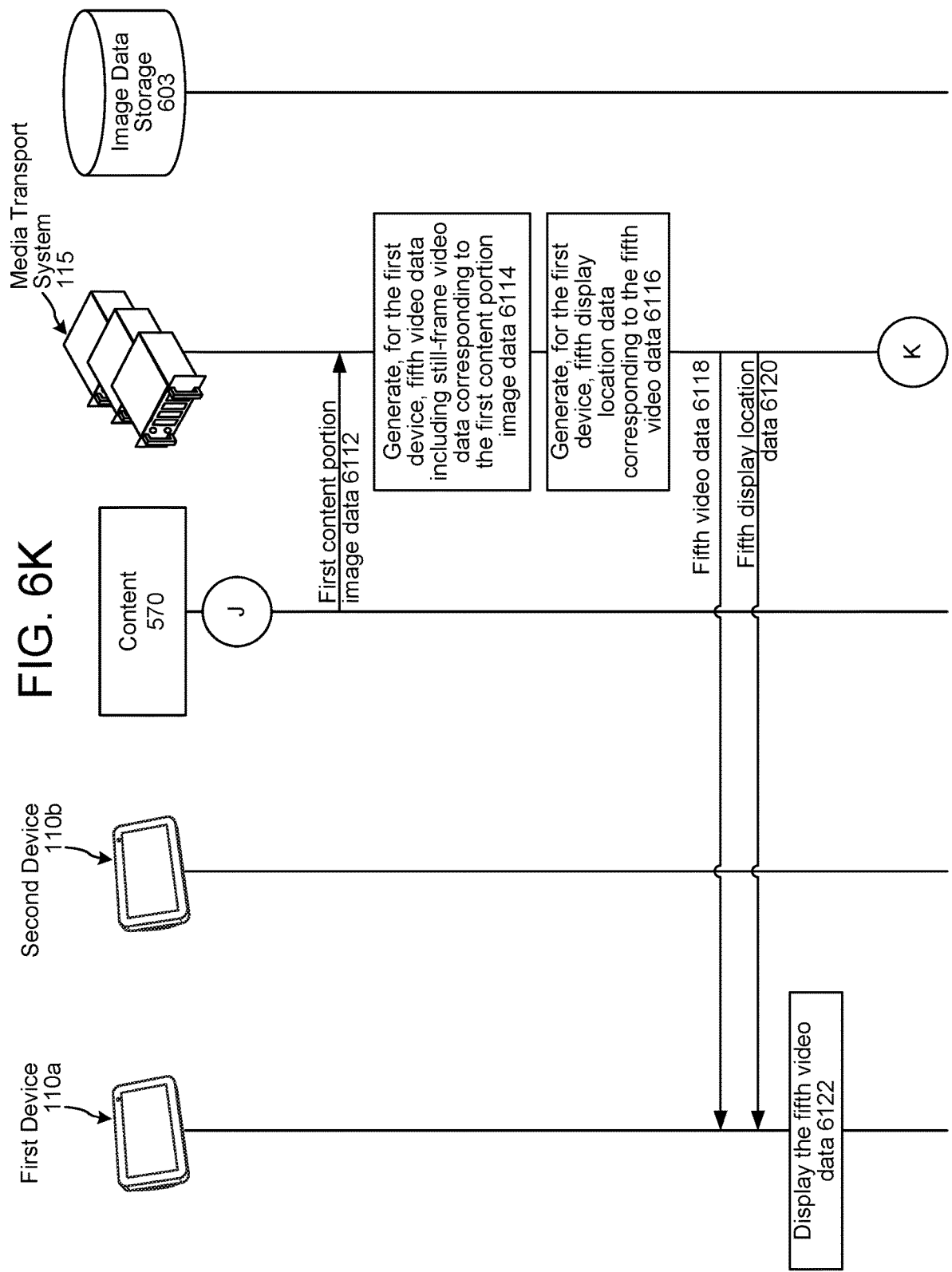

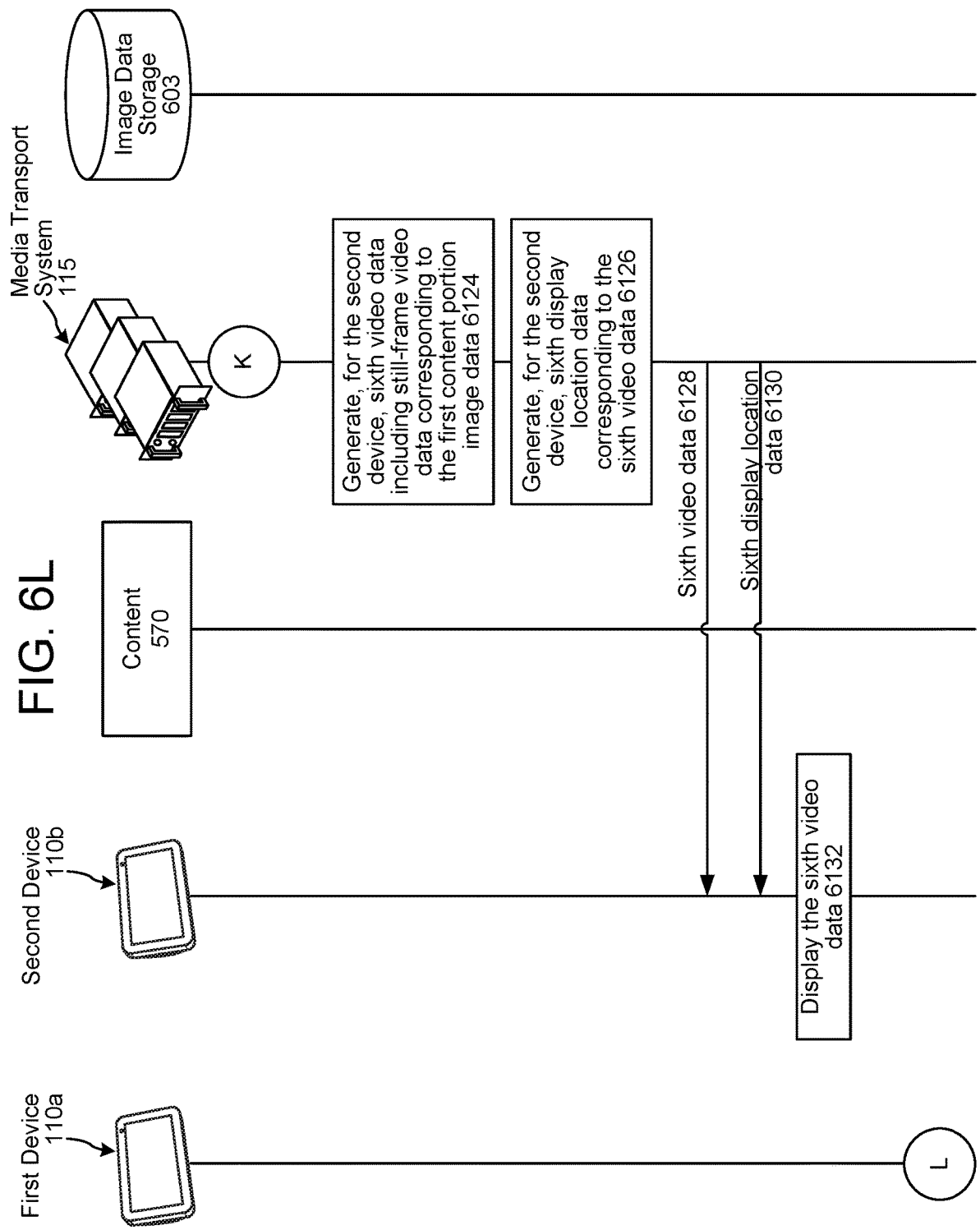

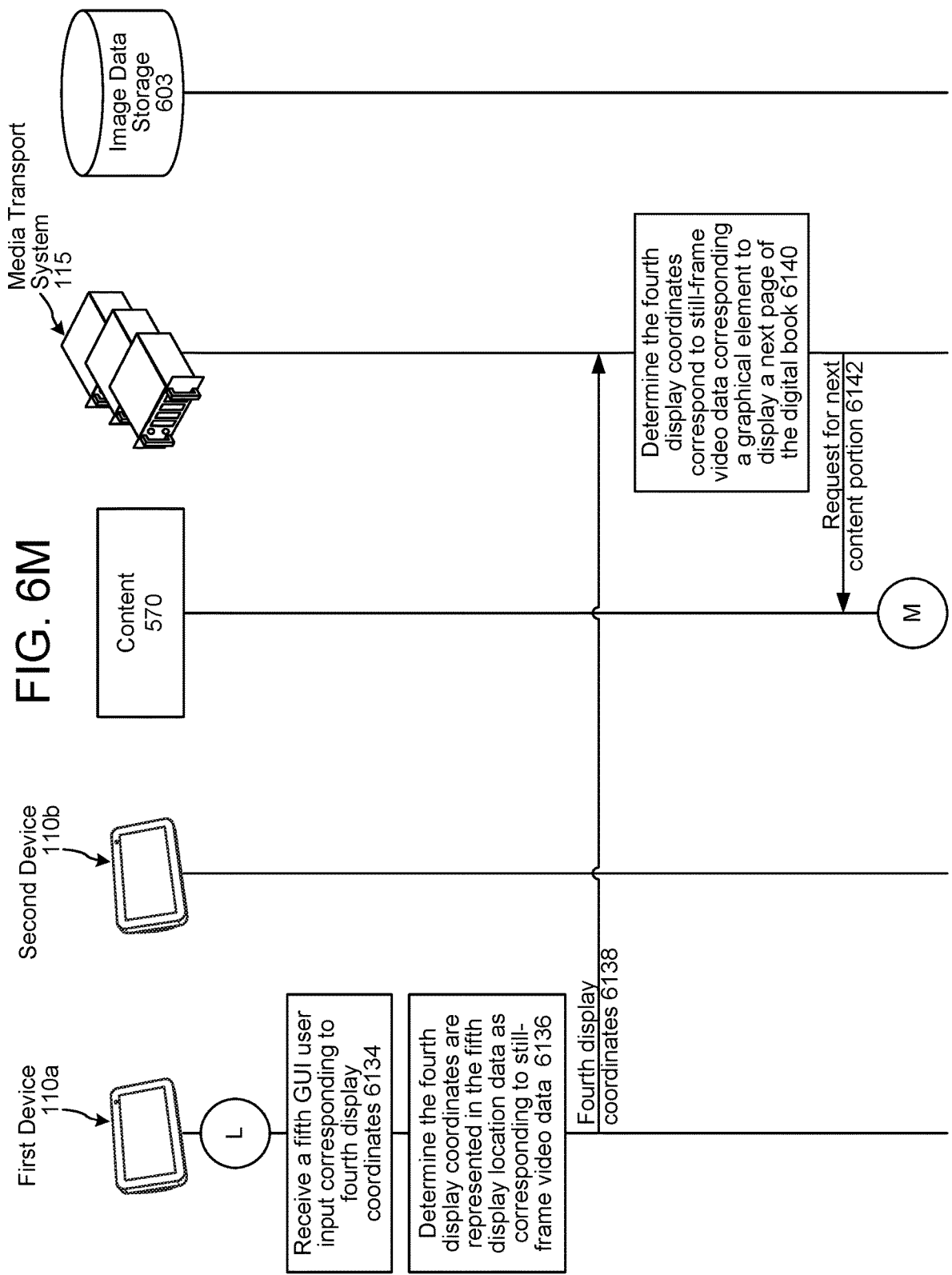

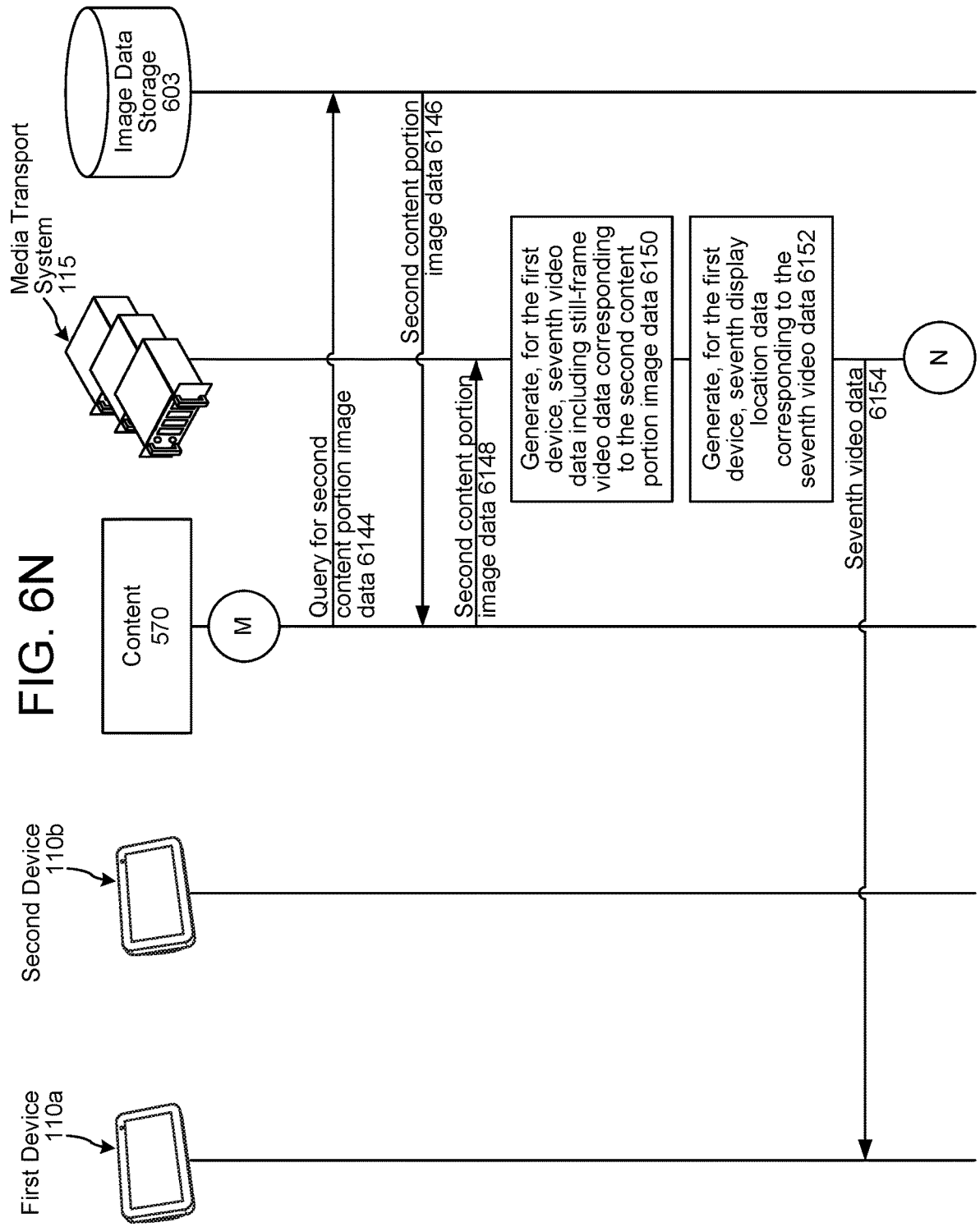

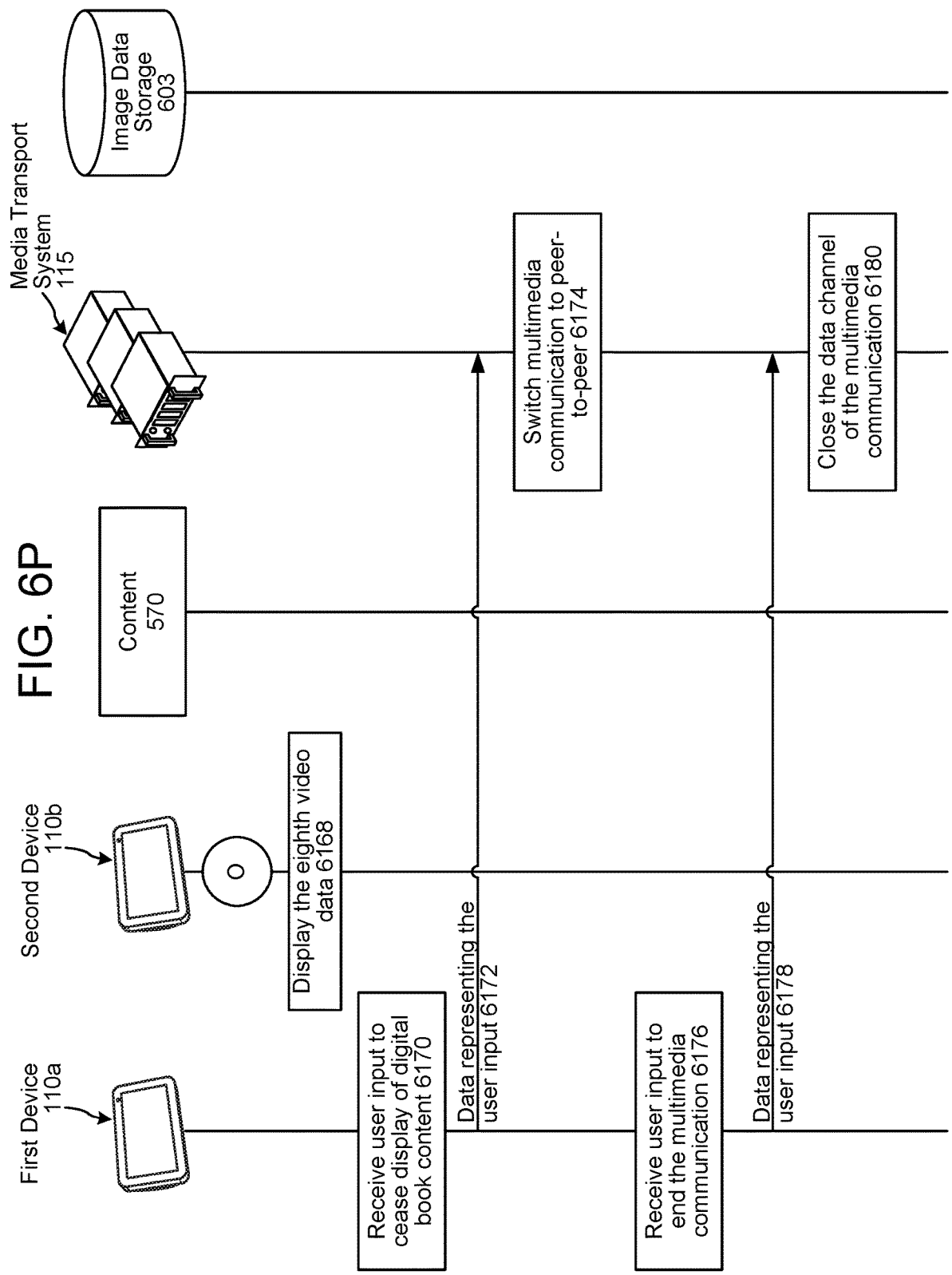

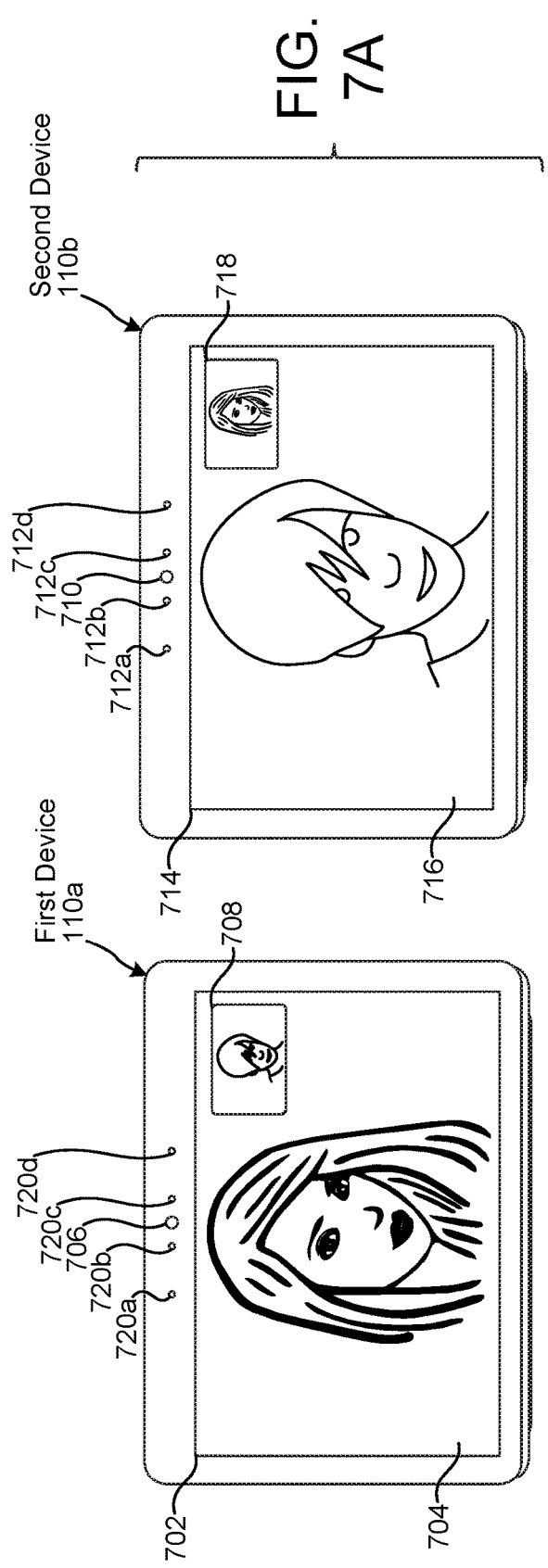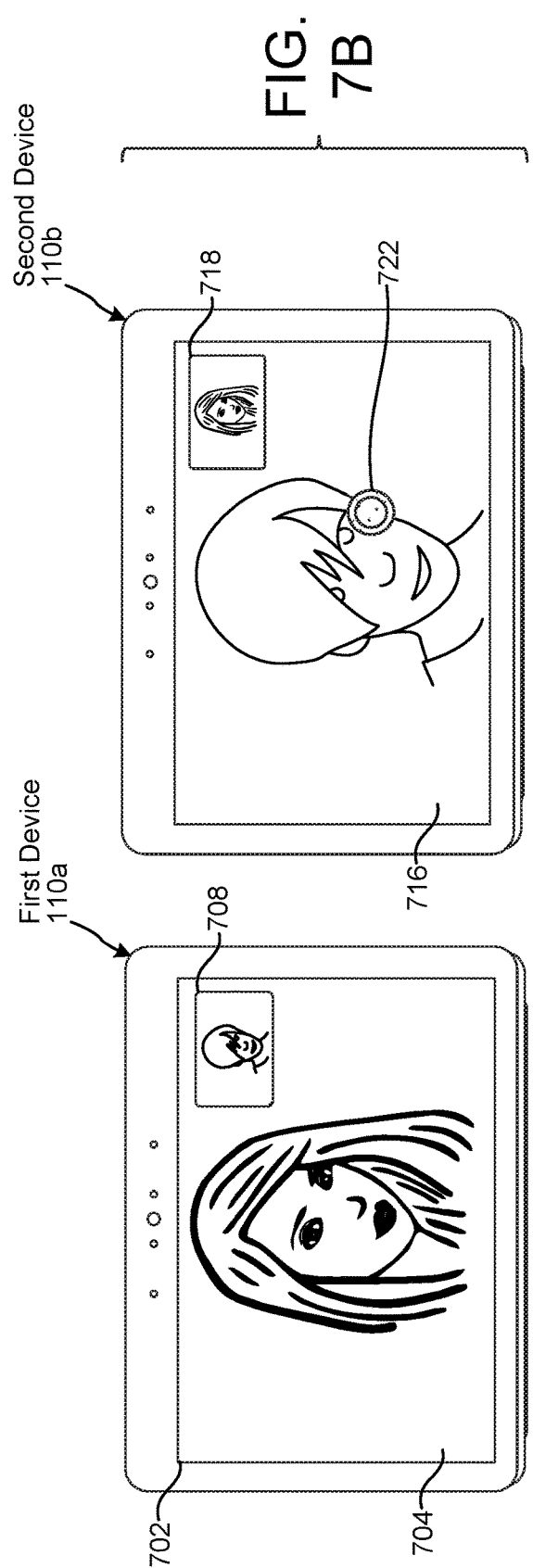

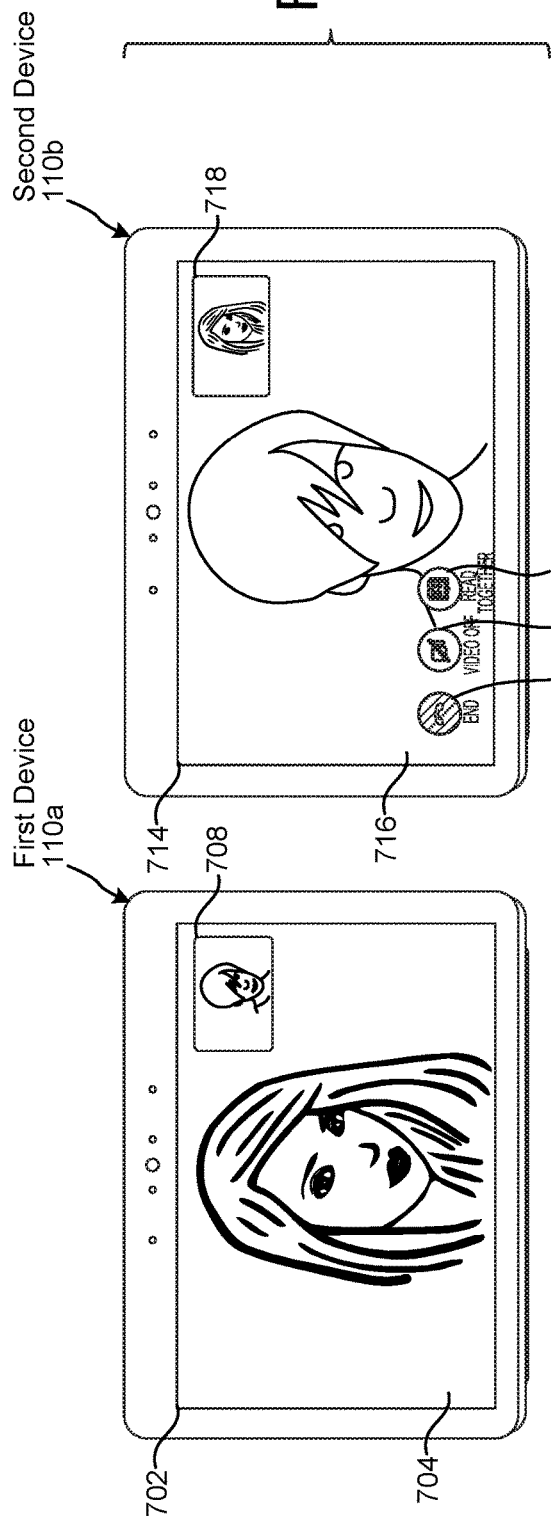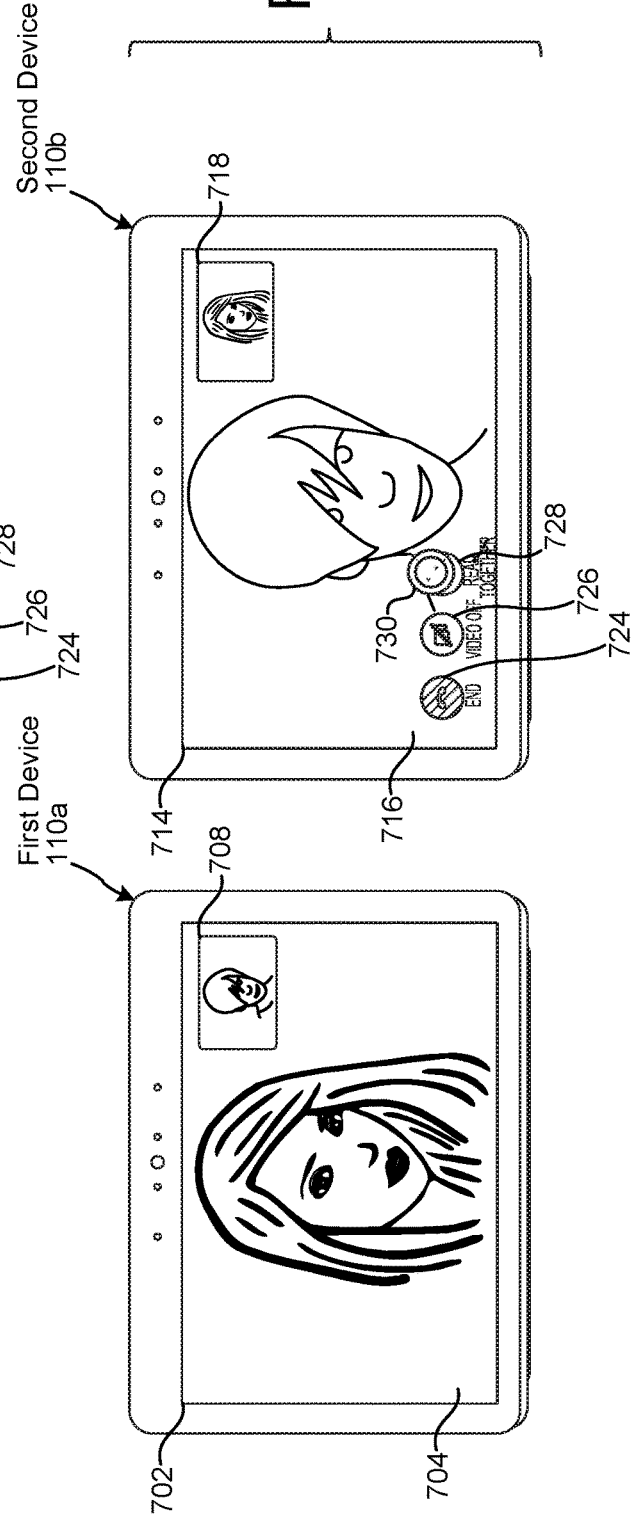

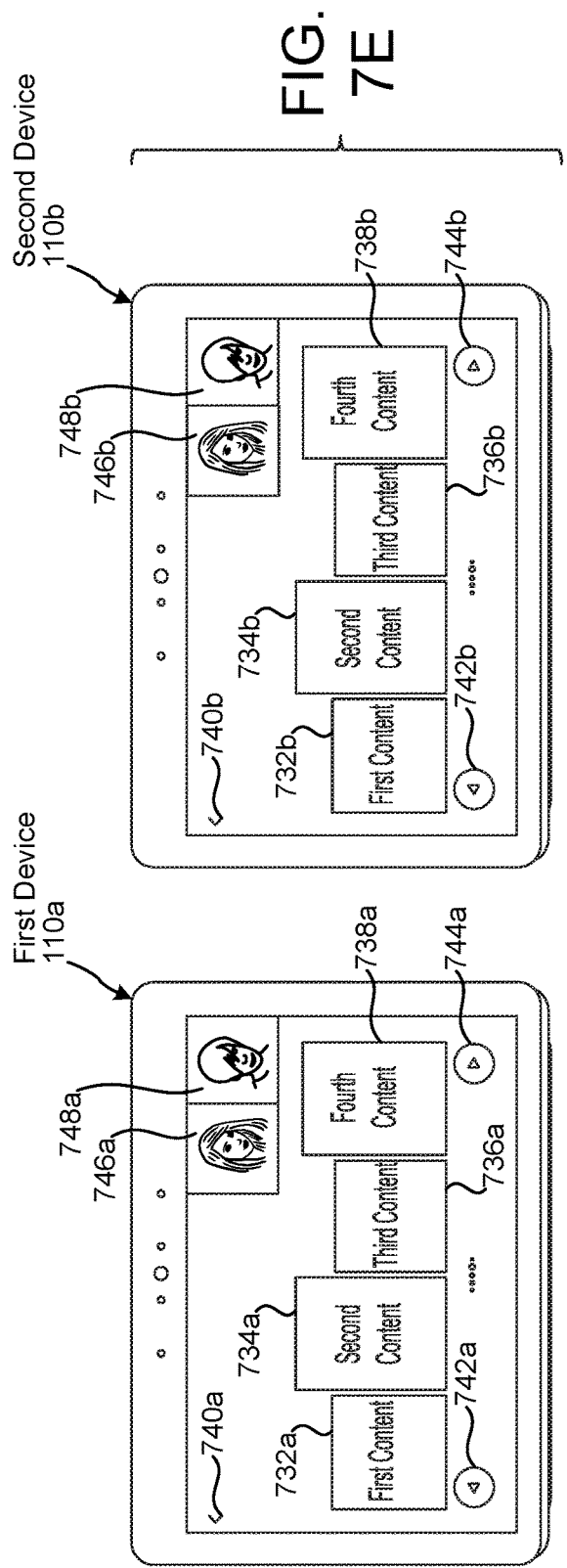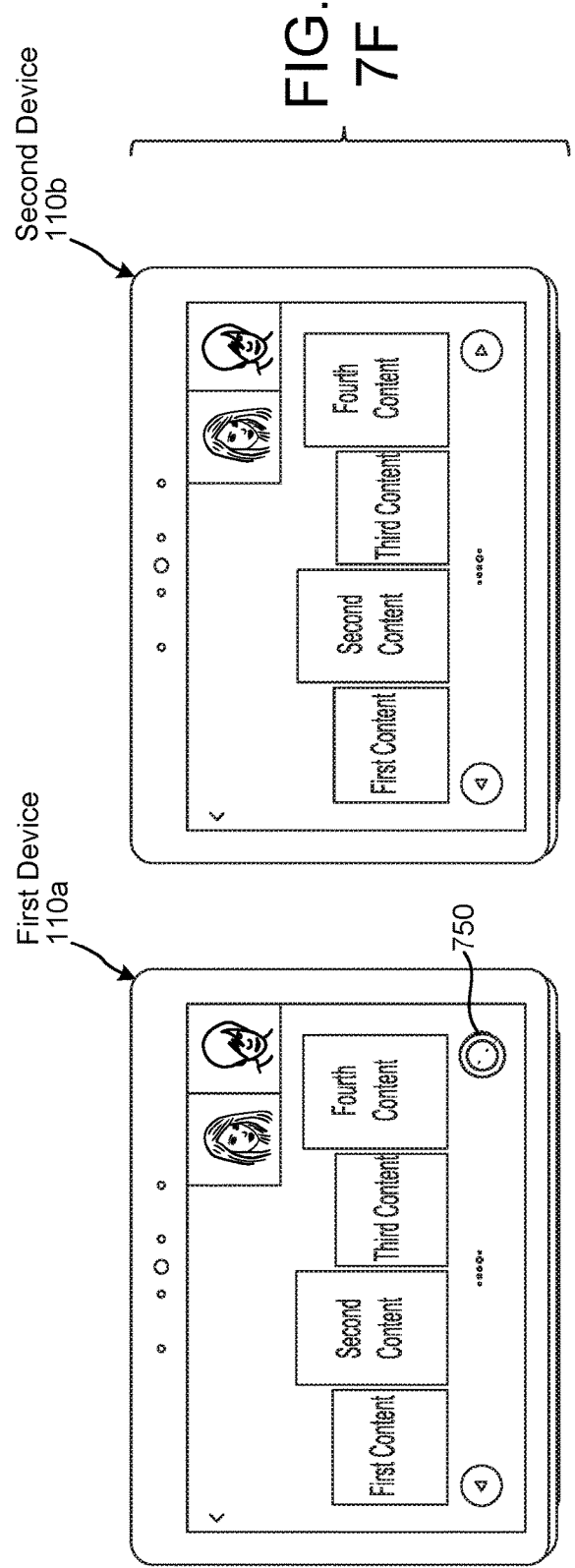

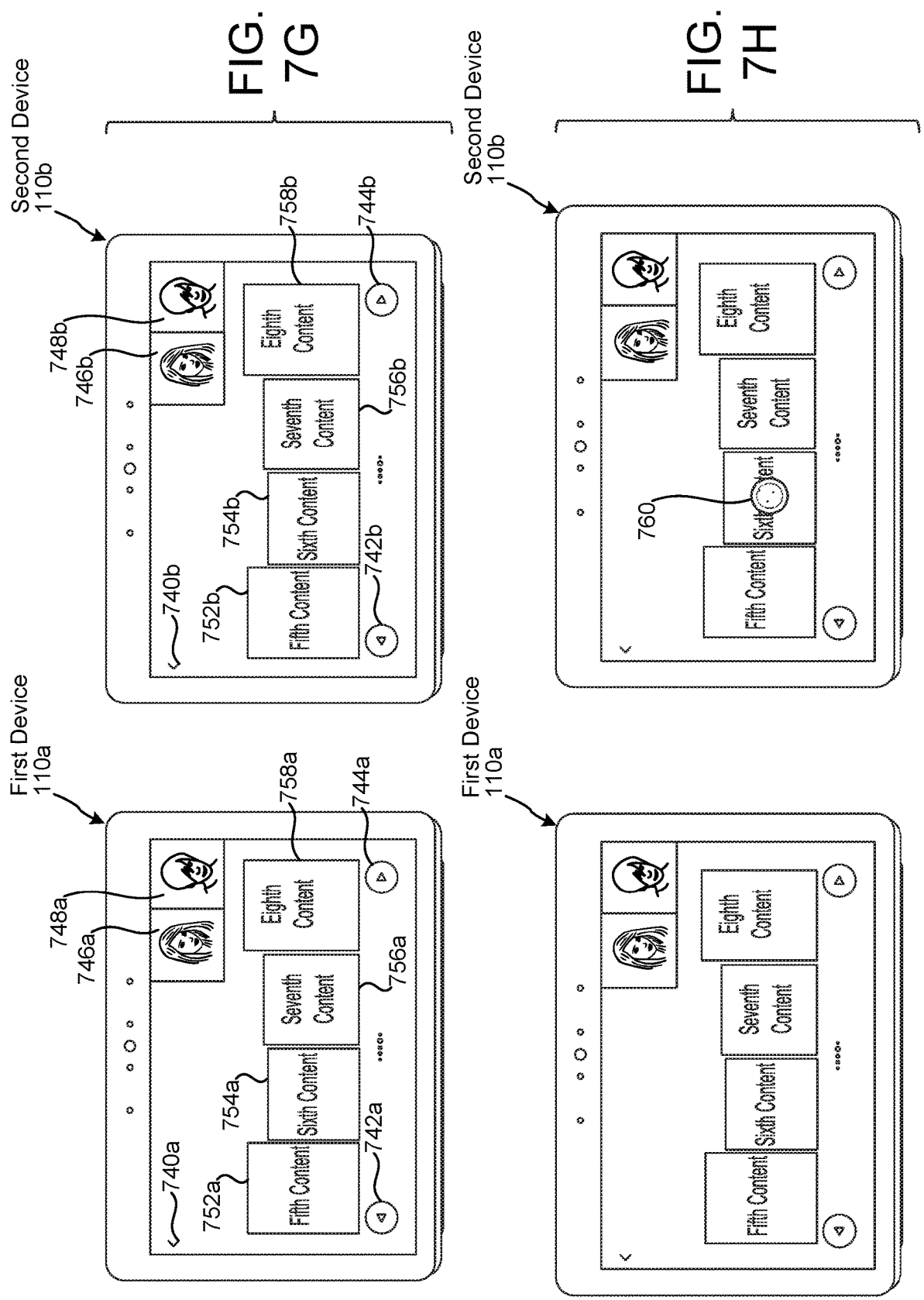

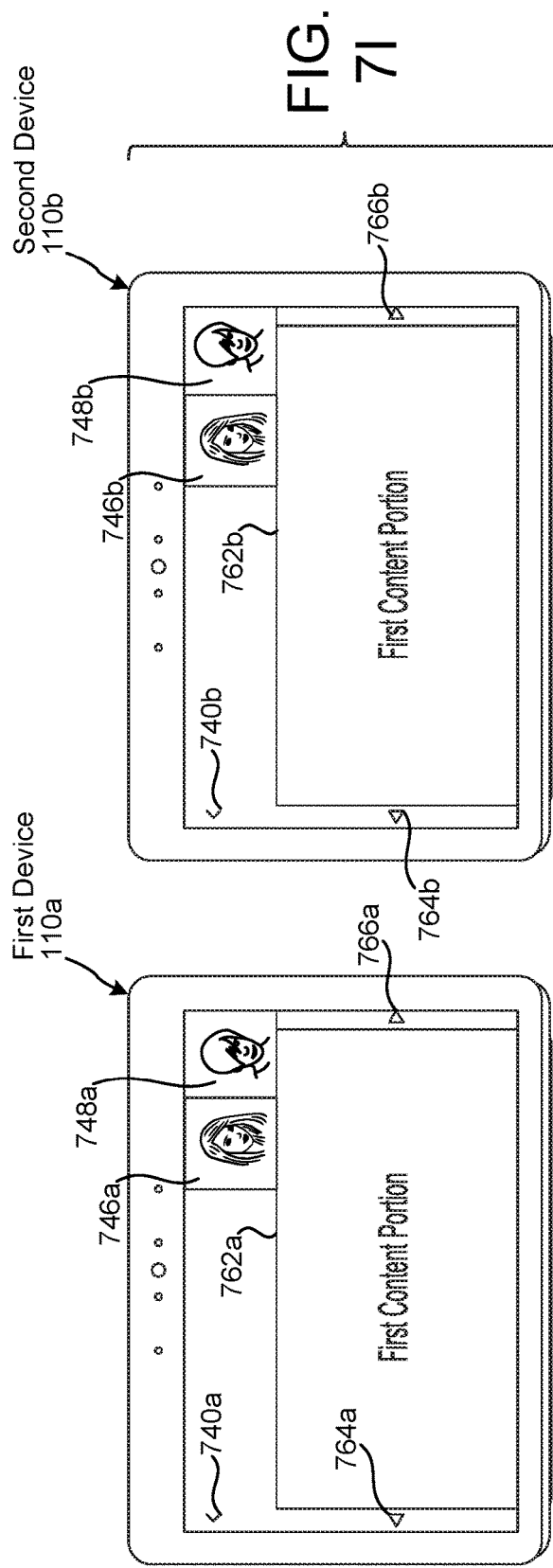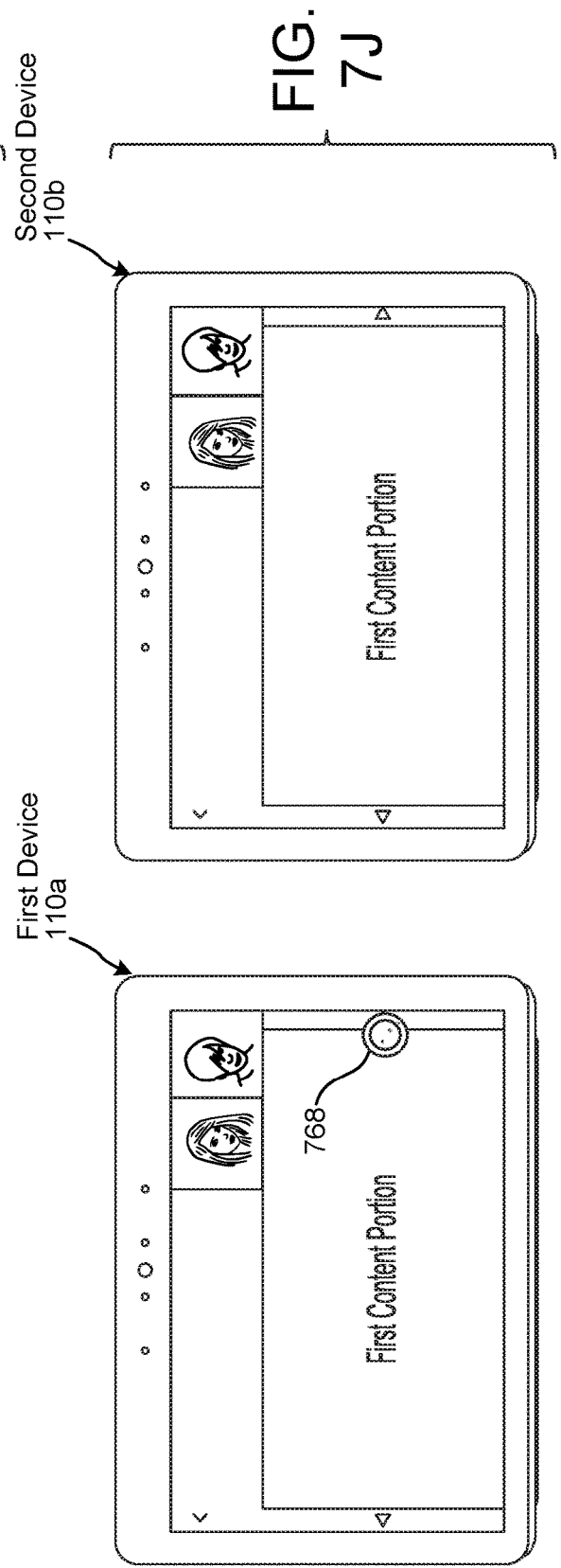

MULTIMEDIA COMMUNICATIONS WITH SYNCHRONIZED GRAPHICAL USER INTERFACES

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 is a conceptual diagram illustrating a system configured to perform a multimedia communication including audio and video, according to embodiments of the present disclosure.

FIG. 2 is a conceptual diagram of components of a system, according to embodiments of the present disclosure.

FIG. 3 is a conceptual diagram of components of a media transport system, according to embodiments of the present disclosure.

FIGS. 7A-7K illustrate how video may be synchronously displayed by devices during the multimedia communication of FIGS. 6A-6P, according to embodiments of the present disclosure.

DETAILED DESCRIPTION

Figure 4A:
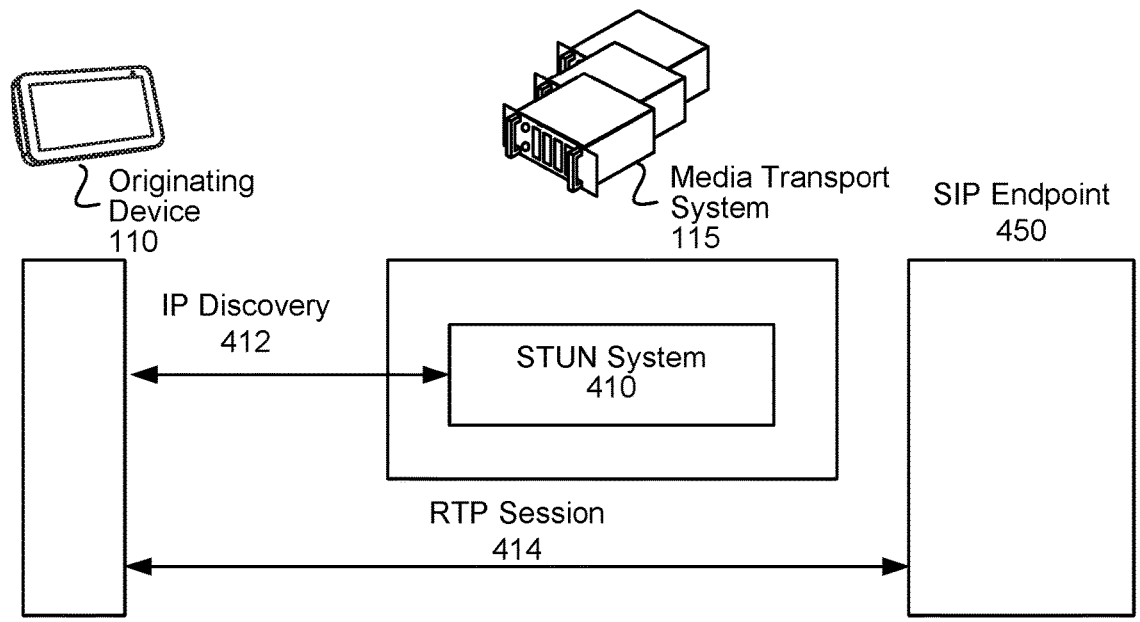
FIGS. 4A-4B illustrate examples of establishing multimedia communications between devices, according to embodiments of the present disclosure.

A system may be configured to perform multimedia communications. As used herein, a "multimedia communication" may refer to the synchronized sending of audio data and video data to two or more devices. For example, if the system receives the spoken natural language input "[wakeword], start a video call with grandma," the system may determine a contact list associated with the device that captured (or the user that spoke) the spoken natural language input, determine therein a contact entry corresponding to grandma, determine a device associated with the contact entry, and establish a two-way multimedia communication (including audio and video) between the (caller) device (that captured the spoken natural language input) and the (callee) device associated with the contact entry. The system may also perform the foregoing processing in response to a device detecting a user input (e.g., a touch input on a touchscreen) indicating a two-way multimedia communication is to be established with respect to a particular entry in a displayed contact list.

The present disclosure provides, among other things, systems, methods, and device for enabling display of content at user devices during a multimedia communication. While performing a two-way multimedia communication (i.e., involving a first user device and a second user device), the system may receive, from either of the user devices, data indicating a user input requesting display of content as part of the two-way multimedia communication. Thereafter, based on user preferences, previously viewed content by the user, and/or other information, a processing component of the system determines various content (e.g., various digital book covers, various digital photo album covers, various digital document title pages, various movie covers, etc.) for display as part of the two-way multimedia communication.

After the processing component determines the various content, the system of the present disclosure synchronously sends the same video content to each of the user devices of the two-way multimedia communication. For example, the system may synchronously send, to each user device, video content including a portion corresponding to a live video stream being captured by the first user device of the two-way multimedia communication, a portion corresponding to a live video stream being captured by the second user device of the two-way multimedia communication, still-frame video corresponding to the various content, and at least a first graphical element for manipulating display of the various content (e.g., for causing further digital book covers to be displayed, for causing further digital photo album covers to be displayed, for causing further digital document title pages to be displayed, for causing further movie covers to be displayed, etc.).

While displaying the various content, one of the users of the multimedia communication may provide a user input to display content corresponding to one of the displayed digital book covers, one of the displayed digital album covers, one of the displayed digital document title pages, one of the displayed movie covers, etc. In response, the processing component of the system may determine content corresponding to the selected portion of the various content, and the system may synchronously send the same video content to each of the user devices of the two-way multimedia communication. For example, the system may synchronously send, to each user device, video content including a portion corresponding to the live video stream being captured by the first user device, a portion corresponding to a live video stream being captured by the second user device, a portion corresponding to the determined content (e.g., a first page of a selected digital book cover, a first photo of a selected digital photo album cover, a first page of a selected digital document title page a movie corresponding to a selected movie cover, etc.), and at least a first graphical element for manipulating display of the content (e.g., for causing a next page of the digital book to be displayed, for causing a next photo of the digital photo album to be displayed, for causing a next page of the digital document to be displayed, for causing the movie to be paused, etc.).

As such, the teachings of the present disclosure, among other things, provide a beneficial user experience by using a processing component of a system to function as a participant of a multimedia communication in order to enable a synchronized multimedia communication experience that can be used by users, for example, to read books or documents, to view photos, or to ingest other content together.

FIG. 1 illustrates a system 100 configured to perform a multimedia communication including audio and video. Although the figures and discussion of the present disclosure illustrate certain steps in a particular order, the steps described may be performed in a different order (as well as certain steps removed or added) without departing from the present disclosure. As shown in FIG. 1, the system 100 may include a first device 110a (local to a first user 5a), a second device 110b (local to a second user 5b), and a media transport system 115 in communication across a network(s) 199. A single multimedia communication of the present disclosure may involve sending data (between devices 110) using one or more local-area networks (LANs), one or more wireless local-area networks (WLANs), one or more Metropolitan Area Networks, one or more Wide Area Networks, one or more Campus Area Networks, one or more mobile carrier systems, and/or the like.

The media transport system 115 receives (130) first data representing content (e.g., content of a digital book, content of a digital photo album, content of a digital media including different pages stored as different images, video content such as a movie, etc.) is to be displayed as part of a multimedia communication including audio and video. For example, a system 120 (described in detail below with respect to FIG. 2) may receive, from the first device 110a, audio data representing a spoken natural language input. The system 120 may perform a combination of ASR processing and NLU processing (or may perform SLU processing) on the audio data to determine first data representing the spoken natural language input requests establishment of a multimedia communication with a specific contact list entry (e.g., associated with the second device 110b), and that the multimedia communication is to include content. Alternatively, for example, while the media transport system 115 is performing a multimedia communication between the first device 110a and the second device 110b, the system 120 may receive audio data representing a spoken natural language input. The system 120 may perform a combination of ASR processing and NLU processing (or may perform SLU processing) on the audio data to determine first data representing content is to be displayed as part of the ongoing multimedia communication between the first device 110a and the second device 110b. Alternatively, for example, the system 120 may receive, from the first device 110a, first data representing a graphical user interface (GUI) user input (e.g., a touch input on a touchscreen, a click/press on a touchpad, a mouse click, etc.) requesting establishment of the multimedia communication with the specific contact list entry (e.g., being displayed on the GUI when the user input is received by the first device 110a), and that the multimedia communication is to include content. In each of the foregoing examples, the system 120 may send the first data to the media transport system 115. Alternatively, for example, the media transport system 115 may be performing a multimedia communication between the first device 110a and the second device 110b and, as part of the multimedia communication, may receive (from the first device 110a) first data representing a GUI user input requesting content be displayed as part of the ongoing multimedia communication between the first device 110a and the second device 110b.

After receiving the first data, the media transport system 115 may determine (132) a profile identifier associated with the first device 110a. In at least some embodiments, the profile identifier may be a user identifier specific to the user 5a. Determination of the user profile identifier may involve performing one or more types of user recognition processing using a user recognition component 295, as described herein below with respect to FIG. 2. In at least some other embodiments, the profile identifier may be a group profile identifier that is not specific to one particular user. For example, the group profile identifier may be associated with no user identifiers, or two or more user identifiers. In at least some instances, a group profile identifier may be referred to as a household profile identifier.

The media transport system 115 may determine (134) a plurality of content that is associated with the determined profile identifier. For example, the media transport system 115 may determine a plurality of digital book covers, a plurality of digital photo album covers, a plurality of images of different digital document title pages, a plurality of movie covers, etc.

In at least some embodiments, the media transport system may not determine the content (e.g., a plurality of digital book covers, plurality of digital photo album covers, plurality of movie covers, etc.) for display as part of the multimedia communication based on the content being associated with the profile identifier. In at least some embodiments, the device 110 that receives the user input (representing content is to be presented as part of the multimedia communication) may locally store content. In such embodiments, the system 120 may determine content (for display as part of the multimedia communication) from content that is locally stored on the device 110.

The media transport system 115 may thereafter configure the multimedia communication to include the plurality of content. As described in further detail below with respect to FIG. 5, the media transport system 115 may receive (136) first video data being output by at least a first camera of (or otherwise associated with) the first device 110a, and receive (138) second video data being output by at least a second camera of (or otherwise associated with) the second device 110b. As described in further detail below with respect to FIG. 5, the media transport system 115 may thereafter send (140), to the first device 110a, third video data including the first video data, the second video data, the plurality of content, and at least a first graphical element for manipulating display of the plurality of content. As described in further detail below with respect to FIG. 5, in sync with sending the third video data to the first device 110a for display, the media transport system 115 sends (142), to the second device 110b, fourth video data including the first video data, the second video data, the plurality of content, and the at least first graphical element. As a result of the media transport system 115 synchronously sending the third video data and the fourth video data to the first device 110*a* and the second device 110*b* respectively, the first device 110*a* and the second device 110*b* are able to simultaneously (or substantially simultaneously) present the same video content as part of the multimedia communication, where the video content includes the content and the live video streams captured at each of the user devices 110*a*/110*b*.

Content, as used herein, may include, but is not limited to, images representing digital book covers, images representing pages of digital books, images representing pages of a digital document, images in a digital photo album, images representing web pages, images representing a display screen, images representing other types of media or content, and video not corresponding to a live video stream being captured by a device of the multimedia communication (e.g., video corresponding to a movie).

Although FIG. 1 and the related description relate to establishing a multimedia communication between two devices 110*a*/110*b*, it will be understood that a multimedia communication can be established between more than two devices 110 in a similar manner, where each of the devices 110 displays content synchronously and includes content and video captured at each of the devices 110.

Moreover, although FIG. 1 and the related description relate to each device 110 of a multimedia communication displaying video data received from a camera(s) of or otherwise associated with each other device of the multimedia communication, it will be understood that, for example, in a two-device 110 multimedia communication, the first device 110*a* may display video data received from a camera(s) of or otherwise associated with the second device 110*b*, but the second device 110*b* may not display video data received from a camera(s) of or otherwise associated with the first device 110*a*. Such situation may result from the first device 110*a* not including or otherwise being associated with a camera(s), or from a camera(s) of or otherwise associated with the first device 110*a* being at least temporarily disabled during the multimedia communication Furthermore, there may be situations where, while content is displayed during a multimedia communication, no device 110 displays video data received from a camera(s) of or otherwise associated with any device 110 of the multimedia communication. As a result, each device 110 of the multimedia communication may simply display video data corresponding to the content, and output audio data received from the other device(s) 110 of the multimedia communication.

The system 100 may operate using various components as illustrated in FIG. 2. The various components may be located on a same or different physical devices. Communication between various components may occur directly or across a network(s) 199.

A microphone or array of microphones (of or otherwise associated with a device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may determine if the speech is directed at the device 110/system 120. In at least some embodiments, such determination may be made using a wakeword detection component 220. The wakeword detection component 220 may be configured to detect various wakewords. In at least some examples, each wakeword may correspond to a different digital assistant. In at least some examples, a wakeword may correspond to a name of a digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio 11, to the system 120. The audio data 211 may include data corresponding to the detected wakeword, or the device 110 may remove the portion of the audio corresponding to the detected wakeword prior to sending the audio data 211 to the system 120.

The system 120 may include an orchestrator component 230 configured to receive the audio data 211 from the device 110. The orchestrator component 230 may send the audio data 211 to an ASR component 250.

The ASR component 250 transcribes the audio data 211 into ASR output data including one or more ASR hypotheses. ASR output data may include one or more textual interpretations (corresponding to one or more ASR hypotheses), or may be configured in another manner, such as one or more tokens. Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 may send the ASR output data to an NLU component 260 of the system 120 (either directly or via the orchestrator component 230).

The NLU component 260 processes the ASR output data to determine one or more NLU hypotheses embodied in NLU output data. The NLU component 260 may perform intent classification (IC) processing on the ASR output data to determine an intent of the spoken natural language input. An intent corresponds to an action to be performed that is responsive to the natural language input. To perform IC processing, the NLU component 260 may communicate with a database of words linked to intents. For example, a music intent database may link words and phrases such as "quiet," "volume off," and "mute" to a <Mute> intent. The NLU component 260 identifies potential intents by comparing words and phrases in ASR output data to the words and phrases in an intents database. In at least some embodiments, the NLU component 260 may communicate with multiple intents databases, with each intents database corresponding to one or more intents associated with a particular skill.

For example, IC processing of the spoken natural language input "play my workout playlist" may determine an intent of <PlayMusic>. For further example, IC processing of the spoken natural language input "call mom" may determine an intent of <Call>. In another example, IC processing of the spoken natural language input "call mom using video" may determine an intent of <VideoCall>. In yet another example, IC processing of the spoken natural language input "what is today's weather" may determine an intent of <OutputWeather>.

The NLU component 260 may also perform named entity recognition (NER) processing on the ASR output data to determine one or more portions (which may be referred to as one or more slots) of the spoken natural language input that may be needed for post-NLU processing (e.g., processing performed by a skill). For example, NER processing of the spoken natural language input "play [song name]" may determine a slot corresponding to "SongName: [song name]." For further example, NER processing of the spoken natural language input "call mom" may determine a slot corresponding to "Recipient: Mom." In another example, NER processing of the spoken natural language input "what is today's weather" may determine slot corresponding to "Date: Today."

In at least some embodiments, the intents identifiable by the NLU component 260 may be linked to one or more grammar frameworks with "slots" to be filled. Each slot of a grammar framework corresponds to a portion of ASR output data that the NLU component 260 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 260 may perform NER processing to identify words in ASR output data as subject, object, verb, preposition, etc. based on grammar rules and/or models. Then, the NLU component 260 may perform IC processing that involves using the identified verb to identify an intent. Thereafter, the NLU component 260 may again perform NER processing to determine a grammar model associated with the identified intent. For example, a grammar model for a <PlayMusic> intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 260 may generate NLU output data including one or more NLU hypotheses, with each NLU hypothesis including the intent and slot(s) determined from IC processing and NER processing of the ASR output data. In at least some embodiments, the NLU component 260 may perform IC processing and NLU processing with respect to different skills. One skill may support the same or different intents than another skill. Thus, the NLU output data may include multiple NLU hypotheses, with each NLU hypothesis corresponding to IC processing and NER processing performed on the ASR output data with respect to a different skill.

As described above, the system 120 may perform speech processing using two different components (e.g., the ASR component 250 and the NLU component 260). In at least some embodiments, the system 120 may implement a spoken language understanding (SLU) component 255 configured to process audio data 211 to generate NLU output data.

The SLU component 255 may be equivalent to a combination of the ASR component 250 and the NLU component 260. Yet, the SLU component 255 may process audio data 211 and directly generate the NLU output data, without an intermediate step of generating ASR output data. As such, the SLU component 255 may take audio data 211 representing speech and attempt to make a semantic interpretation of the speech. That is, the SLU component 255 may determine a meaning associated with the speech and then implement that meaning. For example, the SLU component 255 may interpret audio data 211 representing speech from the user 5 in order to derive a desired action. The SLU component 255 may output a most likely NLU hypothesis, or multiple NLU hypotheses associated with respective confidence or other scores (such as probability scores, etc.).

The NLU component 260 (or the SLU component 255 depending on configuration of the system 120) may send the NLU output data to the orchestrator component 230. The orchestrator component 230 may send the top-scoring NLU hypothesis (in the NLU output data) to a skill associated with the NLU hypothesis.

The system 120 may include one or more skill components 290 and/or may communicate with one or more skill systems 125 via one or more skill components 290. As used herein, a "skill" may refer to a skill component 290, a skill system 125, or a combination of a skill component 290 and a skill system 125. A skill may be configured to execute with respect to NLU output data. For example, for an NLU hypothesis including a <GetWeather> intent, the system 120 (and more particularly the orchestrator component 230) may invoke a weather skill to determine and output weather information for a geographic location represented in a user profile or corresponding to a location of the device 110 that captured the corresponding natural language input. For further example, for an NLU hypothesis including a <BookRide> intent, the system 120 (and more particularly the orchestrator component 230) may invoke a taxi skill to book a requested ride. In another example, for an NLU hypothesis including a <BuyPizza> intent, the system 120 (and more particularly the orchestrator component 230) may invoke a restaurant skill to place an order for a pizza. A skill may operate in conjunction between the system 120 and other devices, such as the device 110, restaurant electronic ordering systems, taxi electronic booking systems, etc. in order to complete certain functions. Inputs to a skill may come from speech processing interactions or through other interactions or input sources.

A skill may be associated with a domain, a non-limiting list of which includes a smart home domain, a music domain, a video domain, a weather domain, a communications domain, a flash briefing domain, a shopping domain, and a custom domain.

The system 120 may include a TTS component 280 that generates audio data (e.g., synthesized speech) from text data using one or more different methods. Text data input to the TTS component 280 may come from a skill, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The system 120 may include a user recognition component 295. The user recognition component 295 may recognize one or more users using various data. The user recognition component 295 may take as input the audio data 211. The user recognition component 295 may perform user recognition by comparing speech characteristics, in the audio data 211, to stored speech characteristics of users (e.g., stored speech characteristics associated with user profile identifiers associated with the device 110 that generated the audio data 211). The user recognition component 295 may additionally or alternatively perform user recognition by comparing biometric data (e.g., fingerprint data, iris data, retina data, etc.), received by the system 120 in correlation with a natural language input, to stored biometric data of users (e.g., stored biometric data associated with user profile identifiers associated with the device 110 that generated the audio data 211 or otherwise captured a user input). The user recognition component 295 may additionally or alternatively perform user recognition by comparing image data (e.g., including a representation of at least a feature of a user), received by the system 120 in correlation with a natural language input, with stored image data including representations of features of different users (e.g., stored image data associated with user profile identifiers associated with the device 110 that generated the audio data 211 or otherwise captured a user input). The user recognition component 295 may perform other or additional user recognition processes, including those known in the art. For a particular user input, the user recognition component 295 may perform processing with respect to stored data of users associated with the device 110 that captured the user input.

The user recognition component 295 determines whether a user input originated from a particular user. For example, the user recognition component 295 may generate a first value representing a likelihood that a user input originated from a first user, a second value representing a likelihood that user input originated from a second user, etc. The user recognition component 295 may also determine an overall confidence regarding the accuracy of user recognition processing.

The user recognition component 295 may output a single user identifier corresponding to the most likely user that originated the user input. Alternatively, the user recognition component 295 may output multiple user identifiers (e.g., in the form of an N-best list) with respective values representing likelihoods of respective users originating the user input. The output of the user recognition component 295 may be used to inform NLU processing, processing performed by a skill, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 270 may include one or more user profiles. Each user profile may be associated with a different user identifier/user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language inputs. If a user does not enable a skill, the system 120 may not invoke the skill to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier/device profile identifier. A device profile may include various device identifying data, input/output characteristics, networking characteristics, etc. A device profile may also include one or more user identifiers/user profile identifiers, corresponding to one or more user profiles associated with the device profile. For example, a household device's profile may include the user identifiers of users of the household.

In at least some situations, the system 120 may receive (from a device 110) GUI user input data 213 representing a user input with respect to a displayed GUI of the device 110. The GUI user input data 213 may be sent to the orchestrator component 230 for processing.

The orchestrator component 230 may determine that NLU output data (representing a spoken natural language input) or the GUI user input data 213 indicates a multimedia communication (including audio and video) is to be established. In such instances, the orchestrator component 230 may determine the device identifiers of the devices 110 to be involved in the multimedia communication (and/or other device identifying data), and send the device identifiers (and/or other device identifying data) to the media transport system 115.

Generally, the media transport system 115 may be a modular platform that enables media applications to have custom media processing pipelines that run within the media transport system 115. Each pipeline may consist of a chain of processing elements that each perform a specific function, such as decoding of a media stream, merging two stream together, or adding an audio filter. Each pipeline may be run in a different media processing unit (MPU) of the media transport system 115.

FIG. 3 illustrates example components of the media transport system 115. As illustrated in FIG. 3, a communications skill component 290a (e.g., a skill component specifically configured to support multimedia communications between devices 110) may interact with the media transport system 115 to request and utilize resources available within the media transport system 115. For example, the communications skill component 290a may correspond to an application (e.g., process, skill, and/or the like) running on a local device (e.g., device 110) and/or one or more servers, and the communications skill component 290a may enable a user 5 to interact with the media transport system 115 to initiate and manage a multimedia communication involving media processing, although the disclosure is not limited thereto. To illustrate an example, the user 5 may input a command to an application programming interface (API) for the communications skill component 290a that is running on the device 110. The device 110 may send a request corresponding to the command to one or more servers associated with the communications skill component 290a, and the one or more servers may send the request to the media transport system 115.

The communications skill component 290a may communicate with a media session orchestrator (MESO) component 310 of the media transport system 115. The MESO component 310 is configured to coordinate (e.g., define, establish, manage, etc.) multimedia communications involving the communication of content during a multimedia communication. As illustrated in FIG. 3, the MESO component 310 may interface between components that fall within four distinct categories: media processing components 320, media routing components 330, and/or gateway components 350.

The media processing components 320 are configured to process media content to enable unique functionality. For example, the media transport system 115 may provide a hosted back-end that performs media processing on individual streams of data, enabling the communications skill component 290a to define and control how media content is processed by the media transport system 115. The media processing components 320 may correspond to real time processing (e.g., data is processed during run-time, such as while streaming video to a user 5, during a videoconference, and/or the like) or offline processing (e.g., data is processed and stored in a database for future requests, such as during batch processing) without departing from the present disclosure.

The media processing components 320 may include at least one media control component 322 and/or at least one media processing unit (MPU) 324 (e.g., a first MPU 334a, a second MPU 324b, etc.). The media control component 322 may coordinate media processing by sending control data to and/or receiving control data from other components within the media transport system 115. For example, the MESO component 310 may send a request to the media control component 322 to launch a specific application (e.g., skill, process, etc.) to perform media processing, and the media control component 322 may send an instruction to a corresponding MPU 324.

The MPU 324 may be configured to perform media processing to enable additional functionality. Thus, the MPU 324 may receive first data and process the first data to generate second data. As part of performing media processing, the MPU 324 may perform speech processing on audio data and/or image data, perform computer vision processing on image data, modify audio data and/or image data, apply visual effects (e.g., overlay or other graphical element(s)) to image data, and/or the like to enable interesting functionality during a multimedia communication. For example, the MPU 324 may generate subtitles (e.g., text data) corresponding to speech represented in image data, may translate the subtitles to a different language, may perform text-to-speech processing to enable additional functionality (e.g., describing visual cues for someone that is visually impaired, replacing dialog with speech in a different language, etc.), may perform voice recognition to identify voices represented in audio data, may perform facial recognition to detect and/or identify faces represented in image data, may perform object recognition to detect and/or identify objects represented in image data, may add a graphical overlay to image data (e.g., censoring portions of the image data, adding symbols or cartoons to the image data, adding images of a digital book to image data of a multimedia communication, adding images of a digital photo album to image data of a multimedia communication, adding images of pages of a digital document to image data of a multimedia communication, etc.), may perform other processing to media content (e.g., colorize black and white movies), and/or the like without departing from the disclosure.

In some examples, the media transport system 115 may perform media processing using two or more MPUs 324. For example, the media transport system 115 may perform (as part of a single multimedia communication) first media processing using a first MPU 324a and perform second media processing using a second MPU 324b. To illustrate an example, the media transport system 115 may perform media processing in parallel for a multimedia communication including image data and audio data. For example, the media transport system 115 may separate the image data and the audio data, perform first media processing on the image data (e.g., using a first MPU 324a) and separately perform second media processing on the audio data (e.g., using a second MPU 324b), before combining the processed image data and the processed audio data to generate output data. However, the disclosure is not limited thereto, and in other examples the media transport system 115 may perform media processing in series without departing from the present disclosure. For example, the media transport system 115 may process first image data using a first MPU 324a (e.g., first media processing) to generate second image data, and may process the second image data using a second MPU 324b (e.g., second media processing) to generate output image data. Additionally or alternatively, the media transport system 115 may perform multiple media processing steps using a single MPU 324 without departing from the present disclosure.

The media transport system 115 may include media routing components 330 configured to route media (e.g., send data packets) to and from the device(s) 110 via the network(s) 199. For example, the media routing components 330 may include one or more routing control components 332 and one or more media relay components 334. Examples of media relay components may include a Session Traversal of User Datagram Protocol (UDP) Through Network Address Translators (NATs) system (e.g., STUN system) and/or a Traversal Using relays around NAT (TURN) system, although the present disclosure is not limited thereto.

In some examples, the media transport system 115 may separate the MPUs 324 from the network(s) 199 so that the MPUs 324 do not have a publicly accessible internet protocol (IP) address (e.g., cannot route outside of a local network). Thus, the system 100 may use the media relay components 334 to send data from the first device 110a to the MPUs 324 and/or data (e.g., processed data) generated by the MPUs 324 from the MPUs 324 to the second device 110b of a multimedia communication. For example, the system 100 may route data to and from the first device 110a using a first TURN server, and route data to and from the second device 110b using a second TURN server.

While the example described above illustrates routing data to and from the media processing components 320, the media routing components 330 may be used to route data separately from the media processing components 320 without departing from the disclosure. For example, the system 100 may route data directly between devices 110 using one or more TURN servers (e.g., TURN system) without departing from the present disclosure. Additionally or alternatively, the system 100 may route data using one or more STUN servers (e.g., STUN system), such as when a device 110 has a publicly accessible IP address. In some examples, the system 100 may establish and perform multimedia communications using a combination of a STUN system and a TURN system. For example, a multimedia communication may be more easily established/configured and performed using a TURN system, but may benefit from latency improvements using a STUN system. Thus, the system 100 may route data using a STUN system, a TURN system, and/or a combination thereof without departing from the present disclosure.

In addition to routing data, the media routing components 330 may also perform topology optimization. For example, the media routing components 330 may include geographically distributed media relay components (e.g., TURN/STUN servers) to enable the media transport system 115 to efficiently route data packets. For example, the media routing components 330 may include a control plane that coordinates between the media relay components 334 to select an optimum route (e.g., data path) to send data packets. For example, the media routing components 330 may determine a location of parties in a communication session and determine a data path that bypasses a particular country or chokepoint in the network(s) 199. In some examples, the media routing components 330 may select an enterprise specific route and only use specific connected links associated with the enterprise. Additionally or alternatively, the routing components 330 may apply machine learning models to further reduce latency by selecting the optimum route using non-geographical parameters (e.g., availability of servers, time of day, previous history, etc.).

While the description of the media relay components 334 above refers to STUN systems and/or TURN systems, the present disclosure is not limited thereto. Instead, the media routing components 330 may use any alternative systems known to one of skill in the art to route data packets. For example, the media routing components 330 may use any technique that routes UDP data packets and allows the UDP data packets to traverse NATs. For example, the media routing components 330 may include UDP packet forwarding and relay devices instead of a TURN system.

The media transport system 115 may include gateway components 350 that enable the media transport system 115 to interface with (e.g., send/receive media content or other data to/from) external networks. As illustrated in FIG. 3, the gateway components 350 may include a public switched telephone network (PSTN) gateway 352, a mobile carrier gateways 354, an IP communication network gateway 356, and/or other gateways known to one of skill in the art. While FIG. 3 illustrates the gateway components 350 including a single gateway for each external network, this is intended for illustrative purposes only and the gateway components 350 may include multiple gateways for each external network without departing from the present disclosure. For example, the gateway components 350 may include multiple PSTN gateways 352 having different locations without departing from the present disclosure. Additionally or alternatively, a single type of external network may correspond to multiple external networks without departing from the present disclosure. For example, the gateway components 350 may include a first mobile carrier gateway 354a corresponding to a first mobile carrier network and a second mobile carrier gateway 354b corresponding to a second mobile carrier network without departing from the present disclosure. However, the disclosure is not limited thereto and two or more mobile carrier networks may share a mobile carrier gateway 354 without departing from the disclosure.

To illustrate an example of using the gateway components 350, the system 100 may use the PSTN gateway 352 to establish a multimedia communication with a PSTN device (e.g., wired/wireless telephone, cellular phone, and/or the like that is associated with a PSTN telephone number). The PSTN gateway 352 may receive the data packets, convert the data packets to audio data in a different format, and send the audio data to the PSTN device via the PSTN gateway 352. Thus, the gateway components 350 may include a plurality of gateways, with each gateway being associated with a specific external network and configured to act as an interface between the media transport system 115 and an external network.

Figure 4B:
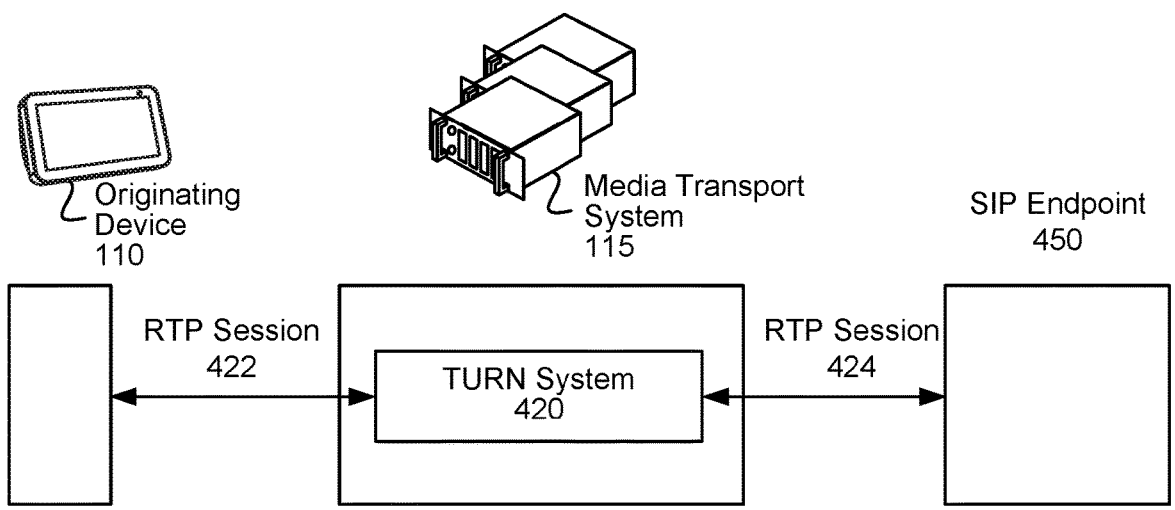

FIGS. 4A-4B illustrate examples of establishing multimedia communications between devices according to embodiments of the present disclosure. In at least some examples, a multimedia communication originating device 110 may have a publicly accessible IP address and may be configured to establish a real-time transport (RTP) protocol communication session directly with a session initiation protocol (SIP) endpoint 450. The SIP endpoint 450 may correspond to a device 110, a component within the media transport system 115, a gateway component 350 configured to interface with a remote network, and/or a device associated with the remote network itself. To enable the originating device 110 to establish the RTP communication session, the media transport system 115 may include a Session Traversal of User Datagram Protocol (UDP) Through Network Address Translators (NATs) system (e.g., a STUN system 410). The STUN system 410 may be configured to allow NAT clients (e.g., an originating device 110 behind a firewall) to setup calls to a Voice over Internet Protocol (VoIP) provider hosted outside of the local network by providing a public IP address, the type of NAT they are behind, and a port identifier associated by the NAT with a particular local port. As illustrated in FIG. 4A, the originating device 110 may perform (412) IP discovery using the STUN system 410 and may use this information to set up an RTP communication session 414 (e.g., UDP communication) between the originating device 110 and the SIP endpoint 450 to establish a multimedia communication.

In at least some examples, the originating device 110 may not have a publicly accessible IP address. For example, in some types of NAT the originating device 110 cannot route outside of the local network. To enable the originating device 110 to establish an RTP communication session, the media transport system 115 may include Traversal Using relays around NAT (TURN) system (e.g., a TURN system 420). The TURN system 420 may be configured to connect the originating device 110 to the SIP endpoint 450 when the originating device 110 is behind a NAT. As illustrated in FIG. 4B, the originating device 110 may establish (422) an RTP session with the TURN system 420, and the TURN system 420 may establish (424) an RTP session with the SIP endpoint 450. Thus, the originating device 110 may communicate with the SIP endpoint 450 via the TURN system 420. For example, the originating device 110 may send audio data and/or image data to the media transport system 115, and the media transport system 115 may send the audio data and/or the image data to the SIP endpoint 450. Similarly, the SIP endpoint 450 may send audio data and/or image data to the media transport system 115, and the media transport system 115 may send the audio data and/or the image data to the originating device 110.

In at least some examples, the system may establish multimedia communications using a combination of the STUN system 410 and the TURN system 420. For example, a multimedia communication may be more easily established/configured using the TURN system 420, but may benefit from latency improvements using the STUN system 410. Thus, the system may use the STUN system 410 when the multimedia communication may be routed directly between two devices and may use the TURN system 420 for all other multimedia communications.

Additionally or alternatively, the system may use the STUN system 410 and/or the TURN system 420 selectively based on the multimedia communication being established. For example, the system may use the STUN system 410 when establishing a multimedia communication between two devices (e.g., point-to-point) within a single network (e.g., corporate LAN and/or WLAN), but may use the TURN system 420 when establishing a multimedia communication between two devices on separate networks and/or three or more devices regardless of network(s).

When a multimedia communication goes from only two devices to three or more devices, the media transport system 115 may need to transition from the STUN system 410 to the TURN system 420. Thus, if the media transport system 115 anticipates three or more devices being included in a multimedia communication, the multimedia communication may be performed using the TURN system 420. Similarly, when a multimedia communication goes from three or more devices to only two devices, the media transport system 115 may transition from the TURN system 420 to the STUN system 410.

While FIGS. 4A-4B illustrate an RTP communication session being established between the originating device 110 and the SIP endpoint 450, the present disclosure is not limited thereto. For example, the RTP communication session may be established between the originating device 110 and a gateway component 350 or other device associated with the SIP endpoint 450 without departing from the present disclosure. Additionally or alternatively, while FIGS. 4A-4B illustrate examples of enabling multimedia communications using the SIP protocol, the disclosure is not limited thereto and the media transport system 115 may use any protocols known to one of skill in the art.

While FIGS. 4A-4B illustrate examples of enabling communications using a data connection (e.g., using Voice over Internet Protocol (VoIP), session initiation protocol (SIP), and/or the like), the disclosure is not limited thereto. For example, the media transport system 115 may enable communications using any type of network without departing from the disclosure. For example, the media transport system 115 may enable communications using a cellular connection (e.g., mobile phone network) or other external network without departing from the disclosure. For example, the media transport system 115 may send instructions (e.g., command data) to endpoints (e.g., caller devices, such as the device 110) instructing the endpoint to establish a communication (e.g., dial a telephone number) in response to a spoken natural language input.

Figure 5:
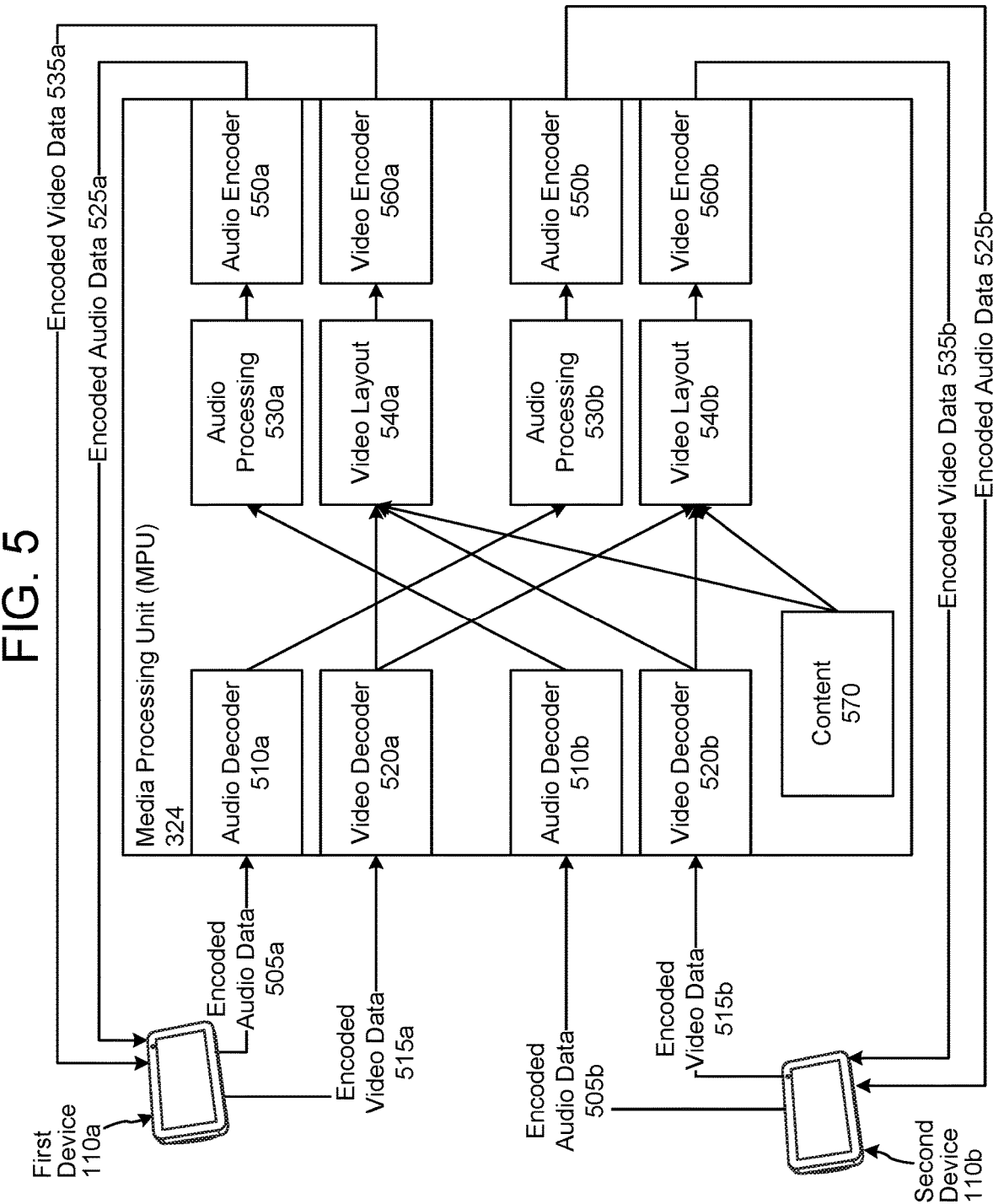
FIG. 5 is a conceptual diagram of processing performable by a media processing unit (MPU), of the media transport system, as part of performing a multimedia communication between two devices, according to embodiments of the present disclosure.

FIG. 5 illustrates an example of how a MPU 324, of the media transport system 115, may perform a multimedia communication (including audio and video) between a first device 110a and a second device 110b. During the multimedia communication, a microphone(s) of (or otherwise associated with) the first device 110a may capture audio, generate audio data representing the audio, and encode the audio data to generate encoded audio data 505a. The first device 110a may use one or more art-known, industry-known, and/or proprietary encoding techniques to generate the encoded audio data 505a. The first device 110a sends the encoded audio data 505a to the MPU 324, wherein the encoded audio data 505a is sent to an audio decoder 510a. The audio decoder 510a decodes (using one or more art-known, industry-known, and/or proprietary decoding techniques) the encoded audio data 505a to generate decoded audio data, which the audio decoder 510a sends to an audio processing component 530b.

The audio processing component 530b may perform one or more processes on the decoded audio data to render the decoded audio data suitable for output by the second device 110b. For example, the audio processing component 530b may process the decoded audio data to ensure a maximum volume of speech and/or environmental noise in the decoded audio data is at or below a maximum volume capable of being output by a speaker(s) of (or otherwise associated with) the second device 110b. The audio processing component 530b may generate processed audio data, which the audio processing component 530b may send to an audio encoder 550b.

The audio encoder 550b encodes the processed audio data (received from the audio processing component 530b) to generate encoded audio data 525b, which the audio encoder 550b outputs for sending to the second device 110b. The audio encoder 550b may use one or more art-known, industry-known, and/or proprietary encoding techniques to generate the encoded audio data 525b. The second device 110b may decode (using one or more art-known, industry-known, and/or proprietary decoding techniques) the encoded audio data 525b to generate decoded audio data, and thereafter output audio corresponding to the decoded audio data.

Similarly, a microphone(s) of (or otherwise associated with) the second device 110b may capture audio, generate audio data representing the audio, and encode (using one or more art-known, industry-known, and/or proprietary encoding techniques) the audio data to generate encoded audio data 505b. The second device 110b sends the encoded audio data 505b to the MPU 324, wherein the encoded audio data 505b is sent to an audio decoder 510b. The audio decoder 510b decodes (using one or more art-known, industry-known, and/or proprietary decoding techniques) the encoded audio data 505b to generate decoded audio data, which the audio decoder 510b sends to an audio processing component 530a.

The audio processing component 530a may perform one or more processes on the decoded audio data to render the decoded audio data suitable for output by the first device 110a. For example, the audio processing component 530a may process the decoded audio data to ensure a maximum volume of speech and/or environmental noise in the decoded audio data is at or below a maximum volume capable of being output by a speaker(s) of (or otherwise associated with) the first device 110a. The audio processing component 530a may generate processed audio data, which the audio processing component 530a may send to an audio encoder 550a.

The audio encoder 550a encodes (using one or more art-known, industry-known, and/or proprietary encoding techniques) the processed audio data (received from the audio processing component 530a) to generate encoded audio data 525a, which the audio encoder 550a outputs for sending to the first device 110a. The first device 110a may decode (using one or more art-known, industry-known, and/or proprietary decoding techniques) the encoded audio data 525a to generate decoded audio data, and thereafter output audio corresponding to the decoded audio data.

Also as part of the multimedia communication, a camera (s) of (or otherwise associated with) the first device 110a may capture video, the first device 110a may generate video data corresponding to the captured video, the first device 110a may encode (using one or more art-known, industry-known, and/or proprietary encoding techniques) the video data to generate encoded video data 515a, and the first device 110a may send the encoded video data 515a to the MPE 324, wherein the encoded video data 515a may be sent to a video decoder 520a. The video decoder 520a may decode (using one or more art-known, industry-known, and/or proprietary decoding techniques) the encoded video data 515a to generate decoded video data. Assuming a user has indicated the multimedia communication is to include content, the video decoder 520a may send the decoded video data to a video layout component 540a (configured to generate a video layout for the first device 110a) and a video layout component 540b (configured to generate a video layout for the second device 110b).

Similarly, a camera(s) of (or otherwise associated with) the second device 110b may capture video, the second device 110b may generate video data corresponding to the captured video, the second device 110b may encode (using one or more art-known, industry-known, and/or proprietary encoding techniques) the video data to generate encoded video data 515b, and the second device 110b may send the encoded video data 515b to the MPE 324, wherein the encoded video data 515b may be sent to a video decoder 520b. The video decoder 520b may decode (using one or more art-known, industry-known, and/or proprietary decoding techniques) the encoded video data 515b to generate decoded video data. Again, assuming a user has indicated the multimedia communication is to include content, the video decoder 520b may send the decoded video data to the video layout component 540a (associated with the first device 110a) and the video layout component 540b (associated with the second device 110b).

If a user has indicated the multimedia communication is to include content, a content component 570 may determine image data to be displayed as part of the multimedia communication, and may send the image data to the video layout component 540a (associated with the first device 110a) and the video layout component 540b (associated with the second device 110b). The image data may include one or more images. The content component 570 may receive the image data from a skill or a storage.

The video layout component 540a is configured to generate video data for display by the first device 110a. For example, the video layout component 540a may generate video data including a portion corresponding to the decoded video data received from the video decoder 520a, a portion corresponding to the decoded video data received from the video decoder 520b, one or more portions corresponding to one or more images received as image data from the content component 570, and one or more portions corresponding to graphical elements for selection by the first user 5a to control display of the one or more images in the video data. To render the image data (received from the content component 570) in the video data generated by the video layout component 540a, the video layout component 540a may generate a still frame video stream from the image data, and include the still frame video stream in the video data generated by the video layout component 240a.

The video layout component 240a may have access to display data representing characteristics of the display of (or otherwise associated with) the first device 110a. For example, the display data may include a width of the display as measured in pixels, centimeters, inches, or the like. For further example, the display data may include a height of the display as measured in pixels, centimeters, inches, or the like. The video layout component 240a may generate video data based on the display data. The video layout component 240a may generate display location data for each portion of the video data. For example, the video layout component 240*a* may generate display location data representing a location of the decoded video data (received from the video decoder 520*a*) in the video data generated by the video layout component 240*a*, display location data representing a location of the decoded video data (received from the video decoder 520*b*) in the video data generated by the video layout component 240*a*, display location data representing a location of each image (received as image data from the content component 570) in the video data generated by the video layout component 240*a*, and display location data representing a location of each graphical element (for selection by the first user 5*a* to control display of the one or more images in the video data) in the video data generated by the video layout component 240*a*.

The video layout component 240*a* may represent a display location using an x-coordinate corresponding to a top-left corner of the decoded video data, image, or graphical element; a y-coordinate corresponding to the top-left corner of the decoded video data, image, or graphical element; a width of the decoded video data, image, or graphical element; and a height of the decoded video data, image, or graphical element. In at least some embodiments, the x-coordinate may be a pixel value, the y-coordinate may be a pixel value, the width may be a unit of measure (e.g., millimeters, centimeters, inches, etc.), and the height may be a unit of measure (e.g., millimeters, centimeters, inches, etc.). In at least some embodiments, display location data (for decoded video data, an image, or a graphical element) may include an alpha value representing a transparency of the decoded video data, the image, or the graphical element. For example, an alpha value be represented within a scale of 0.0-1.0, wherein an alpha value of "0.0" corresponds to fully transparent and an alpha value of "1.0" corresponds to fully-opaque. In at least some embodiments, display location data (for decoded video data, an image, or a graphical element) may include a z-order location value representing a z-order location of the decoded video data, the image, or the graphical element in the video data output by the first device 110*a*.

The video layout component 540*a* may send video data and associated display location data (generated by the video layout component 540*a*) to a video encoder 560*a*. The video encoder 560*a* may encode (using one or more art-known, industry-known, and/or proprietary encoding techniques) the video data to generate encoded video data 535*a*. The video encoder 560*a* may cause the encoded video data 535*a* and associated display location data to be sent to the first device 110*a*. The first device 110*a* may decode (using one or more art-known, industry-known, and/or proprietary decoding techniques) the encoded video data to generate decoded video data, which the first device 110*a* displays as video. The first device 110*a* may also store the display location data for later use.

In at least some embodiments, the MPU 324 may be configured to queue the encoded audio data 525*a* (generated by the audio encoder 550*a*) and the encoded video data 535*a* (generated by the video encoder 560*a*), and synchronously send the encoded audio data 525*a* and the encoded video data 535*a* to the first device 110*a* such that output of audio (corresponding to the encoded audio data 525*a*) and display of video (corresponding to the encoded video data 535*a*) by the first device 110*a* is synchronous (i.e., spoken words in the output audio temporally match up with display video of a user speaking). In at least some other embodiments, the first device 110*a* may queue the encoded audio data 525*a* and the encoded video data 535*a* to ensure the first device 110*a* synchronously outputs audio and displays video.

Similarly, the video layout component 540*b* is configured to generate video data for display by the second device 110*b*. For example, the video layout component 540*b* may generate video data including a portion corresponding to the decoded video data received from the video decoder 520*a*, a portion corresponding to the decoded video data received from the video decoder 520*b*, one or more portions corresponding to one or more images received as image data from the content component 570, and one or more portions corresponding to graphical elements for selection by the first user 5*b* to control display of the one or more images in the video data. To render the image data (received from the content component 570) in the video data generated by the video layout component 540*b*, the video layout component 540*b* may generate a still-frame video stream from the image data, and include the still frame video stream in the video data generated by the video layout component 240*b*. As used herein, still-frame video stream and still-frame video data refer to a sequence of transmitted images in which the content of the images remains constant.

The video layout component 240*b* may have access to display data representing characteristics of the display of (or otherwise associated with) the second device 110*b*. For example, the display data may include a width of the display as measured in pixels, centimeters, inches, or the like. For further example, the display data may include a height of the display as measured in pixels, centimeters, inches, or the like. The video layout component 240*b* may generate video data based on the display data. The video layout component 240*b* may generate display location data for each portion of the video data. For example, the video layout component 240*b* may generate display location data representing a location of the decoded video data (received from the video decoder 520*a*) in the video data generated by the video layout component 240*b*, display location data representing a location of the decoded video data (received from the video decoder 520*b*) in the video data generated by the video layout component 240*b*, display location data representing a location of each image (received as image data from the content component 570) in the video data generated by the video layout component 240*b*, and display location data representing a location of each graphical element (for selection by the first user 5*b* to control display of the one or more images in the video data) in the video data generated by the video layout component 240*b*.

The video layout component 240*b* may represent a display location using an x-coordinate corresponding to a top-left corner of the decoded video data, image, or graphical element; a y-coordinate corresponding to the top-left corner of the decoded video data, image, or graphical element; a width of the decoded video data, image, or graphical element; and a height of the decoded video data, image, or graphical element. In at least some embodiments, the x-coordinate may be a pixel value, the y-coordinate may be a pixel value, the width may be a unit of measure (e.g., millimeters, centimeters, inches, etc.), and the height may be a unit of measure (e.g., millimeters, centimeters, inches, etc.). In at least some embodiments, display location data (for decoded video data, an image, or a graphical element) may include an alpha value representing a transparency of the decoded video data, the image, or the graphical element. For example, an alpha value be represented within a scale of 0.0-1.0, wherein an alpha value of "0.0" corresponds to fully transparent and an alpha value of "1.0" corresponds to fully-opaque. In at least some embodiments, display location data (for decoded video data, an image, or a graphical element) may include a z-order location value representing a z-order location of the decoded video data, the image, or the graphical element in the video data output by the second device 110b.

The video layout component 540b may send video data and associated display location data (generated by the video layout component 540b) to a video encoder 560b. The video encoder 560b may encode (using one or more art-known, industry-known, and/or proprietary encoding techniques) the video data to generate encoded video data 535b. The video encoder 560b may cause the encoded video data 535b and associated display location data to be sent to the second device 110b. The second device 110b may decode (using one or more art-known, industry-known, and/or proprietary decoding techniques) the encoded video data to generate decoded video data, which the second device 110b displays as video. The second device 110b may also store the display location data for later use.

Thus, it will be appreciated that, at any point in time during the multimedia communication, the video data (generated by the video layout component 540b) may contain the same video content as the video data (generated by the video layout component 540a). However, portions of the video data (generated by the video layout component 540b) may have different display locations than portions of the video data (generated by the video layout component 540a) depending on display characteristics of the displays of (or otherwise associated with) the first device 110a and the second device 110b. It will also be appreciated that content is displayed as video data during an entirety of the multimedia communication, even though the video data may be generated at least in part on image data (which, as described above, may be rendered in the video data as a still-frame video stream). In other words, content may not be rendered, as part of a multimedia communication, using an application window separate from a window displaying the multimedia communication (e.g., the live video data captured by the devices 110 of the multimedia communication).

In at least some embodiments, the MPU 324 may be configured to queue the encoded audio data 525b (generated by the audio encoder 550b) and the encoded video data 535b (generated by the video encoder 560b), and synchronously send the encoded audio data 525b and the encoded video data 535b to the first device 110a such that output of audio (corresponding to the encoded audio data 525b) and display of video (corresponding to the encoded video data 535b) by the second device 110b is synchronous (i.e., spoken words in the output audio temporally match up with display video of a user speaking). In at least some other embodiments, the second device 110b may queue the encoded audio data 525b and the encoded video data 535b to ensure the second device 110b synchronously outputs audio and displays video.

While FIG. 5 illustrates how the MPU 324 may perform a multimedia communication (including audio and video) between a first device 110a and a second device 110b, the present disclosure is not limited thereto. According to the present disclosure, the MPU 324 may perform a multimedia communication (including audio and video) between n number of devices 110. In such instances, the MPU may include, for each device 110 of the multimedia communication, an audio decoder 510, an audio processing component 530, an audio encoder 550, a video decoder 520, a video layout component 540, and a video encoder 560. An audio decoder 510 may receive encoded audio data 505, decode (using one or more art-known, industry-known, and/or proprietary decoding techniques) the encoded audio data to generate decoded audio data, and send the decoded audio data to all audio processing components 530 in the MPU 324, except the audio processing component associated with the device 110 that sent the encoded audio data 505 to the audio decoder 510. A video decoder 520 may receive encoded video data 515, decode (using one or more art-known, industry-known, and/or proprietary decoding techniques) the encoded video data to generate decoded video data, and send the decoded video data to all video layout components 540 in the MPU 324, including the video layout component associated with the device 110 that sent the encoded video data 515 to the video decoder 520. In addition, the image component 570 may send image data to all video layout components 540 in the MPU 324. Such enables a device 110, of the multimedia communication, to synchronously output audio captured by all other devices of the multimedia communication, display the video captured by all devices of the multimedia communication, and display the same video data as all other devices of the multimedia communication.

Figure 6H:
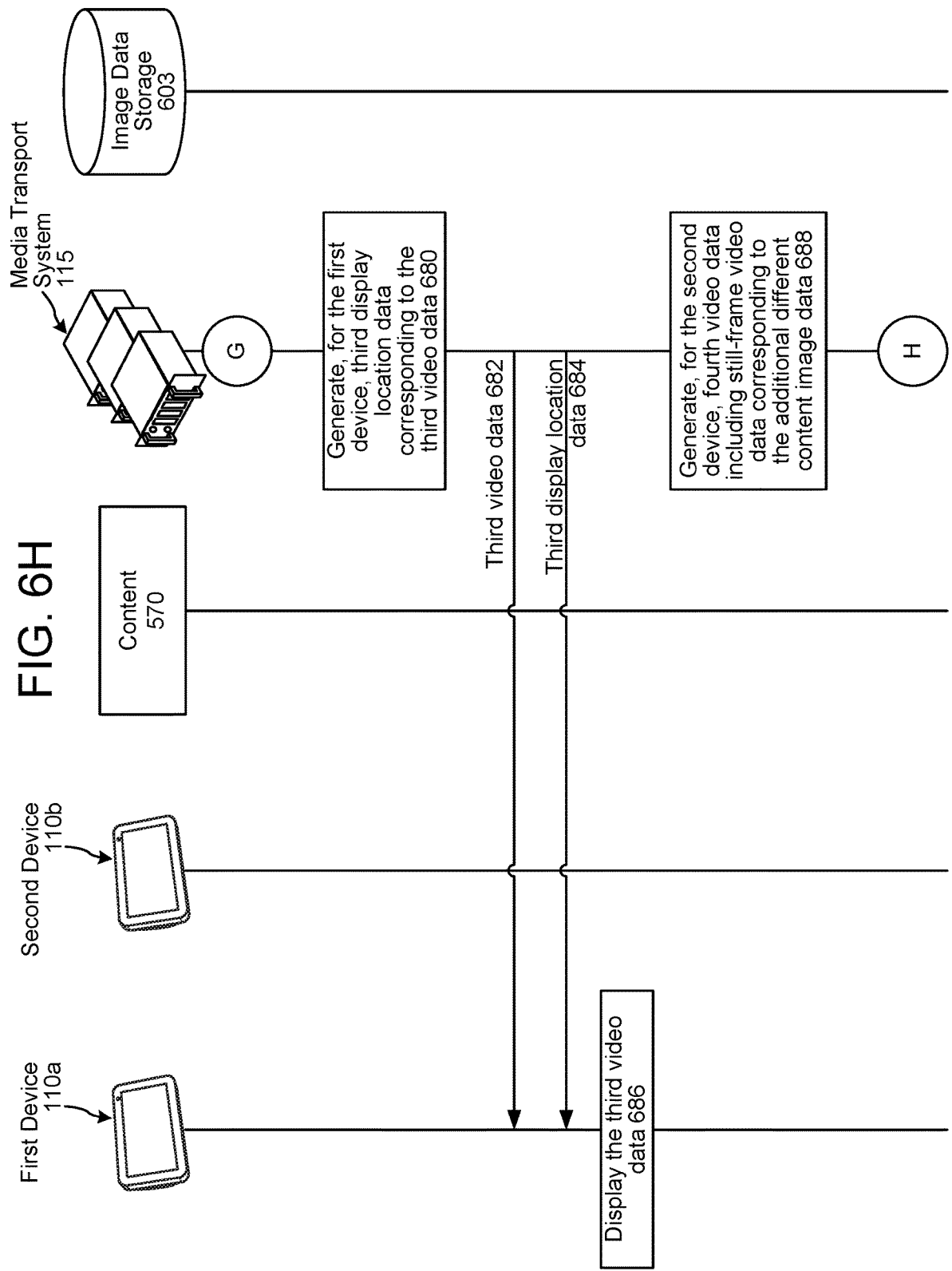
FIGS. 6A-6P are a signal flow diagram illustrating processing that may be performed as part of a multimedia communication, according to embodiments of the present disclosure.
Figure 60:
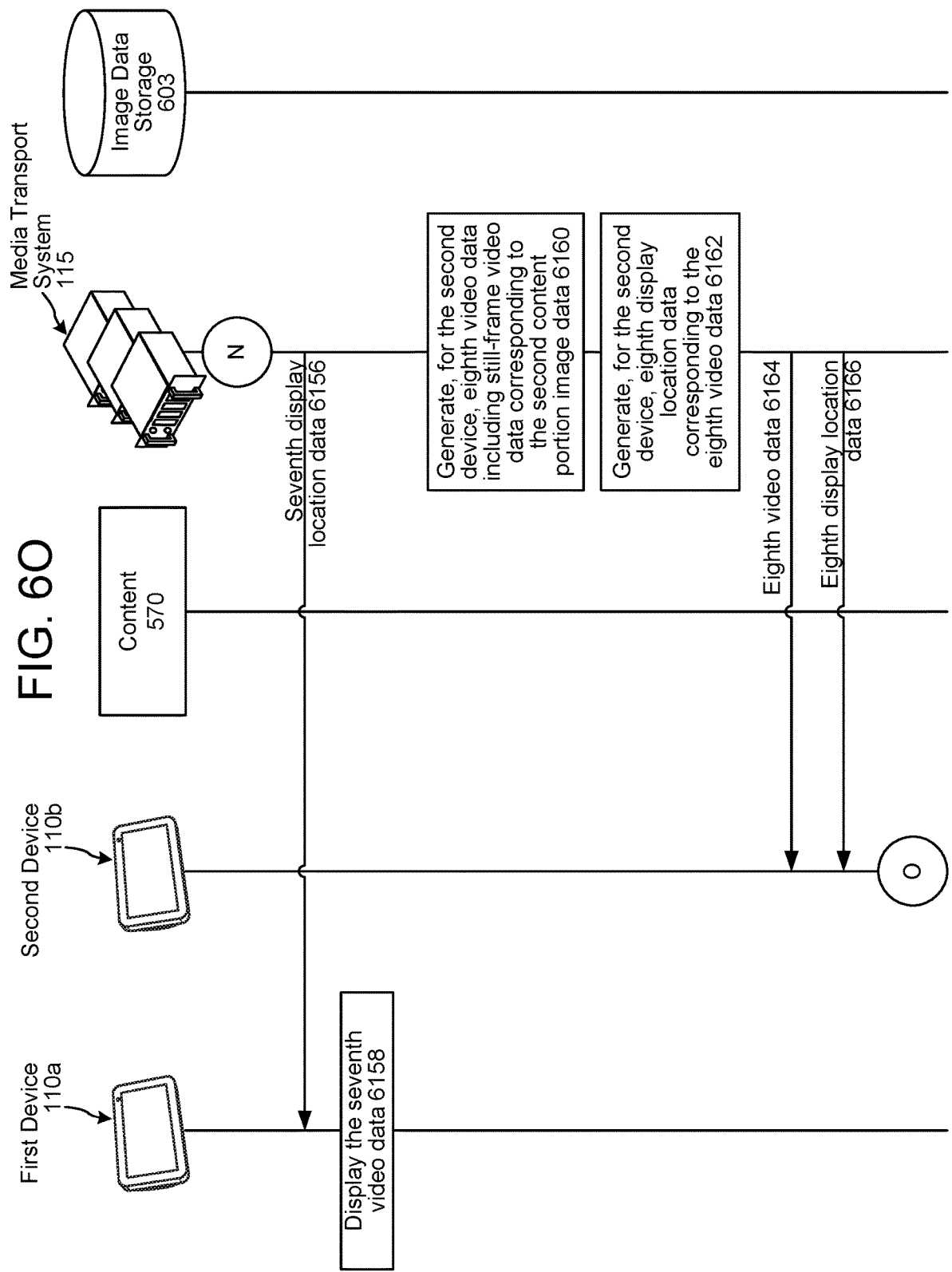

Now turning to FIGS. 6A-6P, processing performed with respect to an example multimedia communication (including audio and video) is described. A first device 110a may receive a user input requesting establishment of multimedia communication. For example, the first device 110a may receive audio including speech of the user 5a. For example, the speech may correspond to "[wakeword], start a video call with John," "[wakeword], start a video call with mom's cell phone," "[wakeword], start a video call with Bob's kitchen devices," or the like. The first device 110a may generate audio data representing the audio, and send the audio data to the system 120. The system 120 (using the ASR component 250 and the NLU component 260, or a SLU component) may determine the speech requests establishment of the multimedia communication. Alternatively, for example, the first device 110 may receive a GUI user input (e.g., a touch input on a touchscreen, a click/press on a touchpad, a mouse click, etc.) requesting establishment of the multimedia communication with a specific contact list entry (e.g., being displayed on the GUI when the user input is received by the first device 110a), and may send data (representing the GUI user input) to the system 120. The system 120 may then process the received data to determine the multimedia communication is to be established.

Upon determining the multimedia communication has been requested, the system 120 may send, to the media transport system 115, a first device identifier of the first device 110a (e.g., the requesting device of the multimedia communication request), a second device identifier of the second device 110b (e.g., the recipient device of the multimedia communication request), and data indicating a multimedia communication (including audio and video) between the first device 110a and the second device 110b has been requested. This sending of data is illustrated in FIG. 6A as step 602. While FIG. 6A shows the request 602 being sent from the first device 110a, it will be appreciated (based on the foregoing) that the request may be sent from the system 120 instead. The request may be routed to the media transport system 115.

In response to receiving the request, the media transport system 115 may determine a recipient device identifier in the request (e.g., the second device identifier of the second device 110b), and may send (604) the request to the second device 110b. This may cause the second device 110b to output one or more indications that the multimedia communication is being requested. For example, the second device 110b may activate a visual indicator (such as a light emitting diode (LED), or other type of light) to indicate the request, may cause a display of (or otherwise associated with) the device 110*b* to display an image or video indicating the request, may output audio corresponding to TTS-generated synthesized speech indicating the request, and/or may indicate the request to the user 5*b* in one or more other manners.

The user 5*b* may accept the request in various manners. For example, the user 5*b* may accept the request by saying "[wakeword], answer," "[wakeword], accept," or some other spoken user input accepting the request. For further example, the user 5*b* may accept the request by providing a GUI user input corresponding to selection of a graphical element indicating acceptance of the request. Such GUI user input may occur via, for example, a touch input on a touchscreen, a click/press on a touchpad, a mouse click, etc. In response to receiving acceptance of the request by the user 5*b*, the second device 110*b* may send (606), to the media transport system 115, data representing the acceptance.

In response to receiving the data representing the acceptance, the media transport system 115 may establish (608) a data channel between the first device 110*a* and the second device 110*b*. The data channel may be a peer-to-peer data channel, such as the RTP session 414 described above with respect to FIG. 4A. The data channel enables the first device 110*a*, to send to the second device 110*b*, audio data (output by a microphone(s) of or otherwise associated with the first device 110*a*) and video data (output by a camera(s) of or otherwise associated with the first device 110*a*). Likewise, the data channel enables the second device 110*b*, to send to the first device 110*a*, audio data (output by a microphone(s) of or otherwise associated with the second device 110*b*) and video data (output by a camera(s) of or otherwise associated with the second device 110*b*).

Example video that may be displayed by the first device 110*a* and the second device 110*b*, in response to the data channel being established (at process 608), are illustrated in FIG. 7A. As illustrated, the first device 110*a* may display (on a display 702 of or otherwise associated with the first device 110*a*) video including a first video portion 704 corresponding to video data output by a camera(s) 710 of (or otherwise associated with) the second device 110*b*, and a second video portion 708 corresponding to video data output by a camera (s) 706 of (or otherwise associated with) the first device 110*a*. Moreover, the first device 110*a* may output audio corresponding to audio data output by one or more microphones 712*a*-712*d* of (or otherwise associated with) the second device 110*b*. Likewise, the second device 110*b* may display (on a display 714 of or otherwise associated with the second device 110*b*) video including a first video portion 716 corresponding to video data output by the camera(s) 706 of (or otherwise associated with) the first device 110*a*, and a second video portion 718 corresponding to video data output by the camera(s) 710 of (or otherwise associated with) the second device 110*b*. Moreover, the second device 110*b* may output audio corresponding to audio data output by one or more microphones 720*a*-720*d* of (or otherwise associated with) the first device 110*a*.

Referring to FIG. 6A, the media transport system 115 may generate (610) first graphical element display location data for the first device 110*a*. For example, the first graphical element display location data may represent where, on the display 702 of (or otherwise associated with) the first device 110*a*, a first graphical element for ending the multimedia communication is to be displayed, where on the display 702 a second graphical element for turning off the camera(s) 706 of (or otherwise associated with) the first device 110*a* is to be displayed, where on the display 702 a third graphical element for displaying content (as part of the multimedia communication) is to be displayed, etc. The graphical elements, represented in the first graphical element display location data, may be referred to as "in call controls." In at least some embodiments, a graphical element, in the first graphical element display location data, may be represented by an x-coordinate corresponding to a top-left corner of the graphical element, a y-coordinate corresponding to the top-left corner of the graphical element, a width of the graphical element, and a height of the graphical element. The media transport system 115 may send (612) the first graphical element display location data to the first device 110*a*.

The media transport system 115 may also generate (614) second graphical element display location data for the second device 110*b*. For example, the second graphical element display location data may represent where, on the display 714 of (or otherwise associated with) the second device 110*b*, a first graphical element for ending the multimedia communication is to be displayed, where on the display 714 a second graphical element for turning off the camera(s) 710 of (or otherwise associated with) the second device 110*b* is to be displayed, where on the display 714 a third graphical element for displaying content (as part of the multimedia communication) is to be displayed, etc. The graphical elements, represented in the second graphical element display location data, may be referred to as "in call controls." In at least some embodiments, a graphical element, in the second graphical element display location data, may be represented by an x-coordinate corresponding to a top-left corner of the graphical element, a y-coordinate corresponding to the top-left corner of the graphical element, a width of the graphical element, and a height of the graphical element. The media transport system 115 may send (616) the second graphical element display location data to the second device 110*b*.

In at least some embodiments, the first graphical element display location data and the second graphical element display location data may represent graphical elements corresponding to different actions. In at least some embodiments, the first graphical element display location data and the second graphical element display location data may represent one or more graphical elements for performing one or more same actions, and one or more different graphical elements for performing one or more different actions. In at least some embodiments, the first graphical element display location data and the second graphical element display location data may represent graphical elements for performing the same actions. Although the first graphical element display location data and the second graphical element display location data may represent graphical elements for performing a same action, the graphical elements may be rendered differently by the first device 110*a* and the second device 110*b* (e.g., using different graphics, in different display locations, etc.). In at least some embodiments, the first device 110*a* and the second device 110*b* may display graphical elements (corresponding to the same action) in different display locations based on the displays 702/714 of (or otherwise associated with) the first device 110*a* and the second device 110*b* having different characteristics (e.g., being of different sizes).

Sometime after the first device 110*a* receives the first graphical element display location data and the second device 110*b* receives the second graphical element display location data, one of the first device 110*a* or the second device 110*b* may receive a first GUI user input. In the example of FIG. 6, the second device 110*b* may receive (618) the first GUI user input. For example, the first GUI user input may be received by the second device 110b as a touch input on the display 714 of (or otherwise associated with) the second device 110b, a click/press on a touchpad of (or otherwise associated with) the second device 110b, a mouse click, etc. Receipt of the first GUI user input, by the second device 110b, is called out in FIG. 7B as reference number 722. It will be appreciated that the illustrated location of the first GUI user input is merely illustrative, and that the first GUI user input may correspond to other locations of the display 714.

In response to receiving the first GUI user input, the second device 110b may display (620) the graphical elements represented in the second graphical element display location data previously received from the media transport system 115. For example, as illustrated in FIG. 7C, the second device 110b may display (on the display 714) a first graphical element 724 corresponding to a first action of ending the multimedia communication, a second graphical element 726 corresponding to a second action of turning off the camera(s) 710 of (or otherwise associated with) the second device 110b, and a third graphical element 728 corresponding to a third action of displaying content as part of the multimedia communication. It will be appreciated that the graphical elements 724/726/728 and their display locations in FIG. 7C are merely illustrative, and that other graphical elements and/or display locations may be used. In at least some instances, the graphical elements 724/726/728 may be referred to as call control graphical elements/buttons.

Referring to FIG. 6B, while the second device 110b is displaying the aforementioned graphical elements, the second device 110b may receive (622) a second GUI user input corresponding to first display coordinates. The second device 110b may receive the second GUI user input as a touch input on the display 714 of (or otherwise associated with) the second device 110b, a click/press on a touchpad of (or otherwise associated with) the second device 110b, a mouse click, etc. Receipt of the second GUI user input, by the second device 110b, is called out in FIG. 7D as reference number 730.

The second device 110b may determine (624) the first display coordinates correspond to the displayed graphical element 728 corresponding to the action of displaying content in the multimedia communication. For example, as mentioned above the second graphical element display location data may include an x-coordinate, a y-coordinate, a width, and a height for different graphical elements. Based on this, the second device 110b may know the coordinates of each graphical element 724/726/728 displayed on the display 714. The second device 110b may compare the first display coordinates (of the second GUI input) to the display coordinates of the displayed graphical elements 724/726/728 to determine the first display coordinates correspond to display coordinates of the graphical element 728 to display content in the multimedia communication.

In response to determining the first display coordinates correspond to the displayed graphical element 728 to display content in the multimedia communication, the second device 110b may send (626) a multimedia communication identifier (corresponding to the multimedia communication) to the content component 570, may send (628) a user identifier or a group identifier to the content component 570, and may send (630) data indicating the second GUI user input to the media transport system 115. The second device 110b may send the user identifier, to the content component 570 in instances where the second device 110b performs user recognition processing to determine an identity of the user 5b, or the user recognition component 295 (of the system 120) performs user recognition processing to determine the identity of the user 5b, and a result of such user recognition processing is sent to the second device 110b. The second device 110b may send a group identifier (associated with the device 110b) to the content component 570 in situations where the second device 110b and/or the user recognition component 295 are unable to determine an identity of the user 5b using one or more user recognition techniques.

Alternatively, instead of receiving the second GUI user input, the second device 110b may receive a spoken user input indicating content is to be displayed in the multimedia communication. For example, the second device 110b may receive speech corresponding to "[wakeword], start [displayed text corresponding to the graphical element 728]." The second device 110b may generate audio data corresponding to the speech, and may send the audio data to the system 120. The system 120 (using the ASR component 250 and the NLU component 260, or a SLU component) may determine the speech requests content be displayed in the multimedia communication. As a result, the system 120 may send (626) the multimedia communication identifier to the content component 570, may send (628) the user identifier or group identifier to the content component 570, and may send (630), to the media transport system 115, data indicating book covers are to be displayed in the multimedia communication.

In response to receiving the multimedia communication identifier and the user identifier or group identifier, the content component 570 may determine (632) content identifiers corresponding to different content (e.g., different book covers, different digital photo album covers, different movie covers, etc.) to be displayed. The content component 570 may perform one or more algorithms for determining which different content is to be displayed. For example, if the content component 570 receives a user identifier, the algorithm(s) (run by the content component 570) may consider things such as user preferences associated with the user identifier, a user age associated with the user identifier, a primary language associated with the user identifier, previously viewed content represented in previous usage data associated with the user identifier, purchased digital content associated with the user identifier, etc. For further example, if the content component 570 receives a group identifier (such as, but not limited to, a household identifier), the algorithm(s) (run by the content component 570) may consider things such as user preferences associated with a user identifier(s) associated with the group identifier, a user age(s) associated with a user identifier(s) associated with the group identifier, a primary language(s) associated with a user identifier(s) associated with the group identifier, previously viewed content represented in previous usage data associated with a user identifier(s) associated with the group identifier, purchased digital content associated with a user identifier(s) associated with the group identifier, etc.

The above describes how the second device 110b may detect a user input indicating content is to be displayed in the multimedia communication, and that the content component 570 may determine different content recommended for a group identifier or user identifier associated with the second device 110b. However, the present disclosure is not limited thereto. Any device 110 of the multimedia communication may detect the user input indicating content is to be displayed in the multimedia communication. In each case, the content component 570 may determine different content recommended for a group identifier or user identifier associated with the device 110 that detected the user input.

The content component 570 may query (634) an image data storage 603 for image data corresponding to the content identifiers, and receive (636) image data corresponding to the different content corresponding to the different content identifiers. For example, the content component 570 may receive image data corresponding to different book covers, image data corresponding to different movie covers, etc.

The image data storage 603 may store image data corresponding to various content. For each different content with different portions of the content being represented by different images, the image data storage 603 may store the different images in a hierarchy or other relational format to facilitate the recall and display of portions of content in response to "next," "previous," and/or other relational user inputs. In at least some embodiments, the image data (stored in the image data storage 603) may be updated on a periodic basis (e.g., hourly basis, daily basis, weekly basis, monthly basis, quarterly basis, etc.) to include newly offered content by the content component 570 and/or no longer include content no longer offered by the content component 570.

The content component 570 may send (638) the different content image data to the media transport system 115. In response to receiving (630) the data indicating the user input to display content in the multimedia communication and/or in response to receiving (638) the different content image data, the media transport system 115 may convert the multimedia communication from a peer-to-peer multimedia communication into a multimedia communication in which the first device 110a and the second device 110b communicate with each other via the media transport system 115 (for example as conceptually illustrated in FIG. 4B).

After the media transport system 115 receives the different content image data, the media transport system 115 may generate (640), for the first device 110a, first video data including still-frame video data corresponding to the different content image data. The media transport system 115 may generate the first video data using techniques as described above with respect to FIG. 5. For example, the first video data may include the still-frame video data corresponding to the different content image data, video data being received from the camera(s) of (or otherwise associated with) the first device 110a, and video data being received from the camera (s) of (or otherwise associated with) the second device 110b.

The media transport system 115 may also generate (642), for the first device 110a, first display location data corresponding to the first video data. For example, the first display location data may represent a location of the video data (being received from the camera(s) of or otherwise associated with the first device 110a) in the first video data, a location of the video data (being received from the camera(s) of or otherwise associated with the second device 110b) in the first video data, a location of each different content image (each individually represented as different still-frame video data, or collectively represented as a single portion of still-frame video data) in the first video data, and a location of each graphical element (each represented as still-frame video data) in the first video data.

The media transport system 115 sends (644) the first video data to the first device 110a, and also sends (646) the first display location data to the first device 110a. The media transport system 115 may send the first video data and the first display location data in a same data transmission, or separate data transmissions. In response to receiving the first video data, the first device 110a displays (648) the first video data on the first display of or otherwise associated with the first device 110a.

Similarly, the media transport system 115 may generate (650), for the second device 110b, second video data including still-frame video data corresponding to the different content image data. The media transport system 115 may generate the second video data using techniques as described above with respect to FIG. 5. For example, the second video data may include the still-frame video data corresponding to the different content image data, video data being received from the camera(s) of (or otherwise associated with) the first device 110a, and video data being received from the camera (s) of (or otherwise associated with) the second device 110b.

The media transport system 115 may also generate (652), for the second device 110b, second display location data corresponding to the second video data. For example, the second display location data may represent a location of the video data (being received from the camera(s) of or otherwise associated with the first device 110a) in the second video data, a location of the video data (being received from the camera(s) of or otherwise associated with the second device 110b) in the second video data, a location of each different content image (each individually represented as different still-frame video data, or collectively represented as a single portion of still-frame video data) in the second video data, and a location of each graphical element (each represented as still-frame video data) in the second video data.

The media transport system 115 sends (654) the second video data to the second device 110b, and also sends (656) the second display location data to the second device 110b. The media transport system 115 may send the second video data and the second display location data in a same data transmission, or separate data transmissions. In response to receiving the second video data, the second device 110b displays (658) the second video data on the second display of or otherwise associated with the second device 110b.

As described, the media transport system 115 may render video data for display during a multimedia communication, and send the video data to devices 110 for display. This may be beneficial because some devices 110 may not have sufficient computing resources to render multimedia communication video data on-device.

In at least some embodiments, the media transport system 115 may send the first video data and the second video data to the first device 110a and the second device 110b, respectively, in a manner that promotes the first device 110a and the second device 110b synchronously (or substantially synchronously) displaying the first video data and the second video data. However, it will be appreciated that delays in network transmissions, etc. may cause the display of the first video data and the second video data by the first device 110a and the second device 110b, respectively, to be out of sync.

FIG. 7E illustrates an example of the first device 110a and the second device 110b displaying the first video data and the second video data, respectively, As illustrated in FIG. 7E, the first device 110a may display video (corresponding to the first video data) having a portion 748a corresponding to video data being received from the camera(s) of or otherwise associated with the first device 110a, a portion 746a corresponding to video data being received from the camera(s) of or otherwise associated with the second device 110b, and still-frame video portions 732a/734a/736a/738a corresponding to different content (e.g., different book covers, different movie covers, different digital photo album covers, etc.) represented in the different content image data. In at least some embodiments, the different content portions 732a, 734a, 736a, and 738a may be considered a single portion of still-frame video. The first device 110*a* may also display a still-frame video portion 742*a* corresponding to a graphical element for displaying previously-displayed content (e.g., previously-displayed book covers, movie covers, digital photo album covers, etc.). The first device 110*a* may also display a still-frame video portion 744*a* corresponding to a graphical element for displaying not-yet displayed content (e.g., not-yet displayed book covers, movie covers, digital photo album covers, etc.). The first device 110*a* may also display a still-frame video portion 740*a* corresponding to a graphical element for going back a layer of the multimedia communication. In the example of FIG. 7E, selection of the still-frame video portion 740*a* could result in the first device-displayed video of FIG. 7A.

As further illustrated in FIG. 7E, the second device 110*b* may display video (corresponding to the second video data) having a portion 748*b* corresponding to video data being received from the camera(s) of or otherwise associated with the first device 110*a*, a portion 746*b* corresponding to video data being received from the camera(s) of or otherwise associated with the second device 110*b*, and still-frame video portions 732*b*/734*b*/736*b*/738*b* corresponding to different content (e.g., different book covers, different movie covers, different digital photo album covers, etc.) represented in the different content image data. In at least some embodiments, the different content portions 732*b*, 734*b*, 736*b*, and 738*b* may be considered a single portion of still-frame video. The second device 110*b* may also display a still-frame video portion 742*b* corresponding to a graphical element for displaying previously-displayed content (e.g., previously-displayed book covers, movie covers, digital photo album covers, etc.). The second device 110*b* may also display a still-frame video portion 744*b* corresponding to a graphical element for displaying not-yet displayed content (e.g., not-yet displayed book covers, movie covers, digital photo album covers, etc.). The second device 110*b* may also display a still-frame video portion 740*b* corresponding to a graphical element for going back a layer of the multimedia communication. In the example of FIG. 7E, selection of the still-frame video portion 740*b* could result in the second device-displayed video of FIG. 7A.

The still-frame video portions illustrated in FIG. 7E are merely illustrative. For example, the first device 110*a* and the second device 110*b* may display other still-frame video, corresponding to different graphical elements for performing different actions, without departing from the present disclosure. Moreover, the first device 110*a* and the second device 110*b* may display other still-frame video, corresponding to different amounts of different content, without departing from the present disclosure. Thus, it will be appreciated that, while it may be beneficial for the first device 110*a* and the second device 110*b* to display the same still-frame video at the time same, the displayed still-frame video is configurable.

Sometime while the first device 110*a* and the second device 110*b* are displaying the first video data and the second video data, either of the first device 110*a* or the second device 110*b* may receive a third GUI user input of the multimedia communication. In the example of FIG. 6 (and as illustrated in FIG. 6F), the first device 110*a* may receive (660) the third GUI user input corresponding to second display coordinates. For example, the third GUI user input may be received by the first device 110*a* as a touch input on the display of (or otherwise associated with) the first device 110*a*, a click/press on a touchpad of (or otherwise associated with) the first device 110*a*, a mouse click, etc. Receipt of the third GUI user input, by the first device 110*a*, is called out in FIG. 7F as reference number 750.

The first device 110*a* may determine whether the second display coordinates are represented in the first display location data (previously received from the media transport system 115) as corresponding to still-frame video data. However, the first device 110*a* may not make a determination as to the specific identity of the still-frame video portion of the display selected by the user 5*a*. If the first device 110*a* determines (662) the second display coordinates are represented in the first display location data as corresponding to still-frame video data, the first device 110*a* may send (664) the second display coordinates to the media transport system 115. In at least some embodiments, the second display coordinates may be pixel values corresponding to the third GUI user input. In at least some other embodiments, the second display coordinates may be relational values (e.g., indicating the third GUI input was detect x distance from one edge of the display of or otherwise associated with the first device 110*a*, and y distance from another edge of the display).

In the example of FIG. 7F, the media transport system 115 may determine (666) the second display coordinates are represented in the first display location data (previously sent to the first device 110*a* at step 644) as corresponding to still-frame video data corresponding to the graphical element 744*a* to display additional content. In response to this determination, the media transport system 115 may send (668), to the content component 570, a request for additional content. The request may include the multimedia communication identifier.

The content component 570 determines (670) additional content identifiers corresponding to additional different content The content component 570 may perform one or more algorithms for determining which additional different content is to be displayed. For example, if the content component 570 received a user identifier at step 628, the algorithm(s) (run by the content component 570) may consider things such as user preferences associated with the user identifier, a user age associated with the user identifier, a primary language associated with the user identifier, previously viewed content represented in previous usage data associated with the user identifier, etc. For further example, if the content component 570 received a group identifier at step 628, the algorithm(s) (run by the content component 570) may consider things such as user preferences associated with a user identifier(s) associated with the group identifier, a user age(s) associated with a user identifier(s) associated with the group identifier, a primary language(s) associated with a user identifier(s) associated with the group identifier, previously viewed content represented in previous usage data associated with a user identifier(s) associated with the group identifier, etc. Alternatively, in at least some embodiments, the content component 570 may simply (without re-running the algorithm(s)) determine the additional content identifiers from a list of content identifiers previously determined at step 632.

The content component 570 may query (672) the image data storage 603 for image data corresponding to the additional content identifiers, and receive (674) additional different content image data in response thereto. The content component 570 sends (676), to the media transport system 115, the additional different content image data. Such is an alternative embodiment that prevents the need for the media transport system 115 to query the image data storage 603 for the additional digital book cover image data.

After the media transport system 115 receives the additional different content image data, the media transport system 115 may generate (678), for the first device 110a, third video data including still-frame video data corresponding to the additional different content image data. The media transport system 115 may generate the third video data using techniques as described above with respect to FIG. 5. For example, the third video data may include the still-frame video data corresponding to the additional different content image data, video data being received from the camera(s) of (or otherwise associated with) the first device 110a, and video data being received from the camera(s) of (or otherwise associated with) the second device 110b.

The media transport system 115 may also generate (680), for the first device 110a, third display location data corresponding to the third video data. For example, the third display location data may represent a location of the video data (being received from the camera(s) of or otherwise associated with the first device 110a) in the third video data, a location of the video data (being received from the camera(s) of or otherwise associated with the second device 110b) in the third video data, a location of each additional different content image (each individually represented as different still-frame video data, or collectively represented as a single portion of still-frame video data) in the third video data, and a location of each graphical element (each represented as still-frame video data) in the third video data.

The media transport system 115 sends (682) the third video data to the first device 110a, and also sends (684) the third display location data to the first device 110a. The media transport system 115 may send the third video data and the third display location data in a same data transmission, or separate data transmissions. In response to receiving the third video data, the first device 110a displays (686) the third video data on the first display of or otherwise associated with the first device 110a.

Similarly, the media transport system 115 may generate (688), for the second device 110b, fourth video data including still-frame video data corresponding to the additional different content image data. The media transport system 115 may generate the fourth video data using techniques as described above with respect to FIG. 5. For example, the fourth video data may include the still-frame video data corresponding to the additional different content image data, video data being received from the camera(s) of (or otherwise associated with) the first device 110a, and video data being received from the camera(s) of (or otherwise associated with) the second device 110b.

The media transport system 115 may also generate (690), for the second device 110b, fourth display location data corresponding to the fourth video data. For example, the fourth display location data may represent a location of the video data (being received from the camera(s) of or otherwise associated with the first device 110a) in the fourth video data, a location of the video data (being received from the camera(s) of or otherwise associated with the second device 110b) in the fourth video data, a location of each additional different content image (each individually represented as different still-frame video data, or collectively represented as a single portion of still-frame video data) in the fourth video data, and a location of each graphical element (each represented as still-frame video data) in the fourth video data.

The media transport system 115 sends (692) the fourth video data to the second device 110b, and also sends (694) the fourth display location data to the second device 110b. The media transport system 115 may send the fourth video data and the fourth display location data in a same data transmission, or separate data transmissions. In response to receiving the fourth video data, the second device 110b displays (696) the fourth video data on the second display of or otherwise associated with the second device 110b.

In at least some embodiments, the media transport system 115 may send the third video data and the fourth video data to the first device 110a and the second device 110b, respectively, in a manner that promotes the first device 110a and the second device 110b synchronously (or substantially synchronously) displaying the third video data and the fourth video data. However, it will be appreciated that delays in network transmissions, etc. may cause the display of the third video data and the fourth video data by the first device 110a and the second device 110b, respectively, to be out of sync.

FIG. 7G illustrates an example of the first device 110a and the second device 110b displaying the third video data and the fourth video data, respectively. As illustrated in FIG. 7G, the first device 110a may display video (corresponding to the third video data) having the portion 748a corresponding to video data being received from the camera(s) of or otherwise associated with the first device 110a, the portion 746a corresponding to video data being received from the camera(s) of or otherwise associated with the second device 110b, and still-frame video portions 752a/754a/756a/758a corresponding to the additional different content (e.g., additional different book covers, movie covers, digital photo album covers, etc.) represented in the additional different content image data. In at least some embodiments, the additional different content portions 752a, 754a, 756a, and 758a may be considered a single portion of still-frame video. The first device 110a may also display the still-frame video portion 742a corresponding to the graphical element for displaying previously-displayed different content (e.g., the previously-displayed different content illustrated in FIGS. 7E-7F). The first device 110a may also display the still-frame video portion 744a corresponding to the graphical element for displaying not-yet displayed different content (e.g., not-yet displayed book covers, movie covers, digital photo album covers, etc.). The first device 110a may also display the still-frame video portion 740a corresponding to the graphical element for going back a layer of the multimedia communication. In the example of FIG. 7G, selection of the still-frame video portion 740a could result in the first device-displayed video of FIG. 7A.

As further illustrated in FIG. 7G, the second device 110b may display video (corresponding to the fourth video data) having the portion 748b corresponding to video data being received from the camera(s) of or otherwise associated with the first device 110a, the portion 746b corresponding to video data being received from the camera(s) of or otherwise associated with the second device 110b, and still-frame video portions 752b/754b/756b/758b corresponding to the additional different content (e.g., additional different book covers, movie covers, digital photo album covers, etc.) represented in the additional different content image data. In at least some embodiments, the additional different content portions 752b, 754b, 756b, and 758b may be considered a single portion of still-frame video. The second device 110b may also display the still-frame video portion 742b corresponding to the graphical element for displaying previously-displayed different content (e.g., the previously-displayed different content illustrated in FIGS. 7E-7F). The second device 110b may also display the still-frame video portion 744b corresponding to the graphical element for displaying not-yet displayed different content (e.g., not-yet displayed book covers, movie covers, digital photo album covers, etc.). The second device 110b may also display the still-frame video portion 740b corresponding to the graphical element for going back a layer of the multimedia communication. In the example of FIG. 7G, selection of the still-frame video portion 740b could result in the second device-displayed video of FIG. 7A.

The still-frame video portions illustrated in FIG. 7G are merely illustrative. For example, the first device 110a and the second device 110b may display other still-frame video, corresponding to different graphical elements for performing different actions, without departing from the present disclosure. Moreover, the first device 110a and the second device 110b may display other still-frame video, corresponding to different amounts of additional different content, without departing from the present disclosure. Thus, it will be appreciated that, while it may be beneficial for the first device 110a and the second device 110b to display the same still-frame video at the time same, the displayed still-frame video is configurable.

Sometime while the first device 110a and the second device 110b are displaying the third video data and the fourth video data, either of the first device 110a or the second device 110b may receive a fourth GUI user input of the multimedia communication. In the example of FIG. 6 (and as illustrated in FIG. 6I), the second device 110b may receive (698) the fourth GUI user input corresponding to third display coordinates. For example, the fourth GUI user input may be received by the second device 110b as a touch input on the display of (or otherwise associated with) the second device 110b, a click/press on a touchpad of (or otherwise associated with) the second device 110b, a mouse click, etc. Receipt of the fourth GUI user input, by the second device 110b, is called out in FIG. 7H as reference number 760.

The second device 110b may determine whether the third display coordinates are represented in the fourth display location data (previously received from the media transport system 115) as corresponding to still-frame video data. However, the second device 110b may not make a determination as to the specific identity of the still-frame video portion of the display selected by the user 5b. If the second device 110b determines (6100) the third display coordinates are represented in the fourth display location data as corresponding to still-frame video data, the second device 110b may send (6102) the third display coordinates to the media transport system 115. In at least some embodiments, the third display coordinates may be pixel values corresponding to the fourth GUI user input. In at least some other embodiments, the third display coordinates may be relational values (e.g., indicating the fourth GUI input was detect x distance from one edge of the display of or otherwise associated with the second device 110b, and y distance from another edge of the display).

In the example of FIG. 7H, the media transport system 115 may determine (6104) the third display coordinates are represented in the fourth display location data as corresponding to still-frame video data corresponding to the "sixth" content 754a. In response to this determination, the media transport system 115 may send (6106), to the content component 570, a request for a first content portion corresponding to the "sixth" content 754a. For example, if the sixth content is a book cover, the requested first content portion may be a first page of the book. For further example, if the sixth content is a movie cover, the requested first content portion may be video data corresponding to the movie. In another example, if the sixth content is a digital photo album cover, the requested first content portion may be a digital photo of the digital photo album. The request for the first content portion may include the multimedia communication identifier and a content identifier corresponding to the selected content.

The content component 570 queries (6108) the image data storage 603 for first content portion image data corresponding to the first content portion, and receives (6110) the first content portion image data in response thereto. In the aforementioned example where the selected content is a movie cover, the content component 570 may receive video data from the image data storage 603. Alternatively, the content component 570 may query a video data storage for the video data. The content component 570 sends (6112) the first content portion image data (or video data) to the media transport system 115.

After the media transport system 115 receives the first content portion image data, the media transport system 115 may generate (6114), for the first device 110a, fifth video data including still-frame video data corresponding to the first content portion image data. The media transport system 115 may generate the fifth video data using techniques as described above with respect to FIG. 5. For example, the fifth video data may include the still-frame video data corresponding to the first content portion image data, video data being received from the camera(s) of (or otherwise associated with) the first device 110a, and video data being received from the camera(s) of (or otherwise associated with) the second device 110b. In the situation where the media transport system 115 receives first content portion video data, the fifth video data may include the first content portion video data, video data being received from the camera(s) of (or otherwise associated with) the first device 110a, and video data being received from the camera(s) of (or otherwise associated with) the second device 110b.

The media transport system 115 may also generate (6116), for the first device 110a, fifth display location data corresponding to the fifth video data. For example, the fifth display location data may represent a location of the video data (being received from the camera(s) of or otherwise associated with the first device 110a) in the fifth video data, a location of the video data (being received from the camera(s) of or otherwise associated with the second device 110b) in the fifth video data, a location (in the fifth video data) of the still-frame video data corresponding to the first content portion image data, and a location of each graphical element (each represented as still-frame video data) in the fifth video data.

The media transport system 115 sends (6118) the fifth video data to the first device 110a, and also sends (6120) the fifth display location data to the first device 110a. The media transport system 115 may send the fifth video data and the fifth display location data in a same data transmission, or separate data transmissions. In response to receiving the fifth video data, the first device 110a displays (6122) the fifth video data on the first display of or otherwise associated with the first device 110a.

Similarly, the media transport system 115 may generate (6124), for the second device 110b, sixth video data including still-frame video data corresponding to the first content portion image data. The media transport system 115 may generate the sixth video data using techniques as described above with respect to FIG. 5. For example, the sixth video data may include the still-frame video data corresponding to the first content portion image data, video data being received from the camera(s) of (or otherwise associated with) the first device 110a, and video data being received from the camera(s) of (or otherwise associated with) the second device 110b. In the situation where the media transport system 115 receives first content portion video data, the sixth video data may include the first content portion video data, video data being received from the camera(s) of (or otherwise associated with) the first device 110a, and video data being received from the camera(s) of (or otherwise associated with) the second device 110b.

The media transport system 115 may also generate (6126), for the second device 110b, sixth display location data corresponding to the sixth video data. For example, the sixth display location data may represent a location of the video data (being received from the camera(s) of or otherwise associated with the first device 110a) in the sixth video data, a location of the video data (being received from the camera(s) of or otherwise associated with the second device 110b) in the sixth video data, a location (in the sixth video data) of the still-frame video data corresponding to the first content portion image data, and a location of each graphical element (each represented as still-frame video data) in the sixth video data.

The media transport system 115 sends (6128) the sixth video data to the second device 110b, and also sends (6130) the sixth display location data to the second device 110b. The media transport system 115 may send the sixth video data and the sixth display location data in a same data transmission, or separate data transmissions. In response to receiving the sixth video data, the second device 110b displays (6132) the sixth video data on the second display of or otherwise associated with the second device 110b.

In at least some embodiments, the media transport system 115 may send the fifth video data and the sixth video data to the first device 110a and the second device 110b, respectively, in a manner that promotes the first device 110a and the second device 110b synchronously (or substantially synchronously) displaying the fifth video data and the sixth video data. However, it will be appreciated that delays in network transmissions, etc. may cause the display of the fifth video data and the sixth video data by the first device 110a and the second device 110b, respectively, to be out of sync.

FIG. 7I illustrates an example of the first device 110a and the second device 110b displaying the fifth video data and the sixth video data, respectively, As illustrated in FIG. 7I, the first device 110a may display video (corresponding to the fifth video data) having the portion 748a corresponding to video data being received from the camera(s) of or otherwise associated with the first device 110a, the portion 746a corresponding to video data being received from the camera(s) of or otherwise associated with the second device 110b, and a still-frame video portion 762a corresponding to the first content portion image data (e.g., a first page of a digital book, a first photo of a digital photo album, etc.). The first device 110a may also display a still-frame video portion 764a corresponding to a graphical element for displaying a previous content portion (e.g., a previous page of a book, a previous photo of a digital photo album, etc.). The first device 110a may also display a still-frame video portion 766a corresponding to a graphical element for displaying a next content portion (e.g., a next page of a book, a next photo of a digital photo album, etc.). The first device 110a may also display the still-frame video portion 740a corresponding to the graphical element for going back a layer of the multimedia communication. In the example of FIG. 7I, selection of the still-frame video portion 740a could result in the first device-displayed video of FIG. 7G. In the situation where the fifth video data includes video data corresponding to a movie, the first device 110a may display the movie at the portion of the display referenced 762a, and may not display the still-frame video portions 764a and 766a.

As further illustrated in FIG. 7I, the second device 110b may display video (corresponding to the sixth video data) having the portion 748a corresponding to video data being received from the camera(s) of or otherwise associated with the first device 110a, the portion 746a corresponding to video data being received from the camera(s) of or otherwise associated with the second device 110b, and a still-frame video portion 762b corresponding to the first content portion image data (e.g., a first page of a digital book, a first photo of a digital photo album, etc.). The second device 110b may also display a still-frame video portion 764b corresponding to a graphical element for displaying a previous content portion (e.g., a previous page of a book, a previous photo of a digital photo album, etc.). The second device 110b may also display a still-frame video portion 766b corresponding to a graphical element for displaying a next content portion (e.g., a next page of a book, a next photo of a digital photo album, etc.). The second device 110b may also display the still-frame video portion 740b corresponding to the graphical element for going back a layer of the multimedia communication. In the example of FIG. 7I, selection of the still-frame video portion 740b could result in the second device-displayed video of FIG. 7G. In the situation where the sixth video data includes video data corresponding to a movie, the first device 110a may display the movie at the portion of the display referenced 762b, and may not display the still-frame video portions 764b and 766b.

Sometime while the first device 110a and the second device 110b are displaying the fifth video data and the sixth video data, either of the first device 110a or the second device 110b may receive a fifth GUI user input of the multimedia communication. In the example of FIG. 6 (and as illustrated in FIG. 6M), the first device 110a may receive (6134) the fifth GUI user input corresponding to fourth display coordinates. For example, the fifth GUI user input may be received by the first device 110a as a touch input on the display of (or otherwise associated with) the first device 110a, a click/press on a touchpad of (or otherwise associated with) the first device 110a, a mouse click, etc. Receipt of the fifth GUI user input, by the first device 110a, is called out in FIG. 7J as reference number 768.

The first device 110a may determine whether the fourth display coordinates are represented in the fifth display location data as corresponding to still-frame video data. However, the first device 110a may not make a determination as to the specific identity of the still-frame video portion of the display selected by the user 5a. If the first device 110a determines (6136) the fourth display coordinates are represented in the fifth display location data as corresponding to still-frame video data, the first device 110a may send (6138) the fourth display coordinates to the media transport system 115. In at least some embodiments, the fourth display coordinates may be pixel values corresponding to the fifth GUI user input. In at least some other embodiments, the fourth display coordinates may be relational values (e.g., indicating the fifth GUI input was detect x distance from one edge of the display of or otherwise associated with the first device 110a, and y distance from another edge of the display).

In the example of FIG. 7J, the media transport system 115 may determine (6140) the fourth display coordinates are represented in the fifth display location data as corresponding to still-frame video data corresponding to the graphical element 766a for displaying a next content portion. In response to this determination, the media transport system

115 may send (6142), to the content component 570, a request for a next content portion corresponding to the. For example, if the first content portion is a first page of a book, the requested next content portion may be a second page of the book. For further example, if the first content portion is a first photo of a digital photo album, the requested next content portion may be a second photo of the digital photo album. The request for the next content portion may include the multimedia communication identifier and a content portion identifier corresponding to the first content portion.

The content component 570 queries (6144) the image data storage 603 for second content portion image data corresponding to the second content portion, and receives (6146) the second content portion image data in response thereto. The content component 570 sends (6148) the second content portion image data to the media transport system 115.

After the media transport system 115 receives the second content portion image data, the media transport system 115 may generate (6150), for the first device 110*a*, seventh video data including still-frame video data corresponding to the second content portion image data. The media transport system 115 may generate the seventh video data using techniques as described above with respect to FIG. 5. For example, the seventh video data may include the still-frame video data corresponding to the second content portion image data, video data being received from the camera(s) of (or otherwise associated with) the first device 110*a*, and video data being received from the camera(s) of (or otherwise associated with) the second device 110*b*.

The media transport system 115 may also generate (6152), for the first device 110*a*, seventh display location data corresponding to the seventh video data. For example, the seventh display location data may represent a location of the video data (being received from the camera(s) of or otherwise associated with the first device 110*a*) in the seventh video data, a location of the video data (being received from the camera(s) of or otherwise associated with the second device 110*b*) in the seventh video data, a location (in the seventh video data) of the still-frame video data corresponding to the second content portion image data, and a location of each graphical element (each represented as still-frame video data) in the seventh video data.

The media transport system 115 sends (6154) the seventh video data to the first device 110*a*, and also sends (6156) the seventh display location data to the first device 110*a*. The media transport system 115 may send the seventh video data and the seventh display location data in a same data transmission, or separate data transmissions. In response to receiving the seventh video data, the first device 110*a* displays (6158) the seventh video data on the first display of or otherwise associated with the first device 110*a*.

Similarly, the media transport system 115 may generate (6160), for the second device 110*b*, eighth video data including still-frame video data corresponding to the second content portion image data. The media transport system 115 may generate the eighth video data using techniques as described above with respect to FIG. 5. For example, the eighth video data may include the still-frame video data corresponding to the second content portion image data, video data being received from the camera(s) of (or otherwise associated with) the first device 110*a*, and video data being received from the camera(s) of (or otherwise associated with) the second device 110*b*.

The media transport system 115 may also generate (6162), for the second device 110*b*, eighth display location data corresponding to the eighth video data. For example, the eighth display location data may represent a location of the video data (being received from the camera(s) of or otherwise associated with the first device 110*a*) in the eighth video data, a location of the video data (being received from the camera(s) of or otherwise associated with the second device 110*b*) in the eighth video data, a location (in the eighth video data) of the still-frame video data corresponding to the second content portion image data, and a location of each graphical element (each represented as still-frame video data) in the eighth video data.

The media transport system 115 sends (6164) the eighth video data to the second device 110*b*, and also sends (6166) the eighth display location data to the second device 110*b*. The media transport system 115 may send the eighth video data and the eighth display location data in a same data transmission, or separate data transmissions. In response to receiving the eighth video data, the second device 110*b* displays (6168) the eighth video data on the second display of or otherwise associated with the second device 110*b*.

In at least some embodiments, the media transport system 115 may send the seventh video data and the eighth video data to the first device 110*a* and the second device 110*b*, respectively, in a manner that promotes the first device 110*a* and the second device 110*b* synchronously (or substantially synchronously) displaying the seventh video data and the eighth video data. However, it will be appreciated that delays in network transmissions, etc. may cause the display of the seventh video data and the eighth video data by the first device 110*a* and the second device 110*b*, respectively, to be out of sync.

Figure 7K:
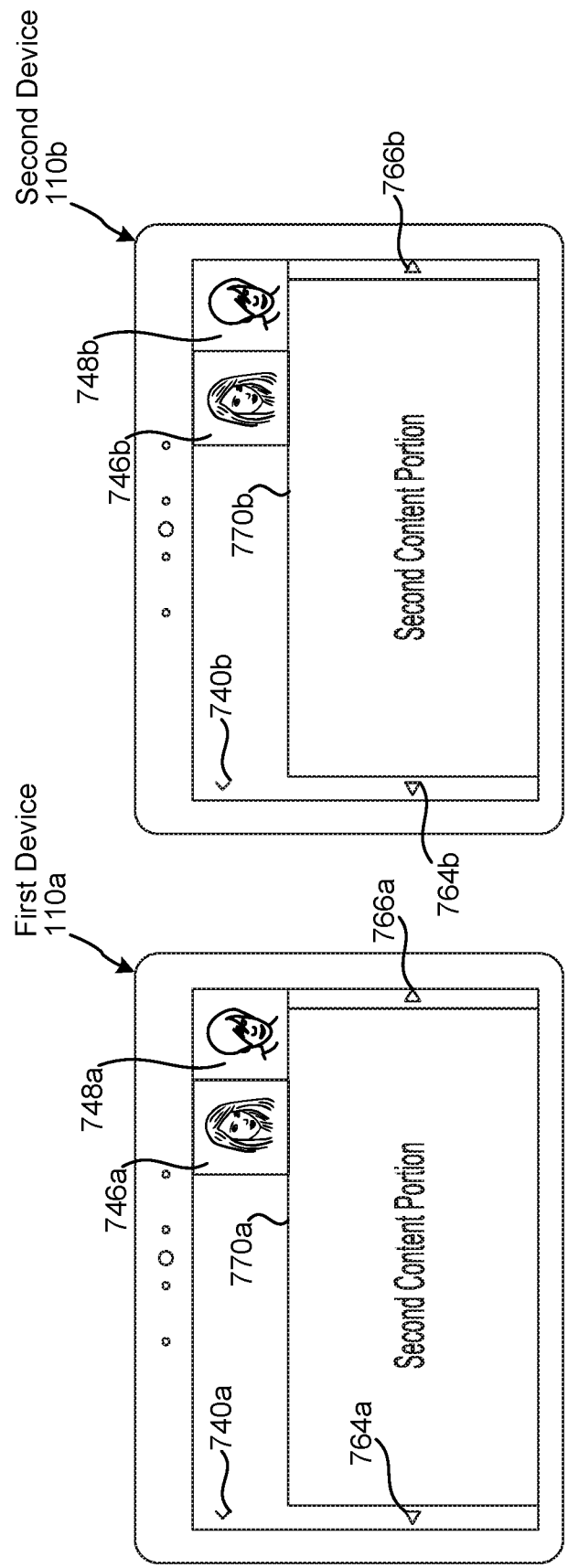

FIG. 7K illustrates an example of the first device 110*a* and the second device 110*b* displaying the seventh video data and the eighth video data, respectively. As illustrated in FIG. 7K, the first device 110*a* may display video (corresponding to the seventh video data) having the portion 748*a* corresponding to video data being received from the camera(s) of or otherwise associated with the first device 110*a*, the portion 746*a* corresponding to video data being received from the camera(s) of or otherwise associated with the second device 110*b*, and a still-frame video portion 770*a* corresponding to the second content portion image data (e.g., a second page of the digital book, a second photo of the digital photo album, etc.). The first device 110*a* may also display the still-frame video portion 764*a* corresponding to the graphical element for displaying a previous content portion (e.g., the first page of the book, the first photo of the digital photo album, etc.). The first device 110*a* may also display the still-frame video portion 766*a* corresponding to the graphical element for displaying a next content portion (e.g., a next page of the book, a next photo of the digital photo album, etc.). The first device 110*a* may also display the still-frame video portion 740*a* corresponding to the graphical element for going back a layer of the multimedia communication. In the example of FIG. 7K, selection of the still-frame video portion 740*a* could result in the first device-displayed video of FIG. 7G.

As further illustrated in FIG. 7K, the second device 110*b* may display video (corresponding to the eighth video data) having the portion 748*a* corresponding to video data being received from the camera(s) of or otherwise associated with the first device 110*a*, the portion 746*a* corresponding to video data being received from the camera(s) of or otherwise associated with the second device 110*b*, and a still-frame video portion 770*b* corresponding to the second content portion image data (e.g., a second page of the digital book, a second photo of the digital photo album, etc.). The second device 110*b* may also display the still-frame video portion 764*b* corresponding to the graphical element for displaying a previous content portion (e.g., the first page of the book, the first photo of the digital photo album, etc.). The second device 110b may also display the still-frame video portion 766b corresponding to a graphical element for displaying a next content portion (e.g., a next page of the book, a next photo of the digital photo album, etc.). The second device 110b may also display the still-frame video portion 740b corresponding to the graphical element for going back a layer of the multimedia communication. In the example of FIG. 7K, selection of the still-frame video portion 740b could result in the second device-displayed video of FIG. 7G.

Sometime while the first device 110a and the second device 110b are displaying the seventh video data and the eighth video data, either of the first device 110a or the second device 110b may receive a user input to cease display of content as part of the multimedia communication. In the example of FIG. 6 (as illustrated in FIG. 6P), the first device 110a may receive (6170) the user input to cease display of content. The first device 110a may receive the user input as a touch input on the display of (or otherwise associated with) the first device 110a, a click/press on a touchpad of (or otherwise associated with) the first device 110a, a mouse click, etc. In response to receiving the user input, the first device 110a may send (6172) data representing the user input to the media transport system 115. Alternatively, the first device 110a may receive a spoken user input indicating content is to no longer be displayed in the multimedia communication. For example, the first device 110a may receive speech corresponding to "[wakeword], stop showing the book," "[wakeword], we are done reading," "stop playing the movie," etc. The first device 110a may generate audio data corresponding to the speech, and may send the audio data to the system 120. The system 120 (using the ASR component 250 and the NLU component 260, or a SLU component) may determine the speech requests content no longer be displayed in the multimedia communication. As a result, the system 120 may send (6172) data to the media transport system 115 indicating the content is to no longer be displayed in the multimedia communication. In response to receiving the data from the first device 110a or the system 120 (depending on the type of the user input), the media transport system 115 may cause content to no longer be displayed in the multimedia communication video, and switch (6174) the multimedia communication back to a peer-to-peer multimedia communication, which may result in the first device 110a and the second device 110b displaying video in a manner similar to that illustrated in and described with respect to FIG. 7A.

Either while the first device 110a and the second device 110b are displaying the video data including content, or after the media transport system 115 has switched the multimedia communication back to a peer-to-peer multimedia communication, either of the first device 110a or the second device 110b may receive a user input to end the multimedia communication. In the example of FIG. 6 (as illustrated in FIG. 6P), the first device 110a may receive (6176) the user input to end the multimedia communication. The first device 110a may receive the user input as a touch input on the display of (or otherwise associated with) the first device 110a, a click/press on a touchpad of (or otherwise associated with) the first device 110a, a mouse click, etc. In response to receiving the user input, the first device 110a may send (6178) data representing the user input to the media transport system 115. Alternatively, the first device 110a may receive a spoken user input to end the multimedia communication. For example, the first device 110a may receive speech corresponding to "[wakeword], end," "[wakeword], end the call," "[wakeword], stop the call," etc. The first device 110a may generate audio data corresponding to the speech, and may send the audio data to the system 120. The system 120 (using the ASR component 250 and the NLU component 260, or a SLU component) may determine the speech requests the multimedia communication be ended. As a result, the system 120 may send (6178) data to the media transport system 115 indicating the multimedia communication is to be ended. In response to receiving the data from the first device 110a or the system 120 (depending on the type of the user input), the media transport system 115 may (6180) close the data channel of the multimedia communication, thereby ending the multimedia communication.

It will be appreciated, from the teachings of FIGS. 6A-7K herein, that all devices 110 of a multimedia communication (which is not limited to two devices 110, but which may include two or more devices 110) may present identical video content from a time when a device 110 receives a user input to start displaying content (e.g., digital book covers, digital photo album covers, digital document cover pages, movie covers, etc.), until a time when a device 110 either receives a user input to no longer display content as part of the multimedia communication, or until a device 110 receives a user input to end the multimedia communication while still-frame video data is being displayed.

In at least some embodiments, the media transport system 115 may be configured to treat user inputs, received from various devices of a multimedia communication, equally. In such embodiments, if a first device 110a receives a first user input with respect to displayed content and a second device 110b momentarily thereafter receives a second user input with respect to the displayed content, the media transport system 115 may be configured to process with respect to the first user input (and not the second user input) based on the first user input being first in time.

In at least some other embodiments, the media transport system 115 may be configured to provide preference to user inputs received from various devices of a multimedia communication. For example, the media transport system 115 may be configured to prefer user inputs received from a second device 110b (e.g., associated with an adult user) over a first device 110a (e.g., associated with a child user) involved in the same multimedia communication. In this example, if the first device 110a receives a first user input with respect to displayed content and a second device 110b thereafter receives a second user input with respect to the displayed content, the media transport system 115 may process with respect to the second user input (and not the first user input) provided the second user input was received within a threshold amount of time after receipt of the first user input.

In at least some embodiments, the media transport system 115 may not generate display location data and send same to a device 110. In such embodiments, whenever a device 110 detects a GUI user input, the device 110 may send an indication of such to the media transport system 115, even if the GUI user input corresponds to an action to be performed locally by the device 110 (e.g., displaying graphical elements for ending the multimedia communication, turning off a video feed of the device 110, etc.). In such embodiments, the media transport system 115 may determine the GUI user input corresponds to an action to be performed locally by the device 110, and may send an indication of such to the device 110, which then performs the action. By configuring the media transport system 115 to generate display location data and send same to a device 110, and by configuring the device 110 to confirm a GUI user input corresponds to still-frame video data in the display location data prior to sending an indication of the GUI user input to the media transport system 115, the amount of GUI user input representation sent to the media transport system 115 by the device 110 may be reduced to only include GUI user inputs corresponding to actions needed to be performed by the media transport system 115.

As described herein above, content (e.g., still-frame video data corresponding to digital book covers) may not be presented until some duration of time has lapsed during a multimedia communication. In at least some embodiments, content may be presented at the start of a multimedia communication. For example, a first device 110a may receive audio including speech of the user 5a. The speech may correspond to "[wakeword], start a reading video call with John," "[wakeword], start a reading video call with mom's cell phone," "[wakeword], start a reading video call with Bob's kitchen devices," or the like. The first device 110a may generate audio data representing the audio, and send the audio data to the system 120. The system 120 (using the ASR component 250 and the NLU component 260, or a SLU component) may determine the speech requests establishment of the multimedia communication with digital book covers to be presented at the outset. Alternatively, for example, the first device 110 may receive a GUI user input (e.g., a touch input on a touchscreen, a click/press on a touchpad, a mouse click, etc.) requesting establishment of the multimedia communication (with digital book covers to be presented at the outset) with a specific contact list entry (e.g., being displayed on the GUI when the user input is received by the first device 110a), and may send data (representing the GUI user input) to the system 120. Upon receiving (from the system 120) data representing the multimedia communication has been requested, the system 115 may perform processes 604-606. Upon receiving the acceptance, the media transport system 115 may query the content component 570 for digital book cover identifiers (and optionally images) associated with a user identifier or group identifier of the first device 110a (which requested the multimedia communication be established). Thereafter, the system 110 may perform processes 632 and onward of FIGS. 6C-6P. According to these teachings, the first video data, displayed by all devices 110 of a multimedia communication, may be video data that includes content (e.g., still-frame digital book covers, still-frame digital photo album covers, still frame digital document cover pages, movie covers, etc.) (in other words, the video content illustrated in FIGS. 7A-7D may be omitted from the beginning of such a multimedia communication, and the multimedia communication may begin with the video of FIG. 7E).

A device 110 may be configured to communicate with (i.e., send data to and received data from) the system 120 and the media transport system 115 via an application installed on the device 110 and associated with the system 120 and the media transport system 115. In such situations, the device 110a may perform processing with respect to a multimedia communication via the application. Such an application may be referred to as a companion application. An example of such an application is the Amazon Alexa application that may be installed on a smart phone or tablet.

In at least some embodiments, a multimedia communication (including audio and video) of the present disclosure may include voice filter functionality, face filter functionality animation effects, and/or other audible and visual effects.

As described above, a user 5 may cause the multimedia communication to display different still-frame video using different GUI user inputs. However, the present disclosure is not limited thereto. In at least some embodiments, a user 5 may cause the multimedia communication to display different content using spoken natural language inputs. For example, to transition from the GUI of FIG. 7F to the GUI of FIG. 7G, the user 5 may say "[wakeword], show more books." For further example, to transition from the GUI of FIG. 7H to the GUI of FIG. 7I, the user 5 may say "[wakeword], show the sixth book," "[wakeword], select the sixth book," or the like. As another example, to transition from the GUI of FIG. 7J to the GUI of FIG. 7K, the user 5 may say "[wakeword], turn the page," "[wakeword], show the next page," or the like.

In at least some embodiments, a device 110 (such as a smart phone or tablet) may be permitted to perform the aforementioned peer-to-peer portion (e.g., that illustrated in FIGS. 7A-7D) of a multimedia communication in either portrait or landscape orientation. However, once a device of the multimedia communication receives a user input to display content as part of the multimedia communication, and the peer-to-peer multimedia communication is transitioned to a multimedia communication involving the media transport system 115 as an intermediary, the media transport system 115 may generate video data that conforms to a landscape orientation of the smart phone, tablet, etc. Such may be beneficial to maximize display of content during the multimedia communication.

In at least some embodiments, the content component 570 may include free functionality and pay-for functionality. The free functionality may correspond to a limited number of free-viewing digital books, whereas the pay-for functionality may enable a user to view a vast amount more of digital books. During a multimedia communication, if the content component 570 determines the group identifier/user identifier is not associated with a digital book skill profile identifier, then the content component 570 may send digital book identifiers only corresponding to free-viewing digital books. As a result, the first video data and the second video data (generated by the media transport system 115) may include book covers for free-viewing digital books, as well as a still-frame video data portion corresponding to a graphical element for signing up for the pay-for functionality of the content component 570. If the user interacts with the graphical element to sign up for the pay-for functionality, the content component 570 may perform an algorithm(s) to recommend pay-for digital book covers, which are then used to replace the free-viewing digital book covers that were being displayed as part of the multimedia communication.

In at least some situations, a multimedia communication may be performed using a first device 110a associated with a child device identifier and/or child user identifier, representing the first device 110a is a child device and/or the first user 5a is a child user. As used herein, a child user refers to a user failing to satisfy a threshold age. In such situations, parental authorization may be confirmed prior to causing content be displayed as part of the multimedia communication.

Figure 8:
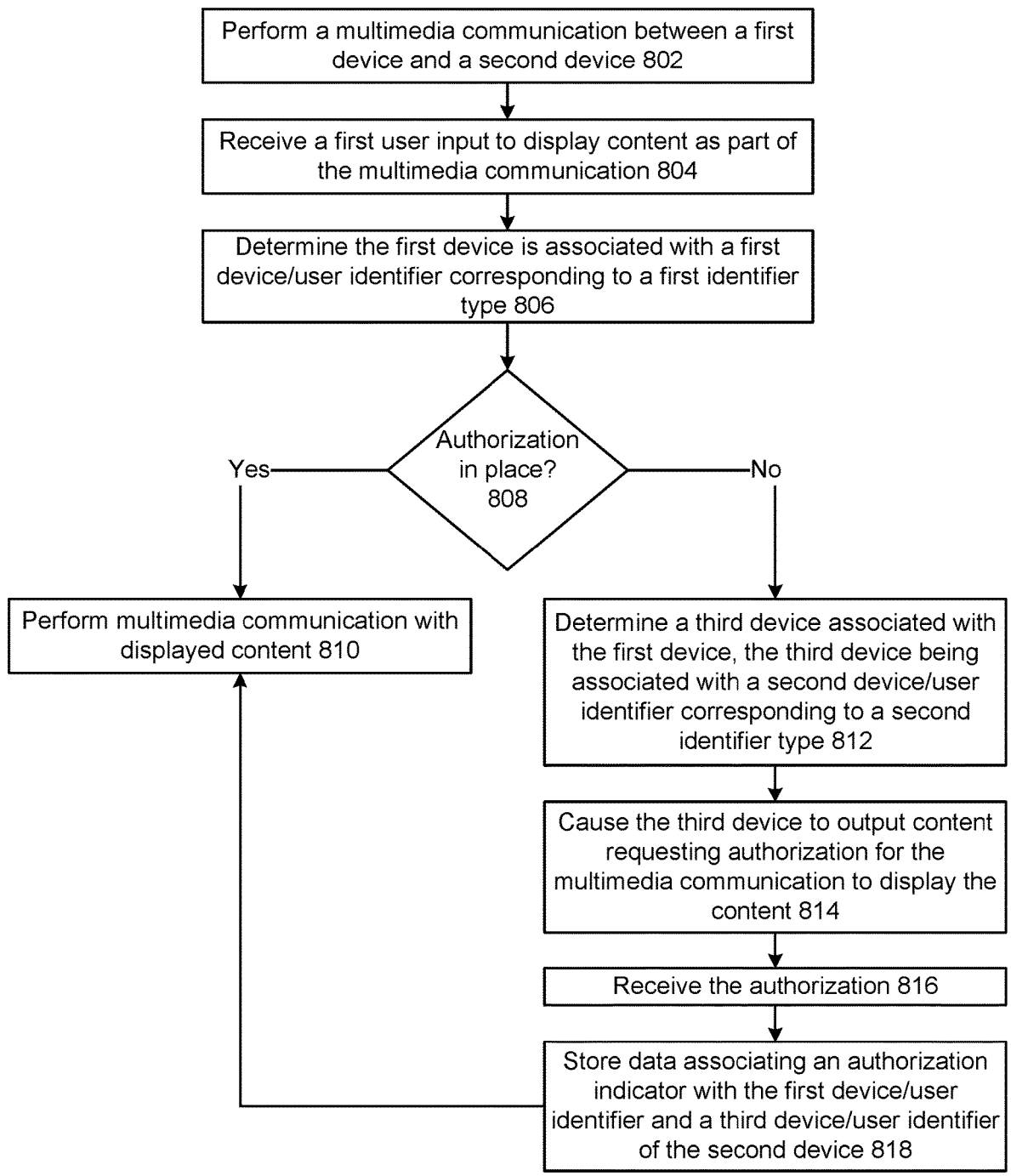
FIG. 8 is a process flow diagram illustrating how parental authorization may be confirmed before displaying content as part of a multimedia communication, according to embodiments of the present disclosure.

Referring to FIG. 8, a multimedia communication (including audio and video, but not displaying content) may be performed (802) between a first device 110a and a second device 110b. At some point, one of the first device 110a or the second device 110b may receive (804) a user input to display content as part of the multimedia communication. Thereafter, the system 100 may determine (806) the first device 110a is associated with a first type of device/user identifier (e.g., a child device identifier and/or child user identifier). In response to such a determination, the system 100 may determine (808) whether authorization has been established between the first type of device/user identifier and a second device identifier and/or second user identifier associated with the second device 110b. Such a determination may involve determining whether a parental authorization flag (or other indicator) is associated with a child device identifier/child user identifier and the second device identifier and/or second user identifier If the system 100 determines the authorization has already been established, the media transport system 115 may perform (810) the multimedia communication with displayed content (as described herein above). Conversely, if the system 100 determines the authorization has not been established, the system 100 may determine (812) a third device associated with the first device, with the third device being associated with a second type of device/user identifier (e.g., a parent device identifier and/or parent user identifier). For example, the third device may be identified by determining a child user profile associated with the child device identifier and/or child user identifier, determining a parent user profile associated with the child user profile, and determining a third device identifier (of the third device) in the parent user profile. In at least some situations, the third device may be a smart phone or tablet.

The system 100 may cause (814) the third device to output content requesting authorization (e.g., parental authorization) for the multimedia communication to display the content. For example, the third device may display a pop-up notification that the authorization is requested. In response to the user of the third device (e.g., the parent user) selecting the pop-up notification, an application (installed on the third device and associated with the system 120) may be launched to obtain one or more GUI user inputs representing authorization (e.g., parental authorization) for multimedia communications, performed with respect to the first device 110a's identifier (e.g., child device identifier/child user identifier) and the second device identifier/second user identifier, to include content. In at least some other embodiments, the third device may output audio (corresponding to TTS-generated synthesized speech) requesting the authorization, and the user of the third device may speak such authorization to the third device.

In response to the third device receiving (816) the authorization, the system 100 may store (818) data associating an authorization (e.g., parental authorization) indicator (e.g., flag) with the first device 110a's identifier (e.g., child device identifier/child user identifier) and the second device identifier/second user identifier. Thereafter, the system 110 may perform (810) the multimedia communication with displayed content.

In at least some embodiments, the media transport system 115 may configure a multimedia communication (including displayed content) such that a non-child device of the multimedia communication may have GUI functionality for disabling (at least temporarily) GUI user inputs detected by a child device (associated with a child device identifier and/or child user identifier) of the multimedia communication. In at least some embodiments, once the non-child device detects a GUI user input to disable GUI user inputs of the child device, GUI user inputs of the child device may be disabled until the non-parent device receives another GUI user input indicating GUI user inputs of the child device are to be re-enabled. Such may enhance the user experience in situations where a child user is interacting with a GUI of the child device a significant amount of times while the non-parent user is attempting to read displayed content to the child user.

Figure 9:
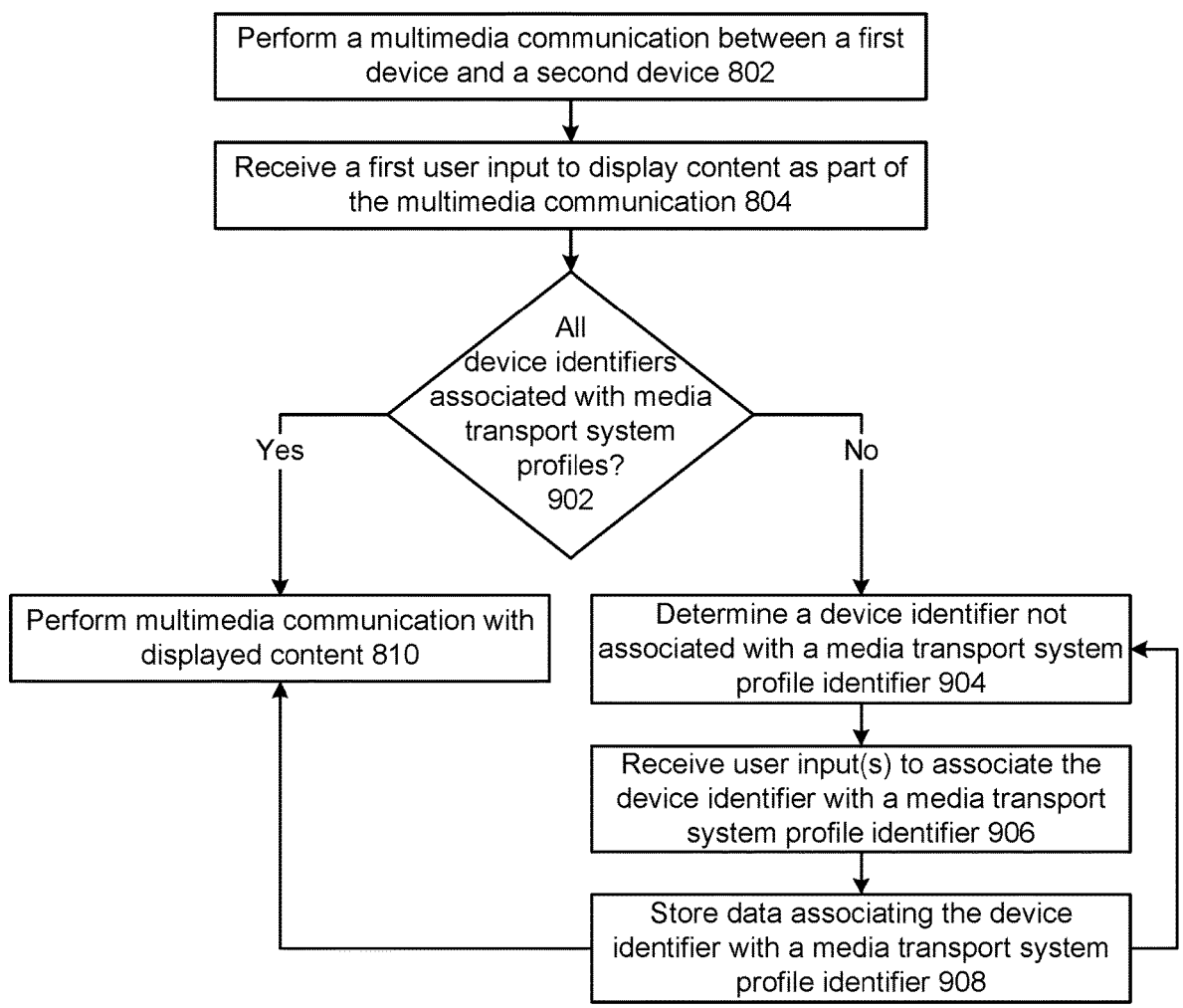
FIG. 9 is a process flow diagram illustrating how media transport system account statuses may be checked before displaying content as part of a multimedia communication, according to embodiments of the present disclosure.

In at least some situations, a multimedia communication may not be able to include content (as described herein above) unless all devices 110 of the multimedia communication have profiles associated with the media transport system 115. In other words, in at least some situations, the media transport system 115 may not be configured to generate video data (including still-frame video content) for a multimedia communication unless all devices 110 of the multimedia communication are associated with profiles associated with the media transport system 115. FIG. 9 illustrates how media transport system account statuses may be checked before displaying content as part of a multimedia communication.

Referring to FIG. 9, a multimedia communication (including audio and video, but not displaying content) may be performed (802) between a first device 110a and a second device 110b. At some point, one of the first device 110a or the second device 110b may receive (804) a user input to display content as part of the multimedia communication. In response, the system 100 may determine (902) whether all device identifiers associated with the multimedia communication (in other words whether all devices 110 performing the multimedia communication) are associated with media transport system profiles.

If the system 100 determines all devices identifiers are associated with media transport system profile identifiers, the media transport system 115 may perform (810) the multimedia communication with displayed content (as described herein above). Conversely, if the system 100 determines one or more of the devices identifiers are not associated with media transport system profile identifiers, the system 100 may determine (904) a device identifier not associated with a media transport system profile identifier, and may thereafter receive (906) one or more user inputs to associate the device identifier with a media transport system profile identifier. For example, the system 100 may determine a first device identifier (corresponding to the first device 110a) is not associated with a media transport system profile identifier. In response to such a determination, the system 100 may cause the first device 110a to display content (or output TTS-generated synthesized audio) requesting user permission to associate the first device identifier with a media transport system profile identifier. A user of the first device 110a may provide one or more user inputs (e.g., in the form of one or more GUI user inputs and/or spoken natural language user inputs) indicating such user permission. Alternatively, for example, in response to determining the first device identifier is not associated with a media transport system profile identifier, the system 100 may determine a third device identifier associated with the first device identifier. The third device identifier may corresponding to a smart phone or tablet. In such examples, the system 100 may cause the smart phone or tablet to display the content/output the TTS-generated synthesized audio, and receive the user input(s). In response to receiving the user permission, the system 100 may store (908) data associating the first device identifier with a media transport system profile identifier.

The system 100 may perform steps 904-908 with respect to each device identifier (of the multimedia communication) that is not associated with a media transport system profile identifier. Once all device identifiers (of the multimedia communication) are associated with media transport system profile identifiers, the system 110 may perform (810) the multimedia communication with displayed content.

In at least some embodiments, the system 100 may only display content (as part of a multimedia communication) if both of the checks of FIGS. 8-9 are performed.

Figure 10:
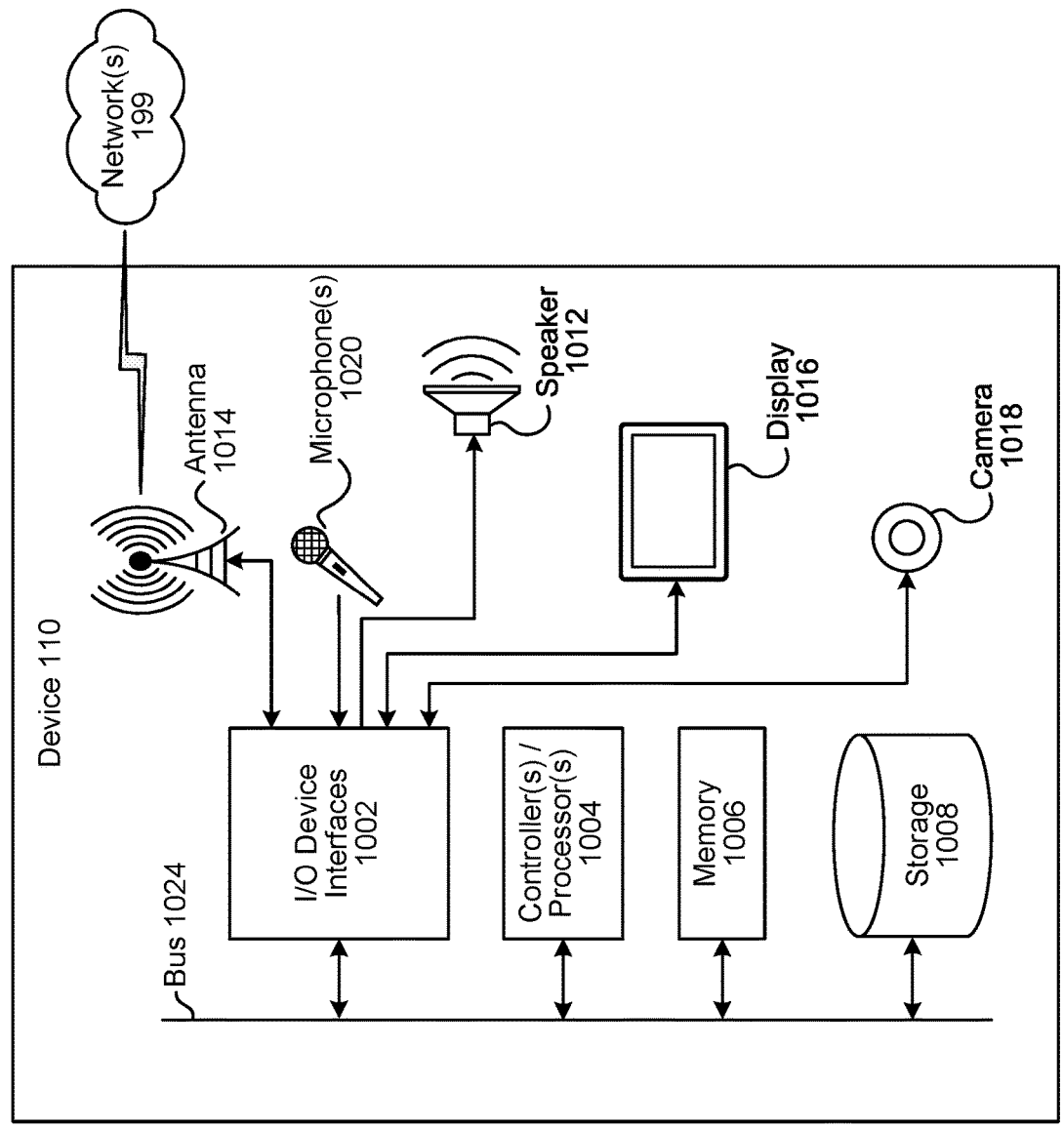
FIG. 10 is a block diagram conceptually illustrating example components of a device, according to embodiments of the present disclosure.
Figure 11:
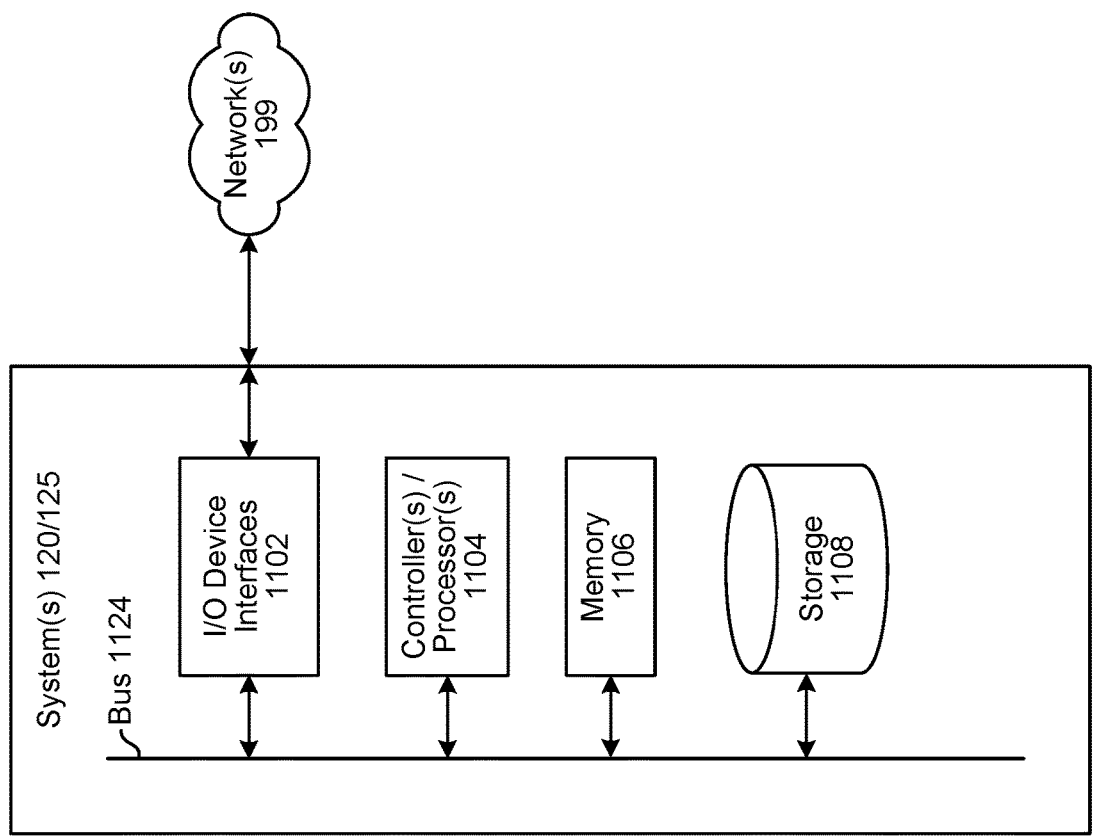
FIG. 11 is a block diagram conceptually illustrating example components of a system, according to embodiments of the present disclosure.

FIG. 10 is a block diagram conceptually illustrating example components of a device 110 according to the present disclosure. FIG. 11 is a block diagram conceptually illustrating example components of a system, such as the system 120 or a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill systems 125, etc. In operation, each of these systems may include computer-readable and computer-executable instructions that reside on the respective device (120/125), as will be discussed further below.

Each of these devices (110/120/125) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/125) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1002/1102).

Computer instructions for operating each device (110/120/125) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/125) includes input/output device interfaces (1002/1102). A variety of components may be connected through the input/output device interfaces (1002/1102), as will be discussed further below. Additionally, each device (110/120/125) may include an address/data bus (1024/1124) for conveying data among components of the respective device. Each component within a device (110/120/125) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to a network(s) 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device 110, the system 120, and/or a skill system 125 may include their own dedicated processors, memory, and/or storage. Alternatively, one or more of the components of the device 110, the system 120, and/or a skill system 125 may utilize the I/O interfaces (1002/1102), processor(s) (1004/1104), memory (1006/1106), and/or storage (1008/1108) of the device(s) 110, system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 125, as described herein, are illustrative, and may be located as a stand-alone device or may be included, in whole or in part, as a component of a larger device or system.

Figure 12:
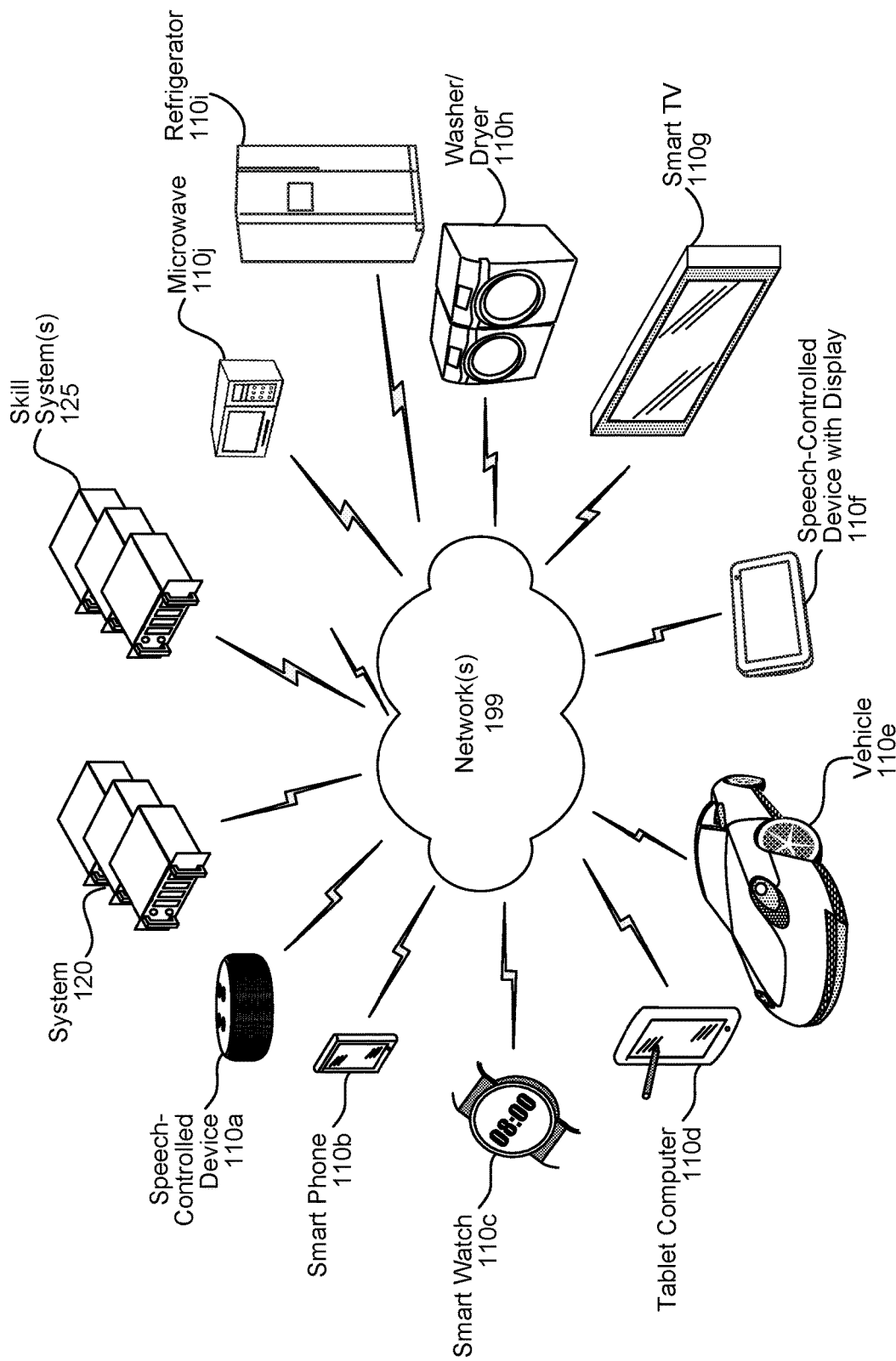
FIG. 12 illustrates an example of a computer network for use with the overall system, according to embodiments of the present disclosure.

As illustrated in FIG. 12, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    establishing a video communication session between a first device and a second device;
    receiving, from the first device, a first user input requesting content be displayed during the video communication session;
    determining a profile identifier associated with the first device;
    sending, to a first content component, the profile identifier and a first request for first content;
    receiving, from the first content component, first image data corresponding to a first plurality of images comprising a first image and a second image;
    receiving first video data being output by at least a first camera associated with the first device;
    receiving second video data being output by at least a second camera associated with the second device;
    sending, to the first device, third video data comprising the first video data, the second video data, first still-frame video data corresponding to the first image, and second still-frame video data corresponding to the second image; and
    sending, to the second device, fourth video data comprising the first video data, the second video data, third still-frame video data corresponding to the first image, and fourth still-frame video data corresponding to the second image.

2. The computer-implemented method of claim 1, further comprising:
    after sending the third video data and the fourth video data, receiving, from the first device, display coordinates corresponding to a graphical user interface (GUI) user input;
    determining the display coordinates correspond to a location on a display where the first still-frame video data is being displayed;
    sending, to the first content component, a second request for second content corresponding to the first image;
    receiving, from the first content component, second image data representing a third image corresponding to the second content;
    sending, to the first device, fifth video data comprising the first video data, the second video data, and fifth still-frame video data corresponding to the third image; and
    sending, to the second device, sixth video data comprising the first video data, the second video data, and sixth still-frame video data corresponding to the third image.

3. The computer-implemented method of claim 1, further comprising:

after sending the third video data and the fourth video data, receiving, from the first device, display coordinates corresponding to a graphical user interface (GUI) user input;
determining the display coordinates correspond to a graphical element to display additional content;
sending, to the first content component, a second request for additional content;
receiving, from the first content component, second image data corresponding to a second plurality of images comprising a third image and a fourth image;
sending, to the first device, fifth video data comprising the first video data, the second video data, fifth still-frame video data corresponding to the third image, and sixth still-frame video data corresponding to the fourth image; and
sending, to the second device, sixth video data comprising the first video data, the second video data, seventh still-frame video data corresponding to the third image, and eighth still-frame video data corresponding to the fourth image.

4. The computer-implemented method of claim 1, further comprising:
after sending the third video data and the fourth video data, receiving, from the first device, display coordinates corresponding to a graphical user interface (GUI) user input;
determining the display coordinates correspond to a graphical element to cease displaying content during the video communication session; and
in response to determining the display coordinates correspond to the graphical element, causing the video communication session to be performed as a peer-to-peer video communication session wherein:
the first device displays the first video data and the second video data, and
the second device displays the first video data and the second video data.

5. A computer-implemented method comprising:
establishing a first multimedia communication session between a first device and a second device;
receiving, from the first device, a first user input requesting a book be displayed during the first multimedia communication session;
determining first image data corresponding to a first book;
receiving first video data being output by at least one camera associated with the first device;
receiving second video data being output by at least one a first camera associated with the second device;
sending, to the first device, third video data comprising the first video data, the second video data, and first still-frame video data corresponding to the first image data; and
sending, to the second device, fourth video data comprising the first video data, the second video data, and second still-frame video data corresponding to the first image data.

6. The computer-implemented method of claim 5, further comprising:
generating display location data representing display coordinates corresponding to a location of the first still-frame video data on a display associated with the first device; and
sending the display location data to the first device.

7. The computer-implemented method of claim 5, further comprising:
receiving, from the first device, a graphical user interface (GUI) user input corresponding to the first still-frame video data;
determining second image data corresponding to a page of the first book; and
sending, to the first device, fifth video data comprising the first video data, the second video data, and third still-frame video data corresponding to the page of the first book.

8. The computer-implemented method of claim 5, further comprising:
receiving, from the first device, a graphical user interface (GUI) user input corresponding to a graphical element to display additional content;
determining second image data corresponding to a second book; and
sending, to the first device, fifth video data comprising the first video data, the second video data, and third still-frame video data corresponding to the second book.

9. The computer-implemented method of claim 5, further comprising:
prior to receiving the first user input, performing the first multimedia communication session as a peer-to-peer multimedia communication session between the first device and the second device; and
after receiving the first user input, by a distributed system:
receiving the first video data from the second device,
generating the second video data, and
sending the second video data to the first device.

10. The computer-implemented method of claim 9, further comprising:
after sending the third video data to the first device and the fourth video data to the second device, receiving, from one of the first device or the second device, a second user input to cease display of content during the first multimedia communication session; and
based at least in part on receiving the second user input, causing the first multimedia communication session to revert to the peer-to-peer multimedia communication session.

11. The computer-implemented method of claim 5, further comprising:
establishing a second multimedia communication session between the first device and the second device;
receiving, from the first device, a second user input request a video be displayed during the second multimedia communication session;
determining second image data corresponding to a cover of a first movie;
determining third image data corresponding to a cover of a second movie;
receiving fifth video data being output by the at least one camera associated with the first device;
receiving sixth video data being output by the at least one camera associated with the second device;
sending, to the first device, seventh video data comprising the fifth video data the sixth video data, third still-frame video data corresponding to the cover of the first movie, and fourth still-frame video data corresponding to the cover of the second movie; and
sending, to the second device, eighth video data comprising the fifth video data, the sixth video data, fifth still-frame video data corresponding to the cover of the first movie, and sixth still-frame video data corresponding to the cover of the second movie.

12. A computing system, comprising:
at least one processor; and at least one memory comprising instructions that, when executed by the at least one processor, cause the computing system to:
  establish a multimedia communication session between a first device and a second device;
  receive, from the first device, a first user input requesting content be displayed during the multimedia communication session;
  send, to a first content component, a request for first content;
  receive, from the first content component, first image content data from the first content component comprising a first image and a second image;
  receive first video data being output by at least one camera associated with the first device;
  receive second video data being output by at least one camera associated with the second device;
  send, to the first device, third video data comprising the first video data the second video data, first still-frame video data corresponding to the first image, and second still-frame video data corresponding to the second image; and
  send, to the second device, fourth video data comprising the first video data, the second video data, third still-frame video data corresponding to the first image, and fourth still-frame video data corresponding to the second image.

13. The computing system of claim 12, wherein the at least one memory further comprises instructions that, when executed by the at least one processor, further cause the computing system to:
  generate display location data representing display coordinates corresponding to a location of the first still-frame video data on a display associated with the first device; and
  send the display location data to the first device.

14. The computing system of claim 12, wherein the at least one memory further comprises instructions that, when executed by the at least one processor, further cause the computing system to:
  receive, from the first device, a graphical user interface (GUI) user input corresponding to the first still-frame video data;
  determine second image data associated with the first image data, the second image data corresponding to a third image; and
  send, to the first device, fifth video data comprising the first video data, the second video data, and fifth still-frame video data corresponding to the third image.

15. The computing system of claim 12, wherein the at least one memory further comprises instructions that, when executed by the at least one processor, further cause the computing system to:
  receive, from the first device, a graphical user interface (GUI) user input corresponding to a graphical element to display additional content;
  determine second image data corresponding to third image and a fourth image; and
  send, to the first device, fifth video data comprising the first video data, the second video data, fifth still-frame video data corresponding to the third image, and sixth still-frame video data corresponding to the fourth image.

16. The computing system of claim 12, wherein the at least one memory further comprises instructions that, when executed by the at least one processor, further cause the computing system to:
  prior to receiving the first user input, perform the multimedia communication session as a peer-to-peer multimedia communication session between the first device and the second device; and
  after receiving the first user input, by a distributed system:
    receive the first video data from the second device,
    generate the second video data, and
    send the second video data to the first device.

17. The computing system of claim 16, wherein the at least one memory further comprises instructions that, when executed by the at least one processor, further cause the computing system to:
  after sending the third video data to the first device and the fourth video data to the second device, receive, from one of the first device or the second device, a second user input to cease display of content during the multimedia communication session; and
  based at least in part on receiving the second user input, cause the multimedia communication session to revert to the peer-to-peer multimedia communication session.

18. The computing system of claim 12, wherein the at least one memory further comprises instructions that, when executed by the at least one processor, further cause the computing system to:
  receive, from the first device, a graphical user interface (GUI) user input corresponding to the first still-frame video data;
  send, to the first content component, a request for second content associated with the first content data image;
  receive, from the first content component, fifth video data associated with the first image; and
  send, to the first device, sixth video data comprising the first video data, the second video data, and the fifth video data.

* * * * *